US008095869B2

(12) United States Patent
Feig

(10) Patent No.: US 8,095,869 B2
(45) Date of Patent: Jan. 10, 2012

(54) LATCHES-LINKS AS VIRTUAL ATTACHMENTS IN DOCUMENTS

(75) Inventor: Ephraim Feig, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 2758 days.

(21) Appl. No.: 09/750,577

(22) Filed: Dec. 29, 2000

(65) Prior Publication Data

US 2003/0046315 A1 Mar. 6, 2003

(51) Int. Cl.
*G06N 3/00* (2006.01)
(52) U.S. Cl. ........................................................ 715/234
(58) Field of Classification Search .................. 345/854;
715/513, 512, 804, 517, 523, 530, 234, 243,
715/254, 255; 707/4; 713/200; 706/11
See application file for complete search history.

(56) References Cited

U.S. PATENT DOCUMENTS

| | | | | | |
|---|---|---|---|---|---|
| 4,931,950 | A | * | 6/1990 | Isle et al. | 706/11 |
| 4,982,344 | A | * | 1/1991 | Jordan | 715/804 |
| 5,204,947 | A | * | 4/1993 | Bernstein et al. | 345/854 |
| 5,297,249 | A | * | 3/1994 | Bernstein et al. | 345/854 |
| 5,421,008 | A | * | 5/1995 | Banning et al. | 707/4 |
| 5,806,078 | A | * | 9/1998 | Hug et al. | 715/511 |
| 6,029,245 | A | * | 2/2000 | Scanlan | 713/200 |
| 6,321,242 | B1 | * | 11/2001 | Fogg et al. | 715/513 |
| 6,638,314 | B1 | * | 10/2003 | Meyerzon et al. | 715/513 |

OTHER PUBLICATIONS

Venners, "Java's garbage-collected heap: An introduction to the garbage-collected heap of the Java virtual machine," <http://www.javaworld.com/javaworld/jw-08-1996/jw-08-gc_p.html>, pp. 1-8.*
Roy et al., "Garbage collection in object-oriented databases using trasactional cyclic reference counting," The VLDB Journal (1998) 7, pp. 179-193.*
Wise, "Morris's Garbabge Compaction Algorithm Restores Reference Counts," ACM Transactions on Programming Languages and System, vol. 1, No. 1, Jul. 1979, pp. 115-120.*
Birrell et al., "Distributed Garbage Collection for Network Objects," Dec. 15, 1993, pp. 1-18.*

* cited by examiner

*Primary Examiner* — Kyle Stork
(74) *Attorney, Agent, or Firm* — Daniel McLoughlin; Ryan, Mason & Lewis, LLP

(57) ABSTRACT

A system and method are disclosed for managing target documents referred to by referring documents. A user sends a delete request for a referring document from a user client computer to a master server computer. Next, the master server computer accesses and deletes the referring document, updates a counter for a target document hypertext linked to the referring document, and updates a database, which contained the deleted referring document. The master server computer then determines whether the count for the counter of the target document equals zero. If the counter for the referring document is not equal to zero, the master server computer sends a message to the user indicating that the referring document has been deleted and sends a message to the user asking whether the user wants to delete another referring document. If the user wants to delete another referring document the process goes back to the initial process step, and the user sends another delete request for a referring document. However, if the counter for the referring document equals zero, the master server computer sends a message to the user indicating that the referring document has been deleted and then sends a message to an author of the target document (author client) asking whether the author client wants to delete the target document. Automatic deletion of target documents is also disclosed. Further disclosed are systems and methods for viewing, creating, and providing security for target documents referred to in referring documents.

14 Claims, 46 Drawing Sheets

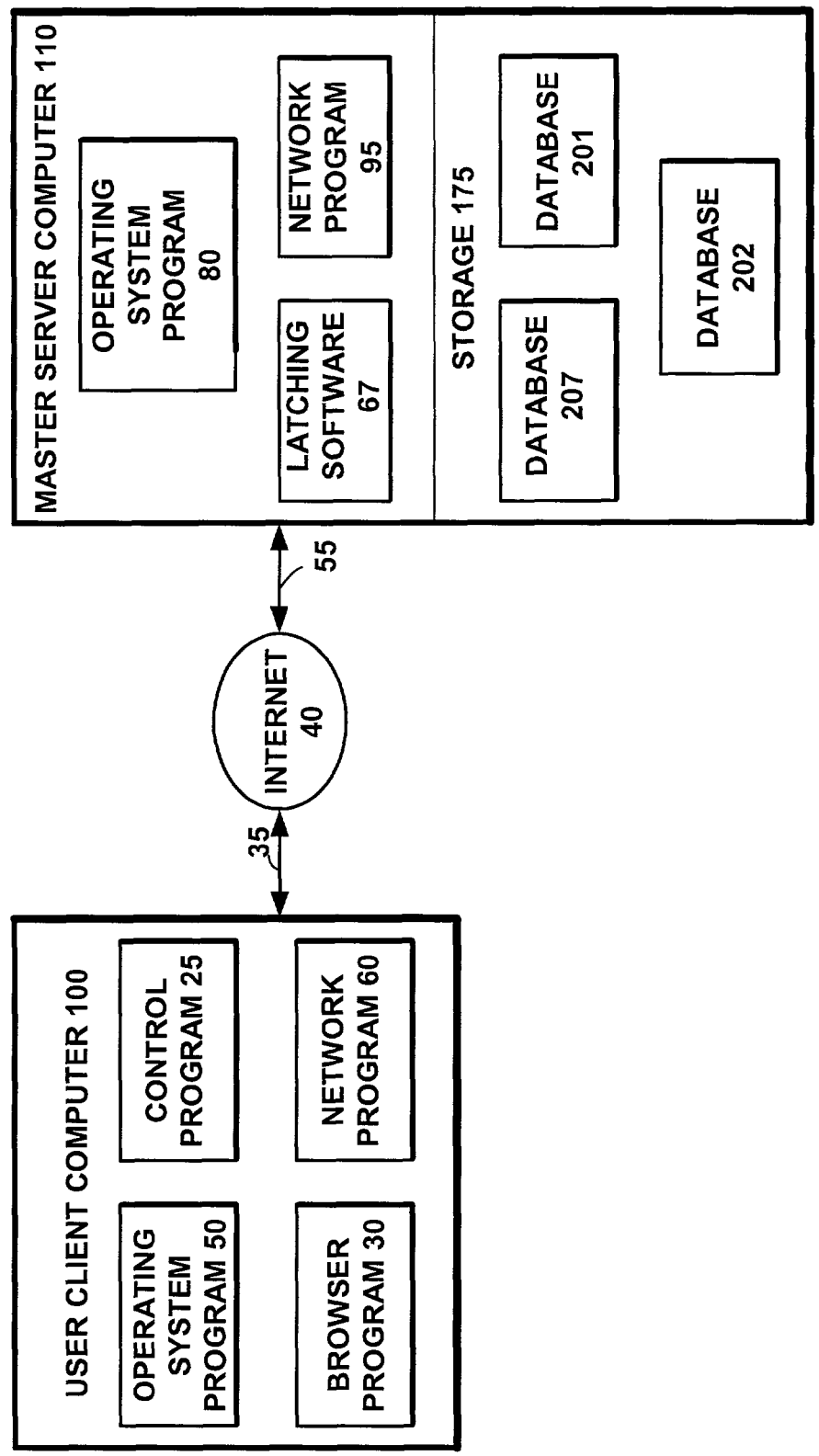
FIG. 2A(1)

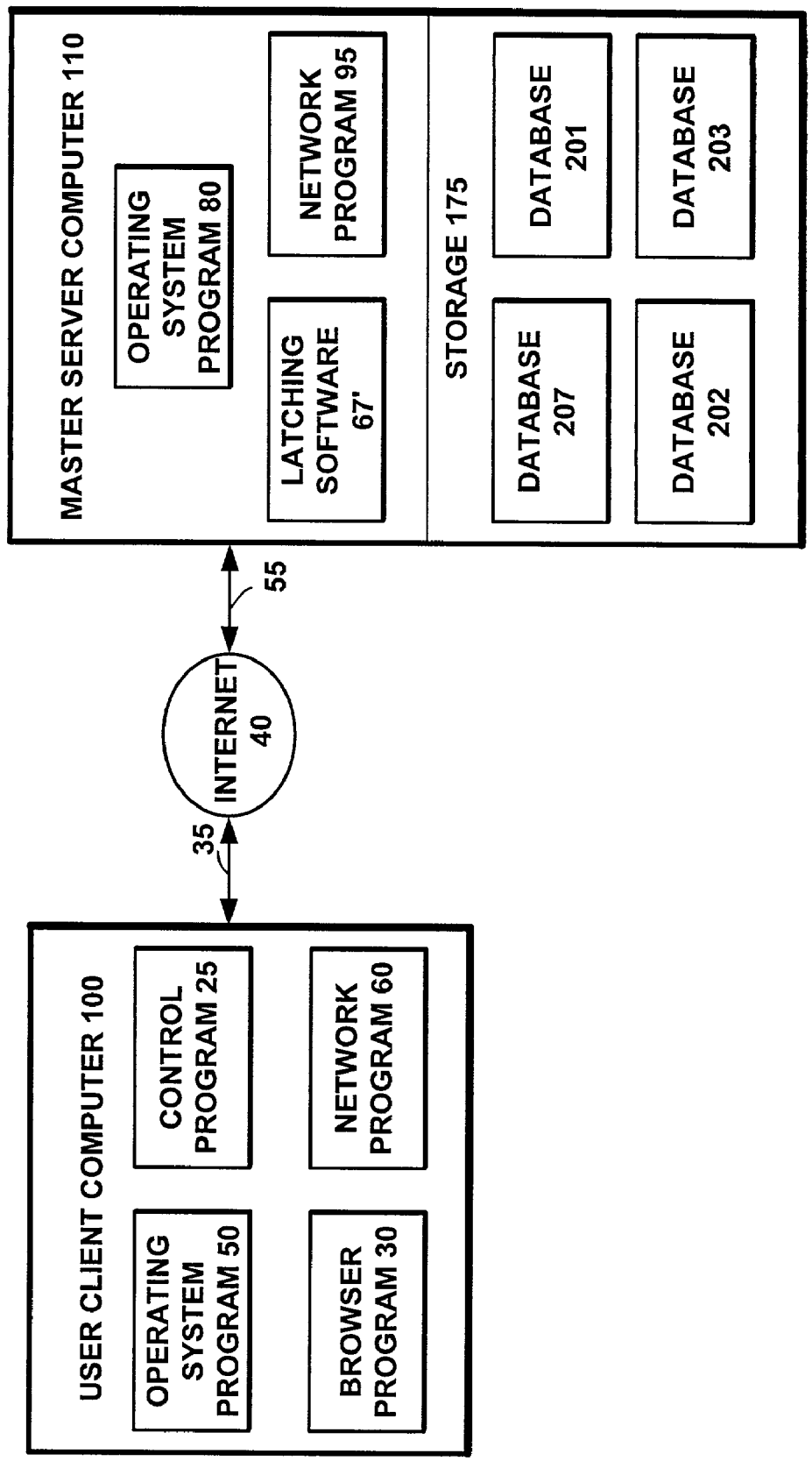
FIG. 2A(2)

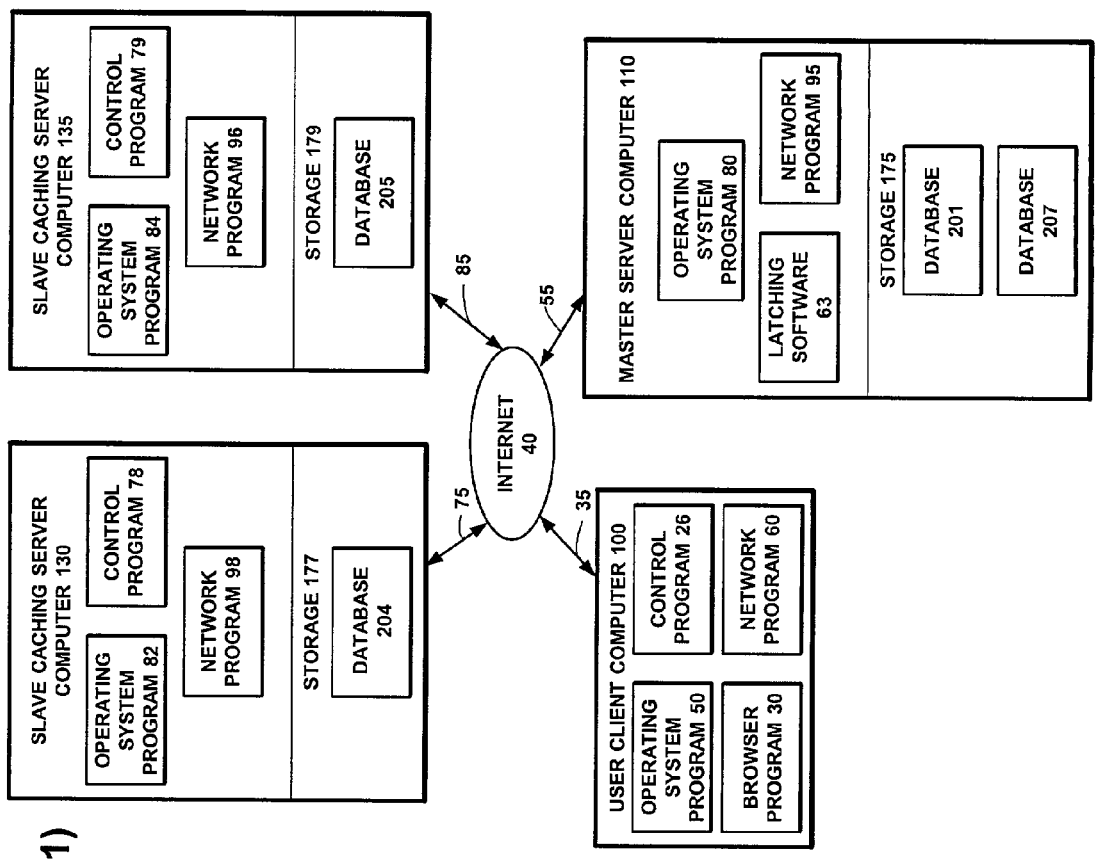
FIG. 2B(1)

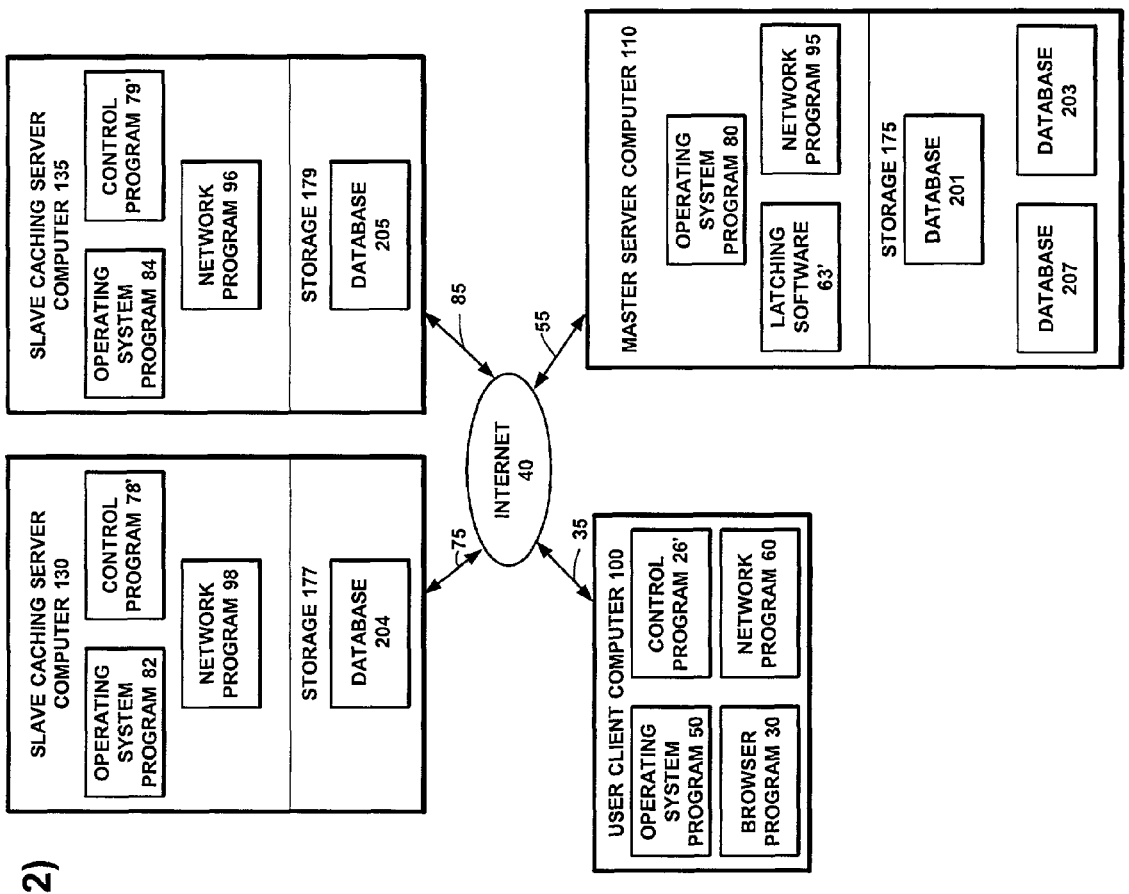
FIG. 2B(2)

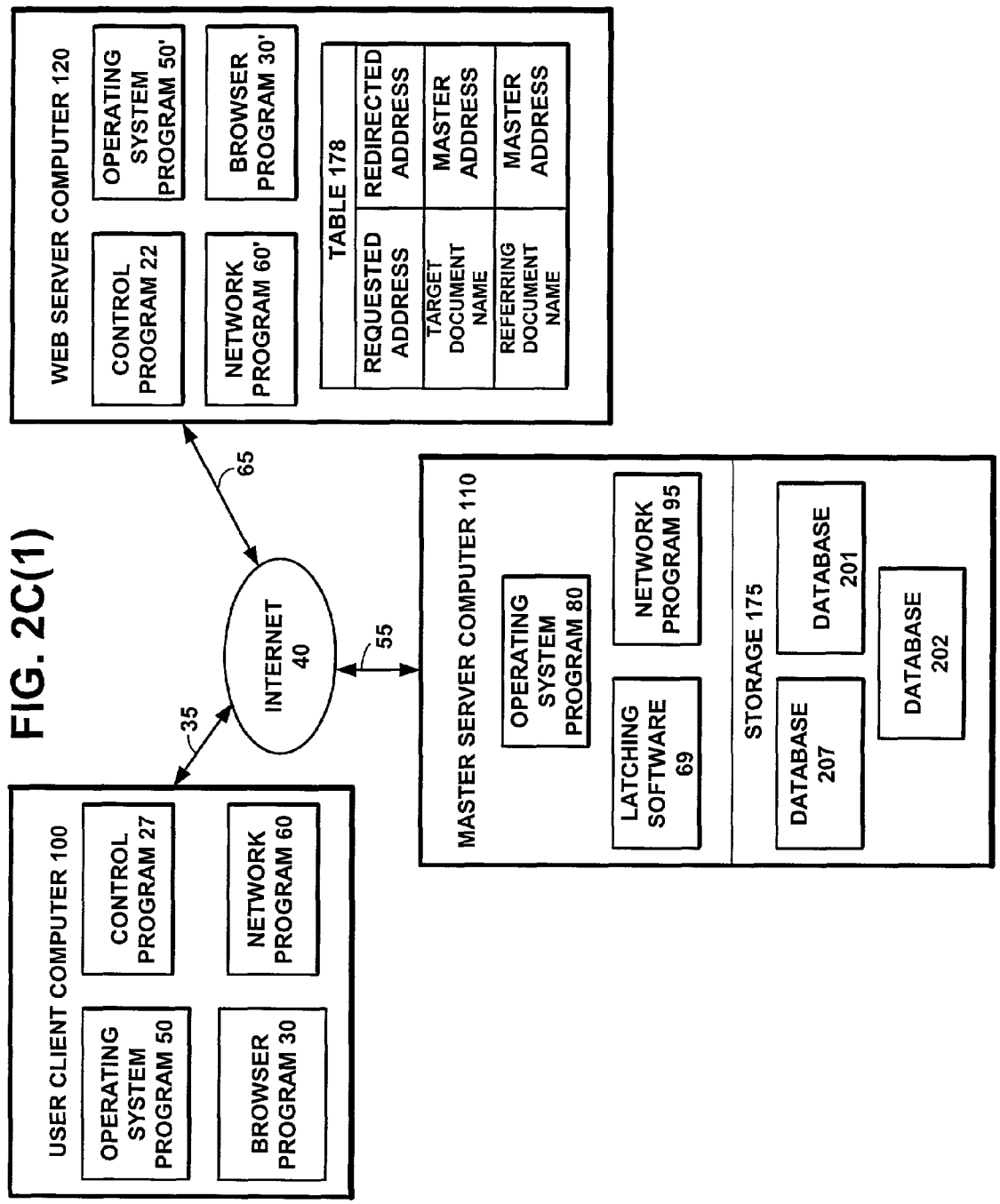

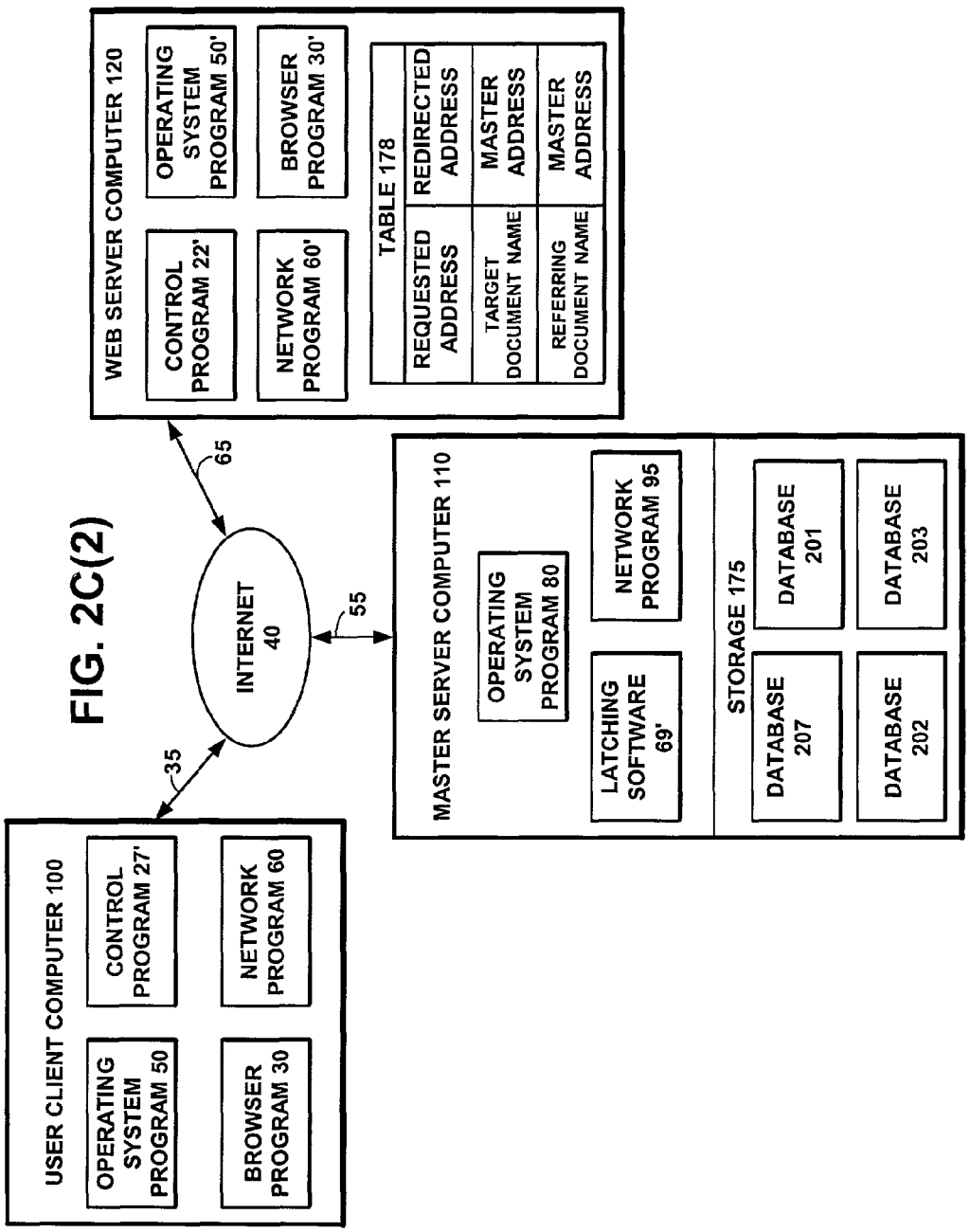

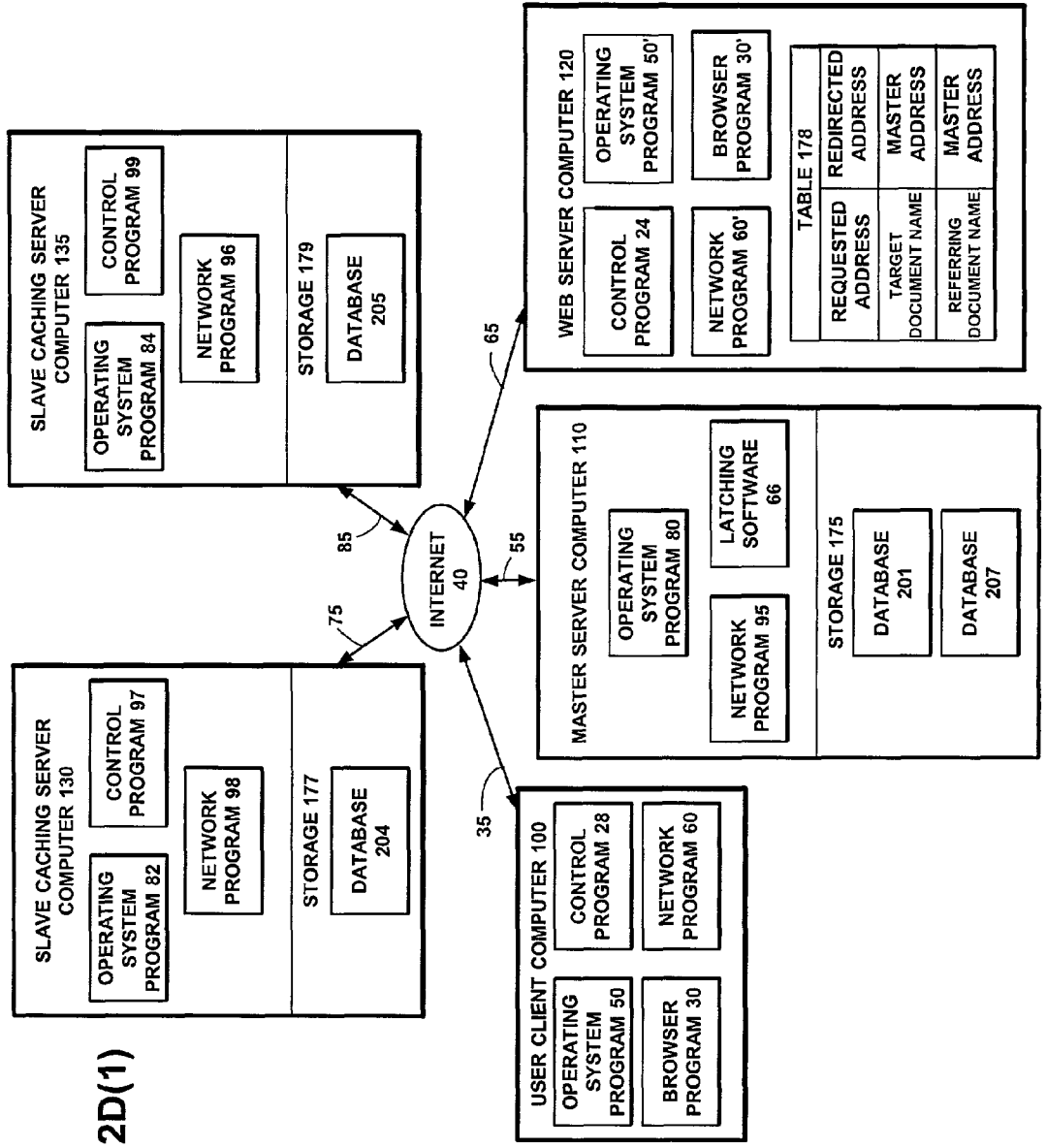
FIG. 2D(1)

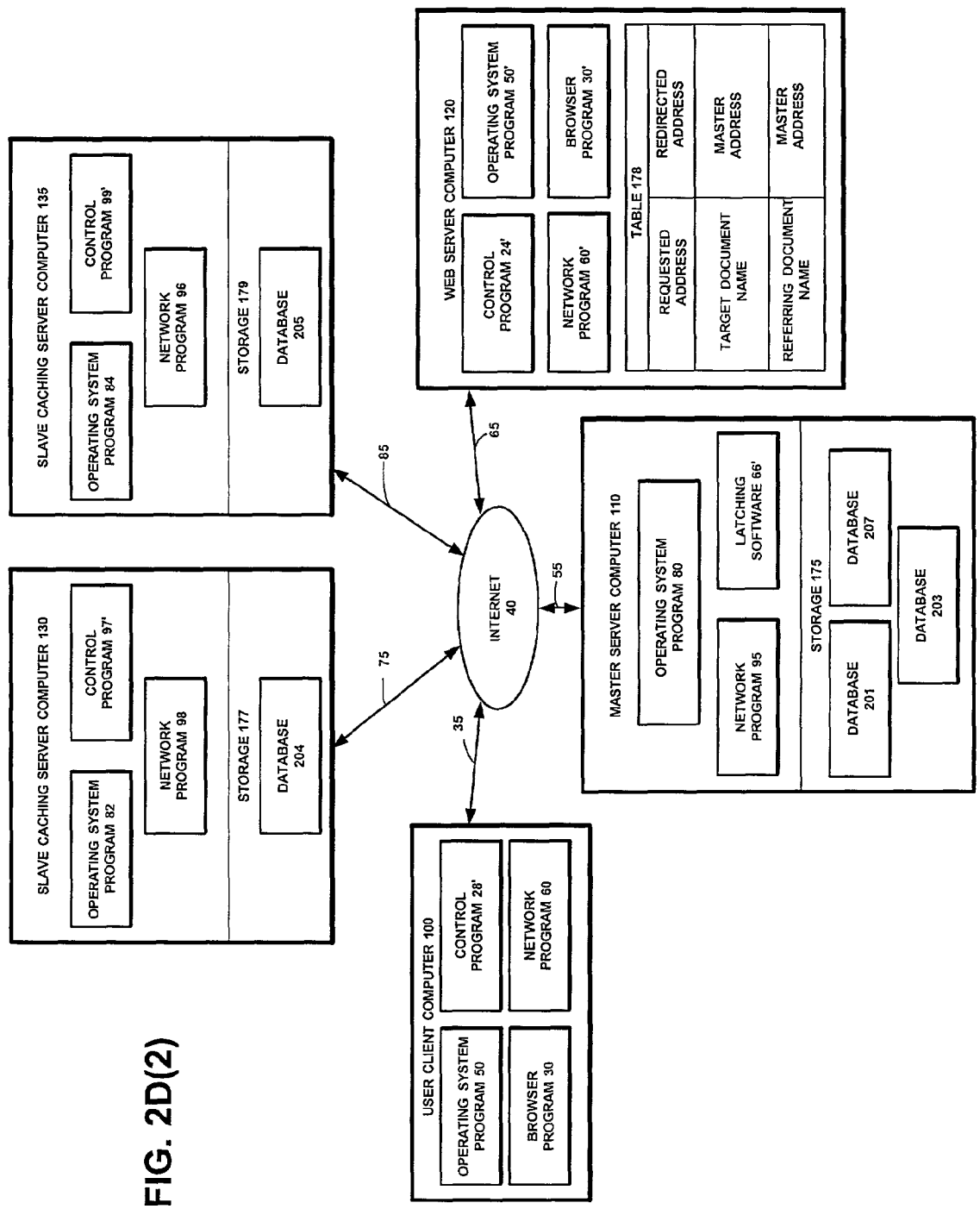
FIG. 2D(2)

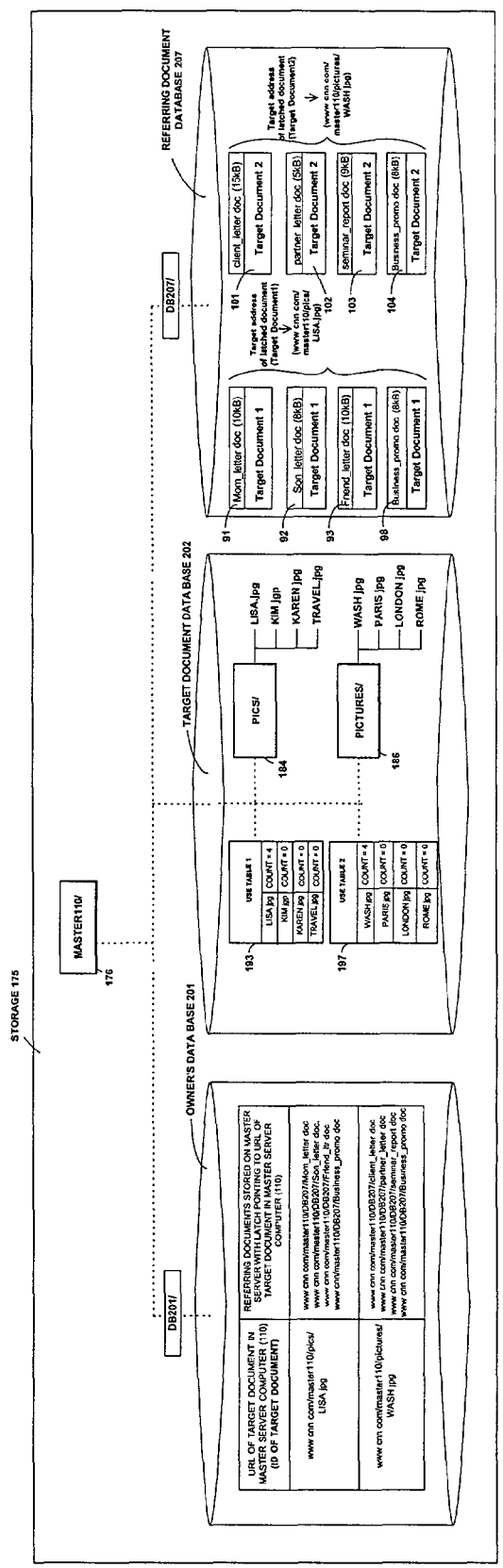
FIG. 3A(1)

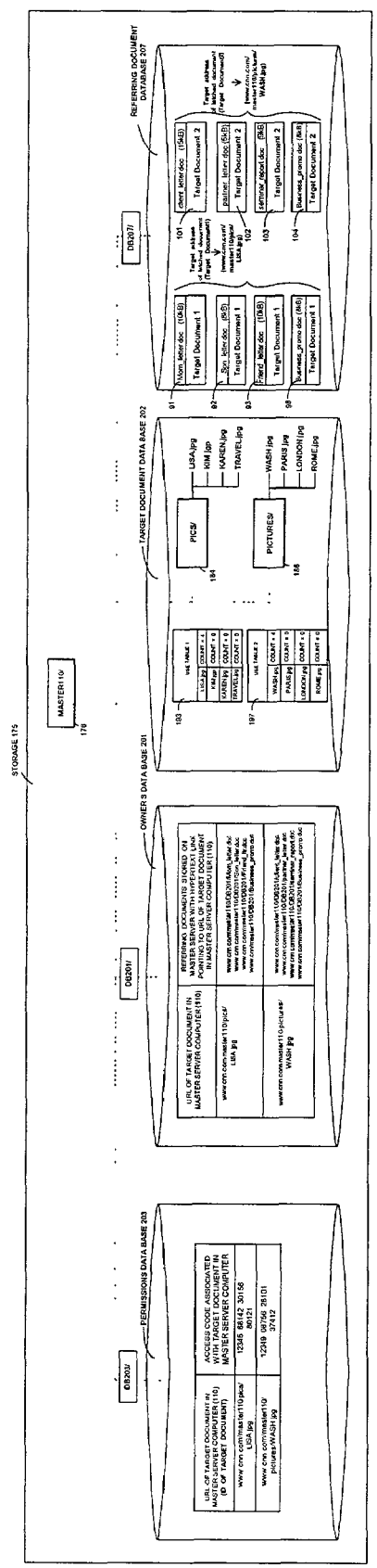
FIG. 3A(2)

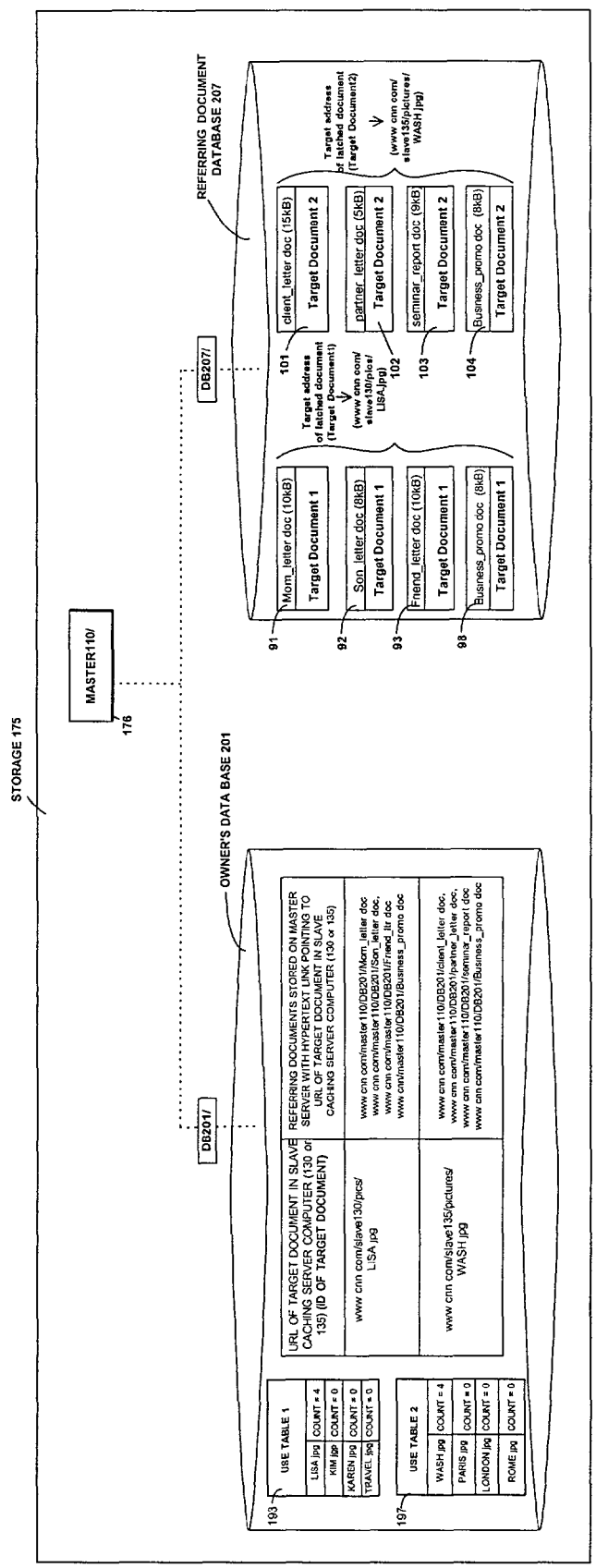
FIG. 3B(1)

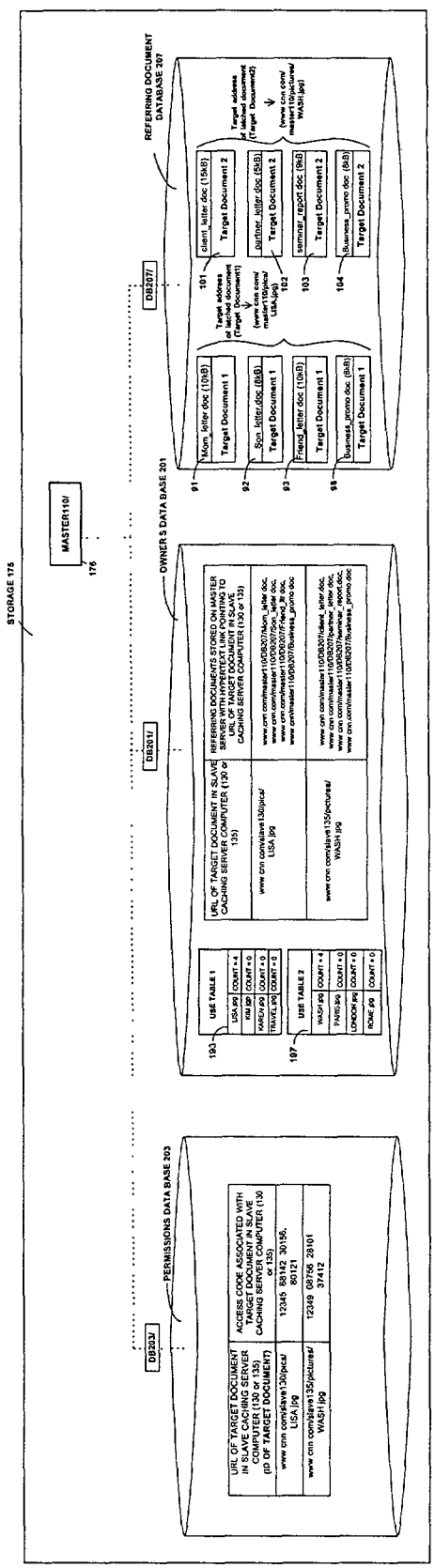
FIG. 3B(2)

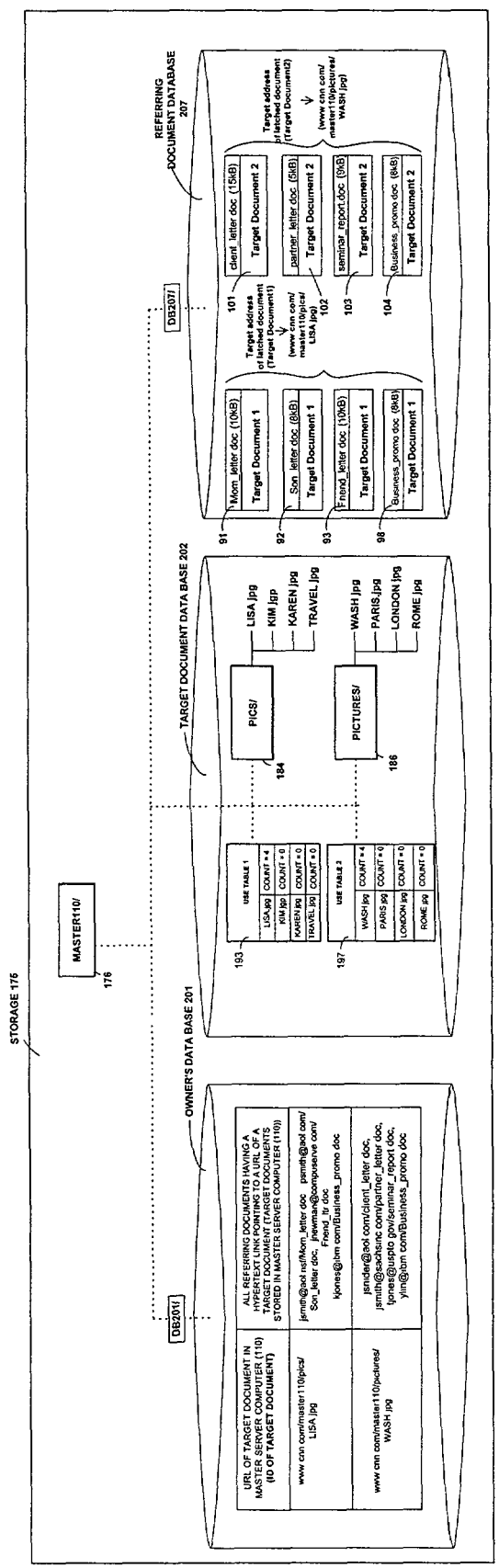
FIG. 3C(1)

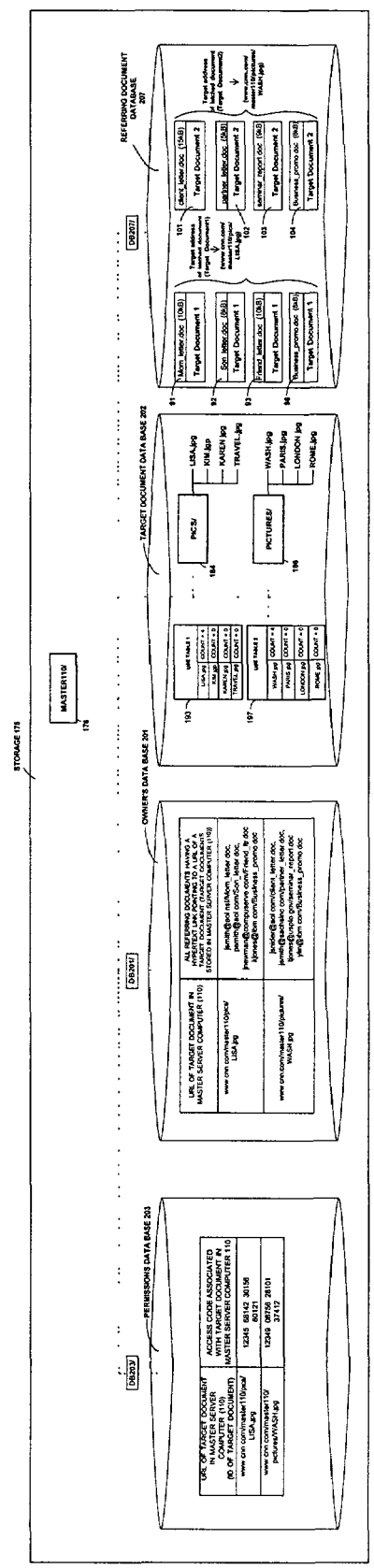
FIG. 3C(2)

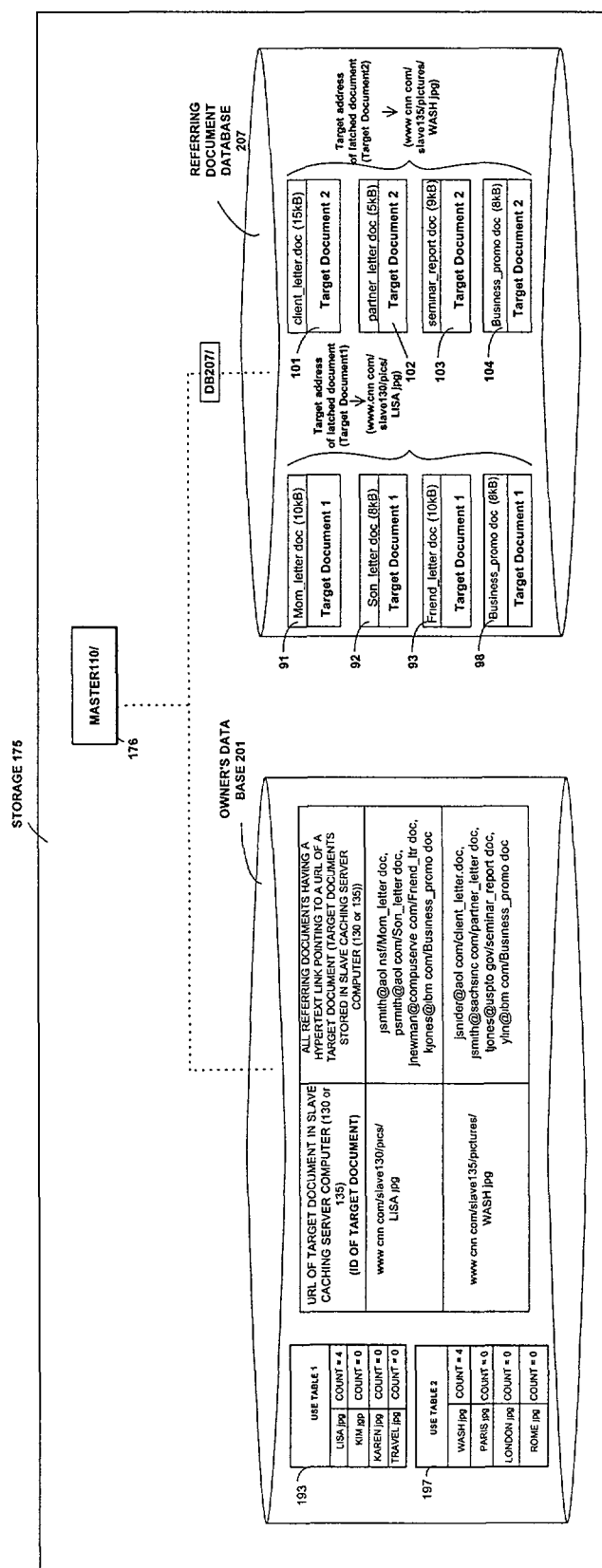
FIG. 3C(3)

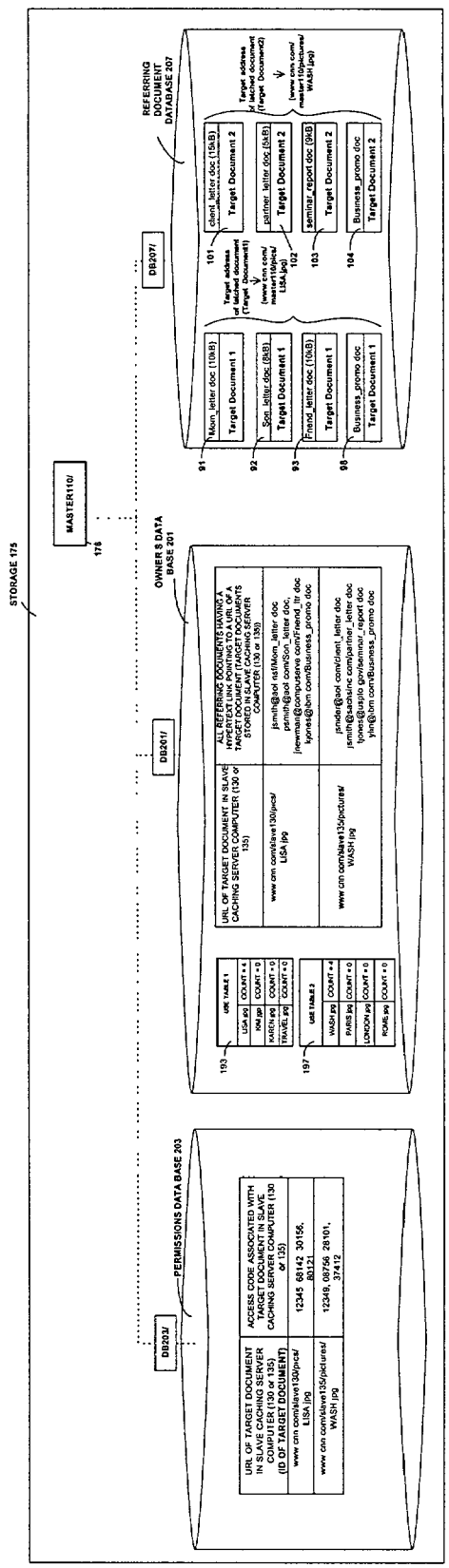
FIG. 3C(4)

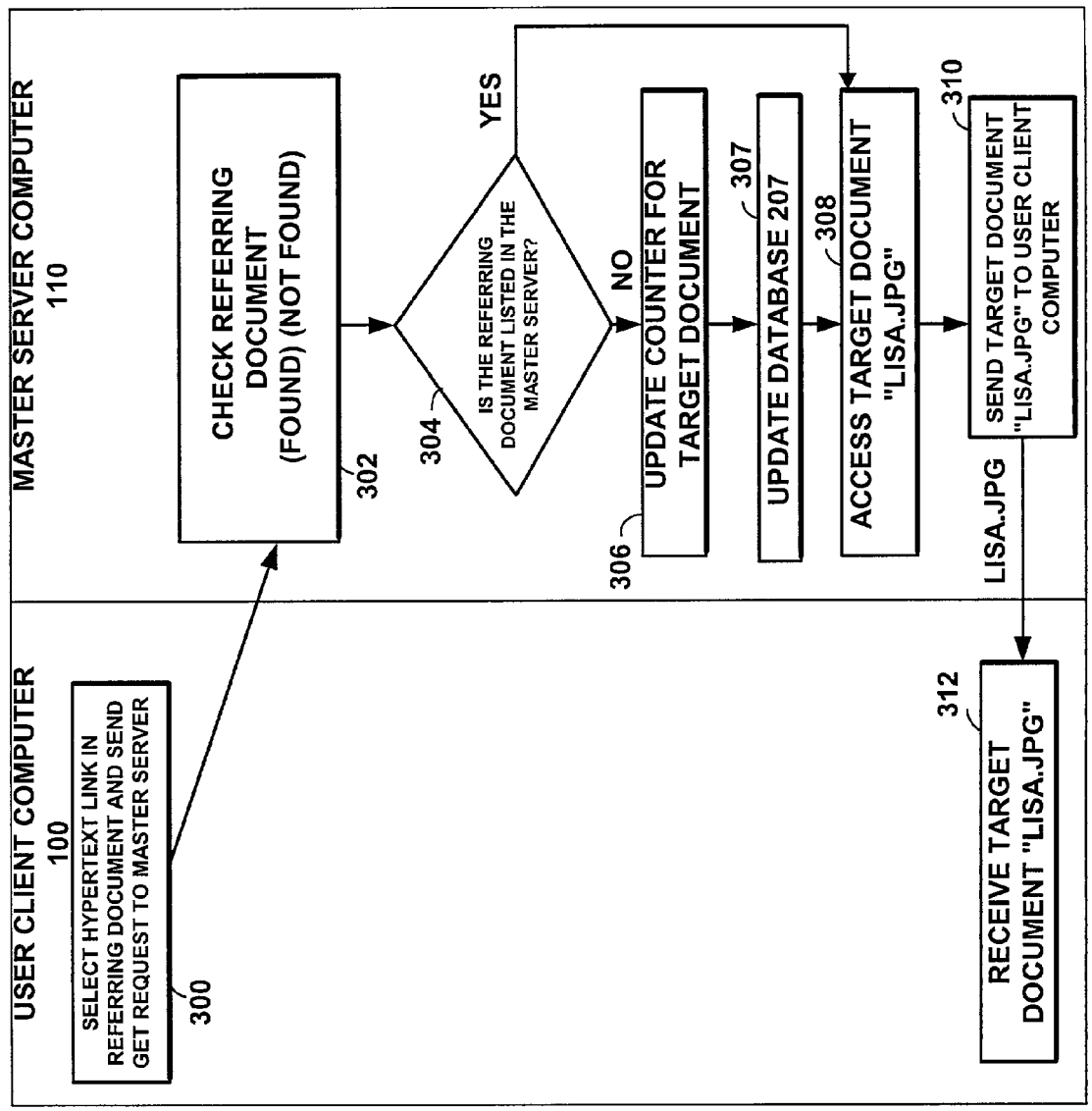
FIG. 6A(1)

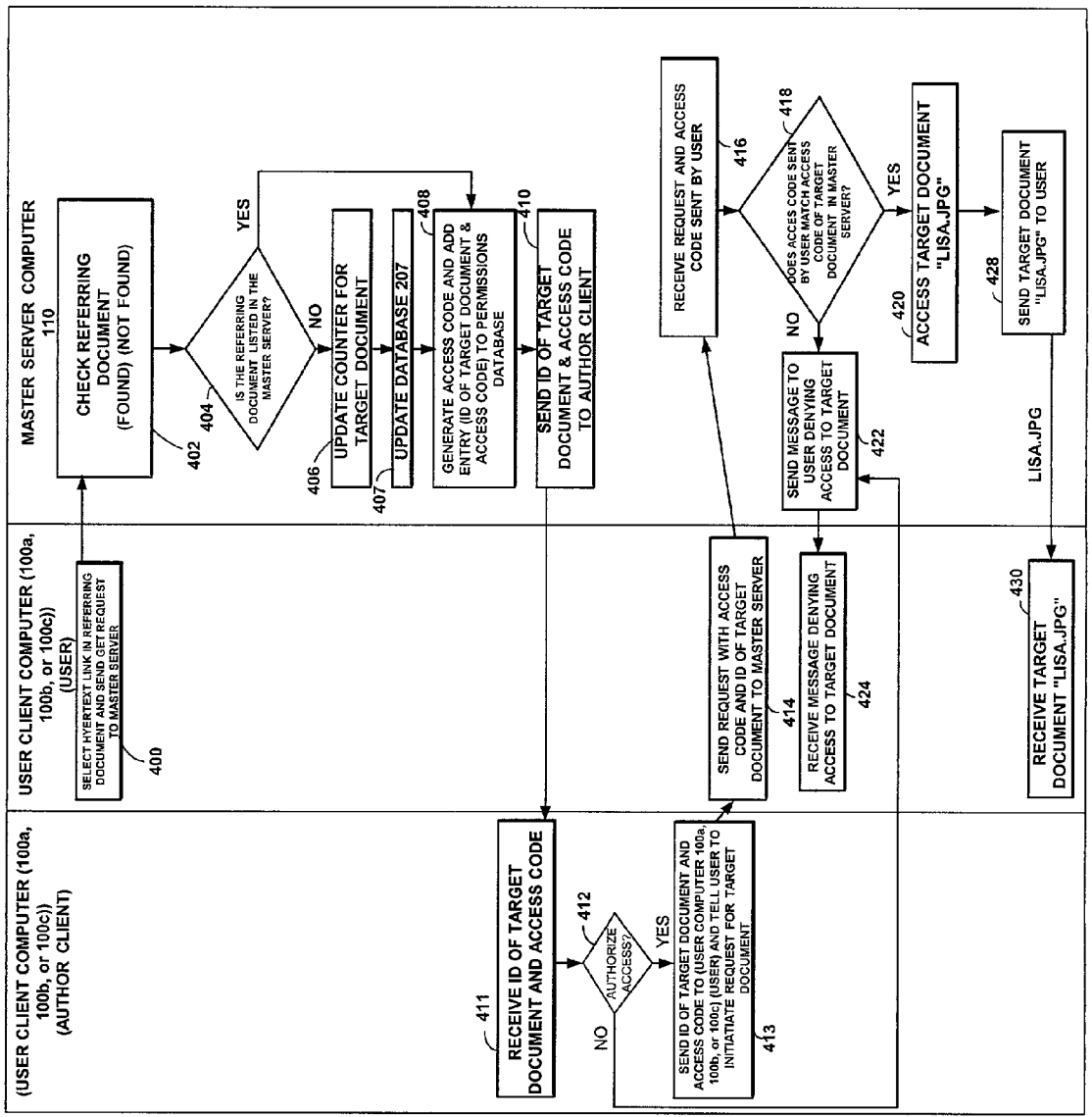
FIG. 6A(2)

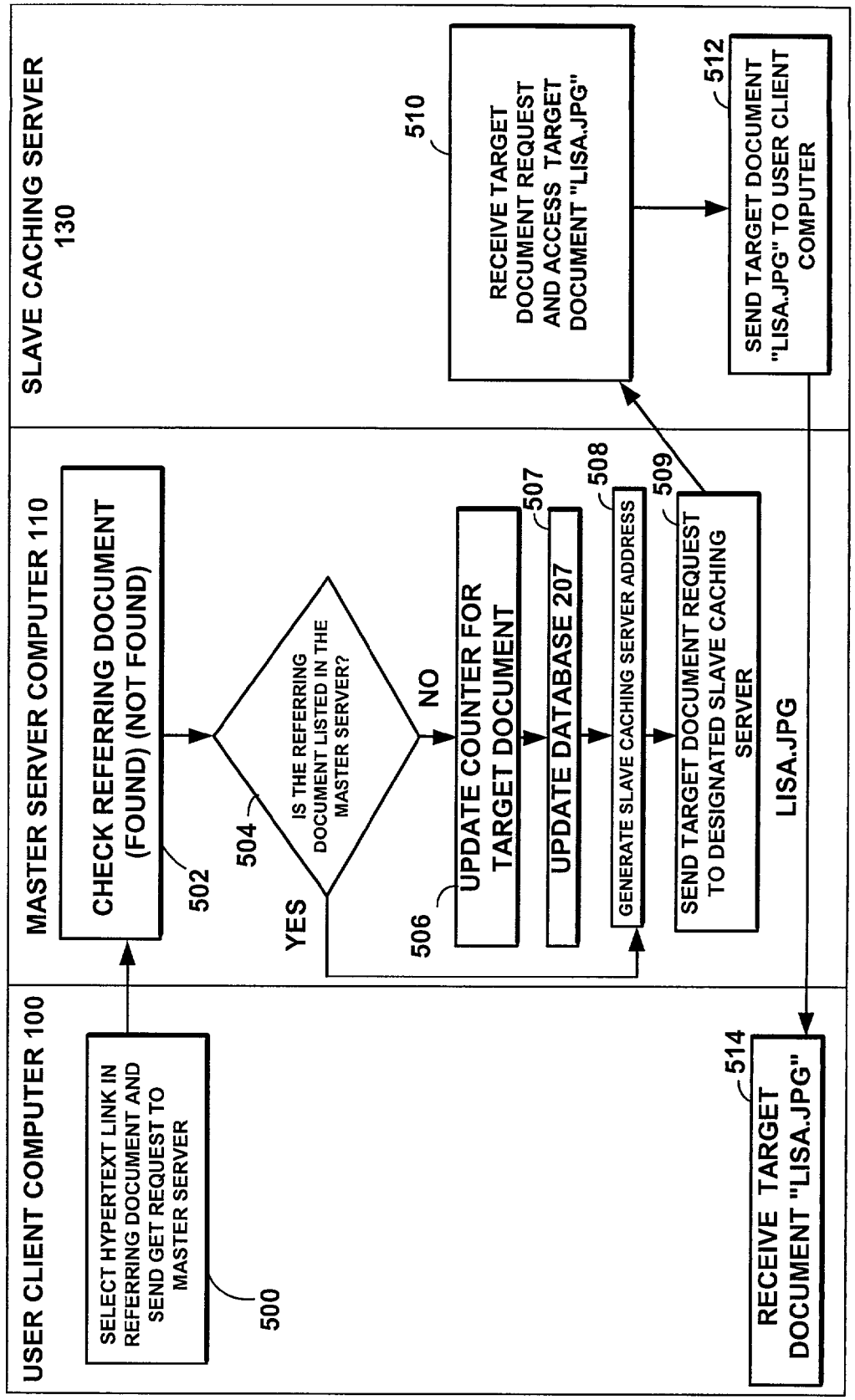
FIG. 6B(1)

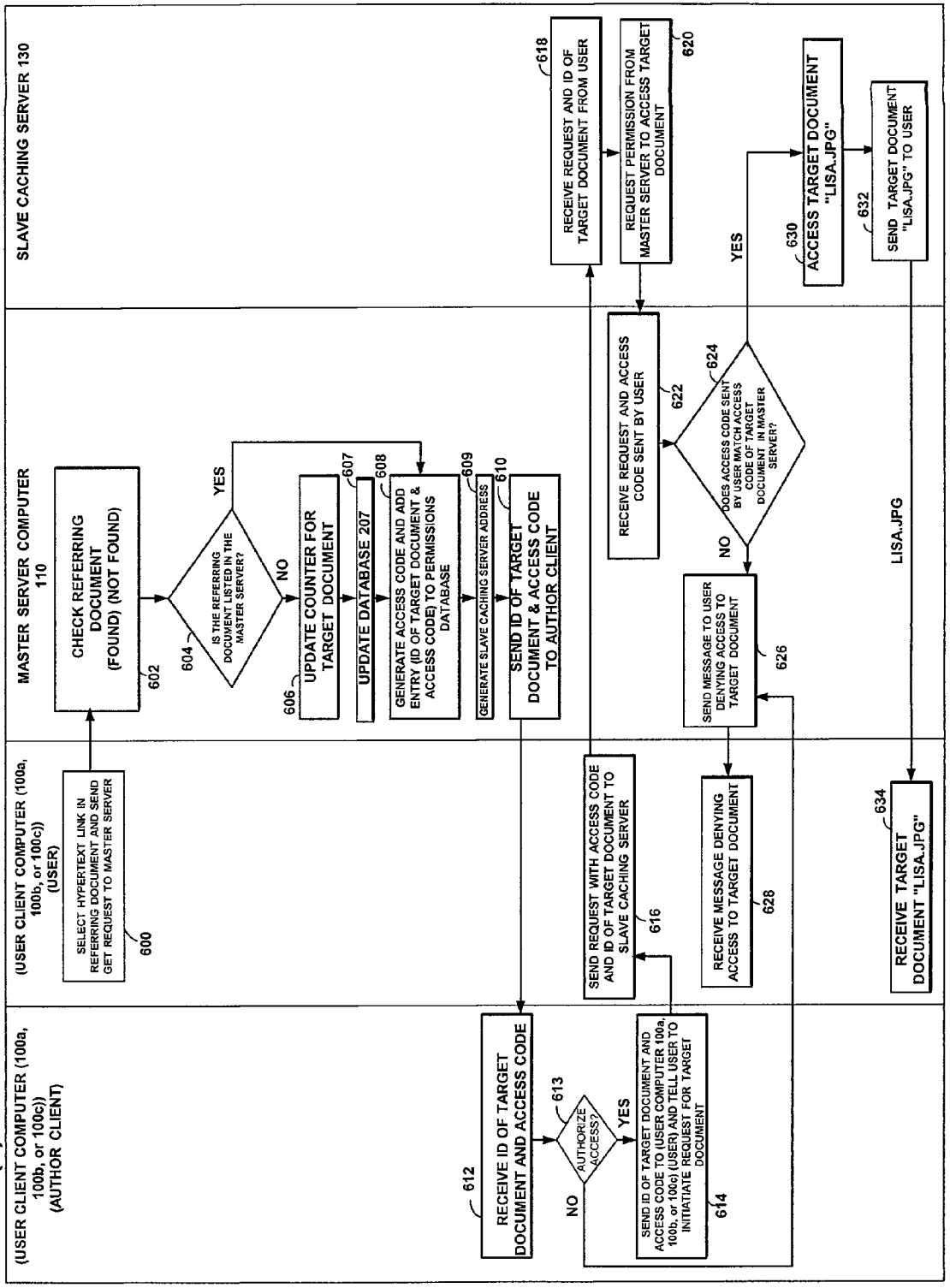
FIG. 6B(2)

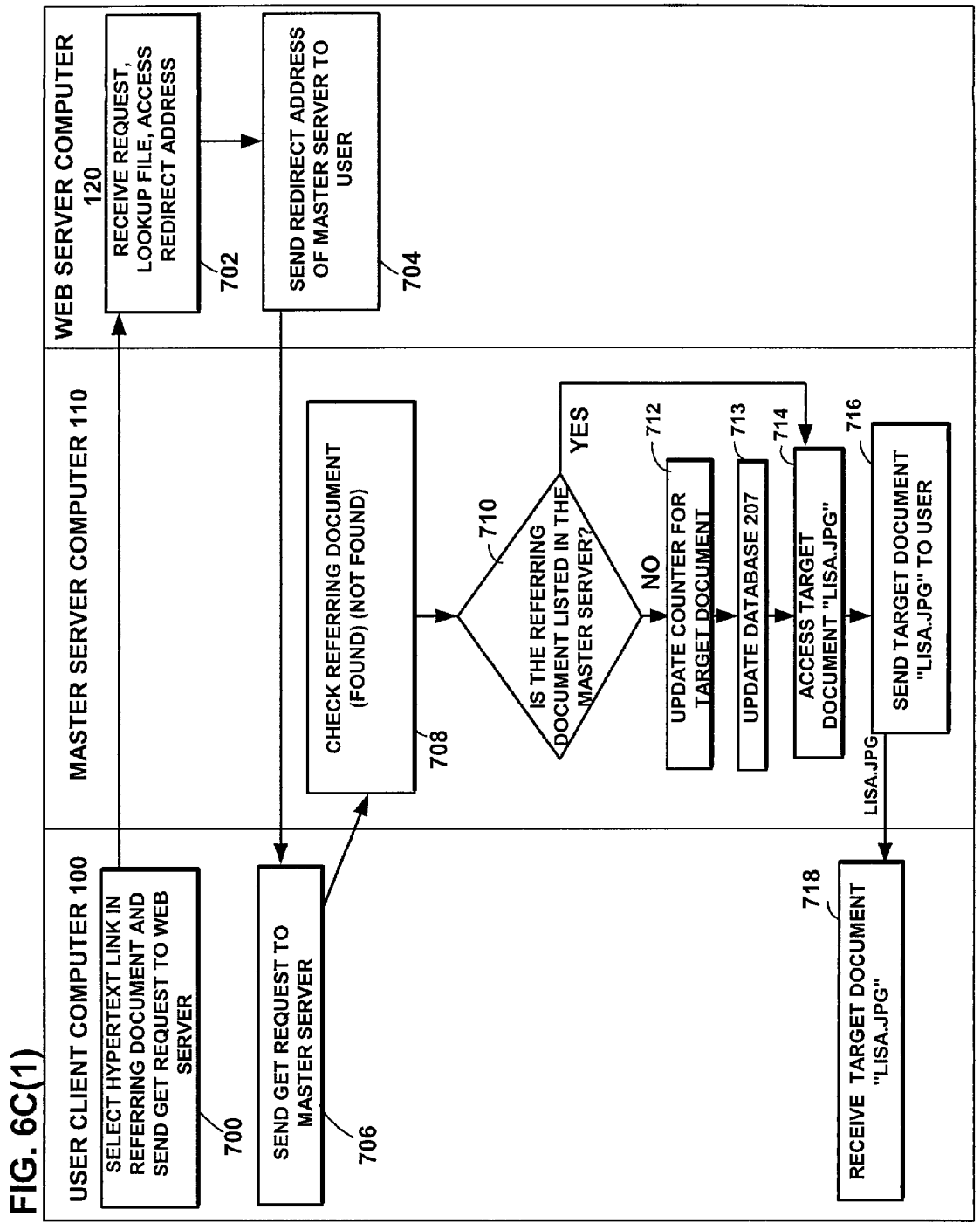
FIG. 6C(1)

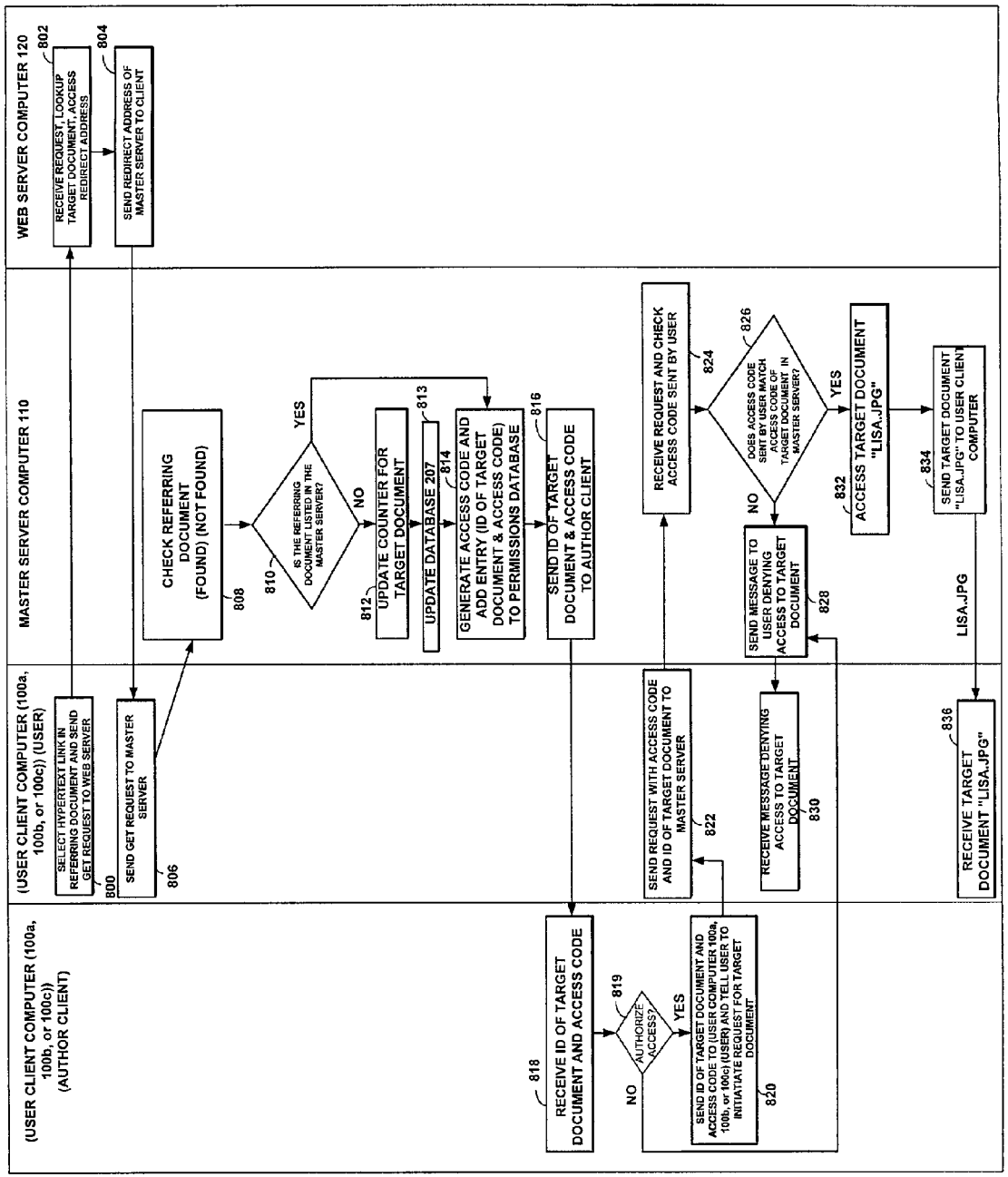
FIG. 6C(2)

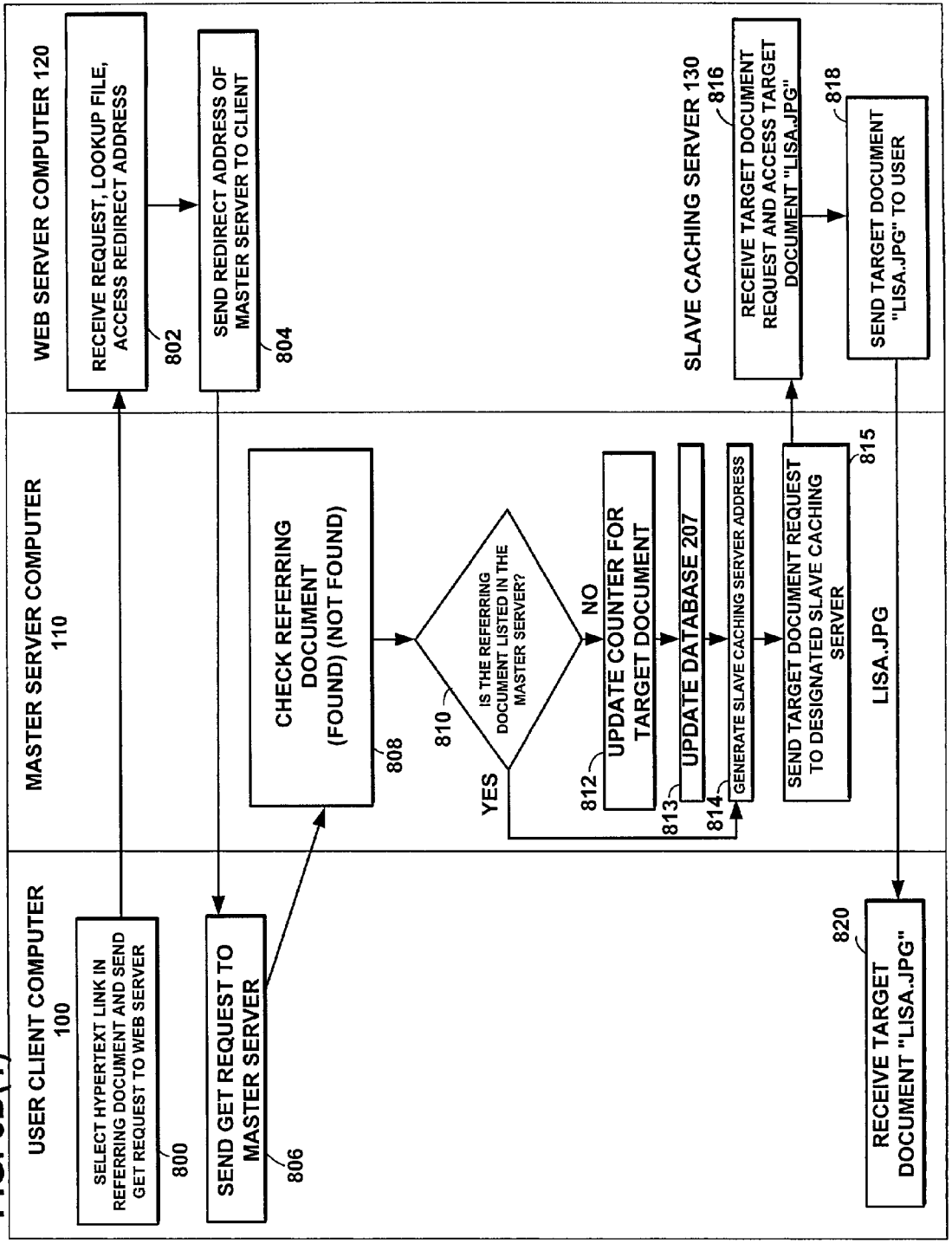
FIG. 6D(1)

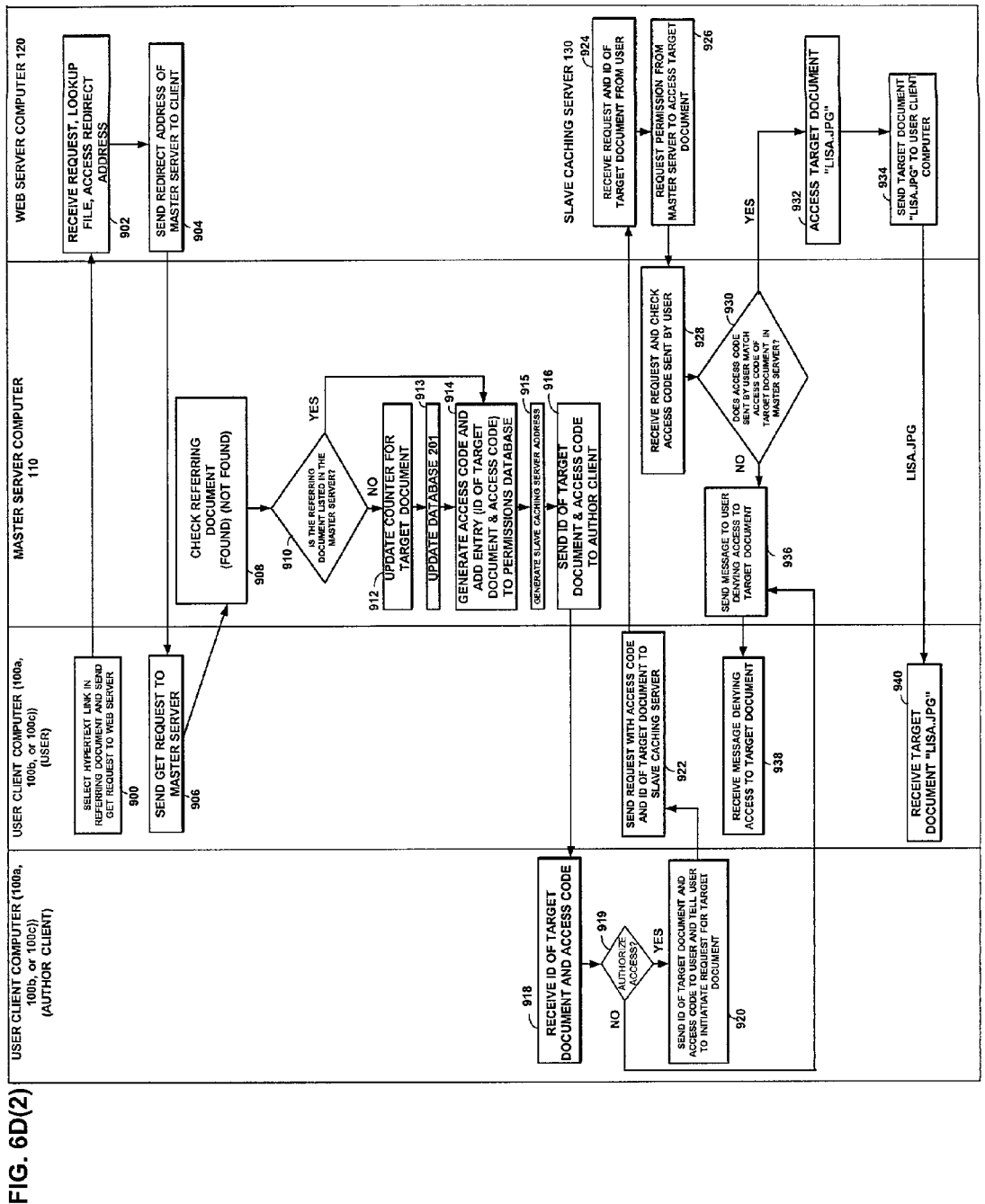
FIG. 6D(2)

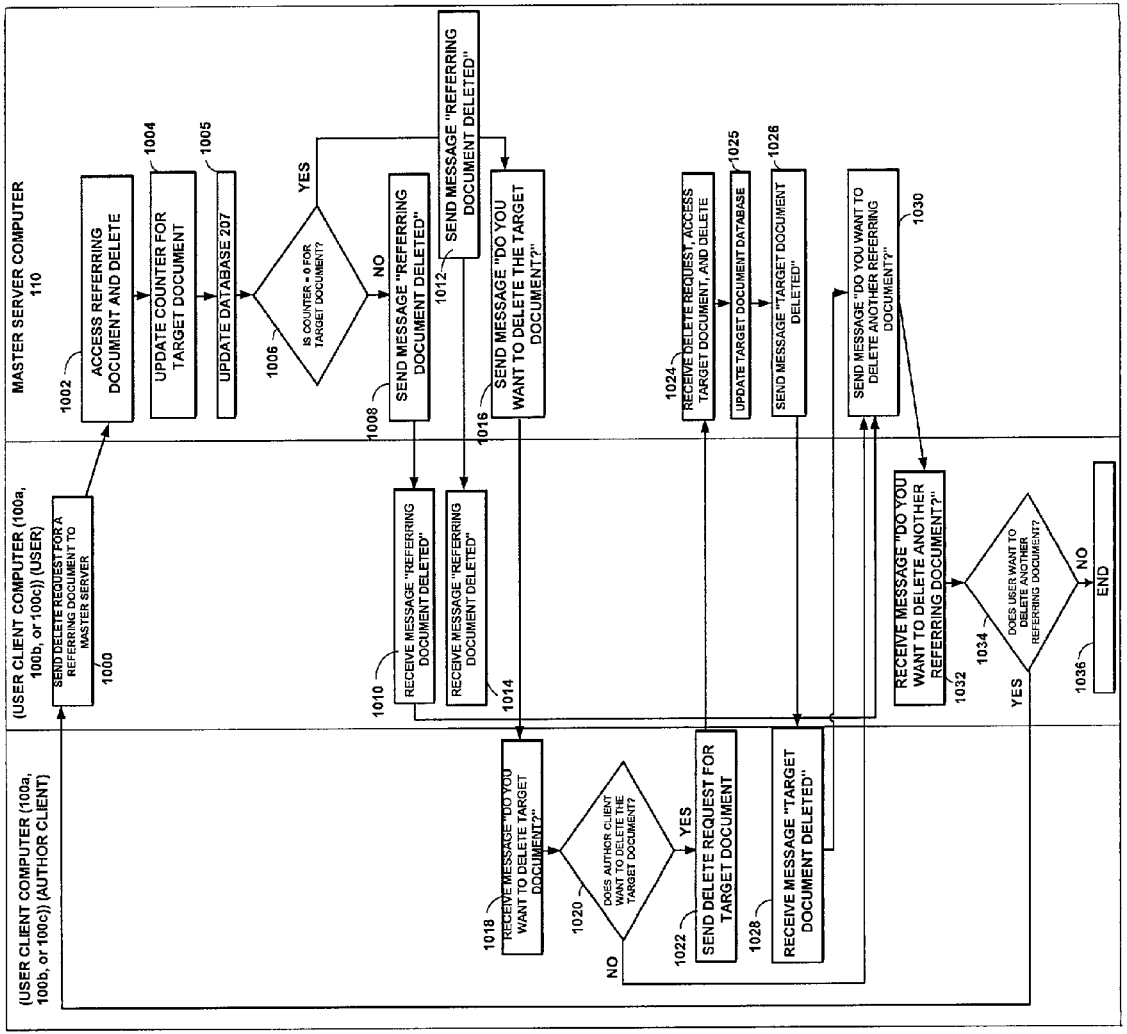
FIG. 7A(1)

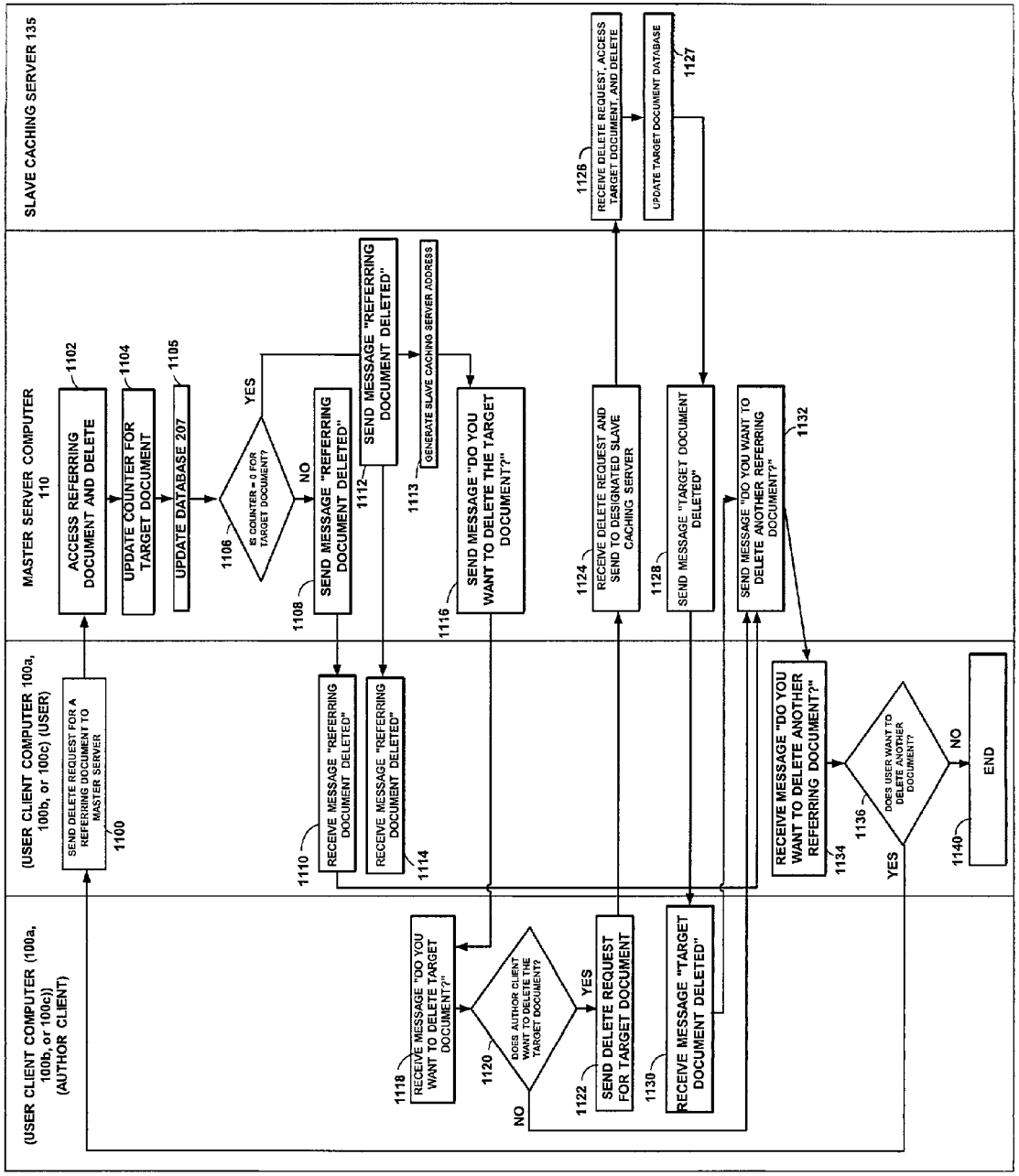
FIG. 7B(1)

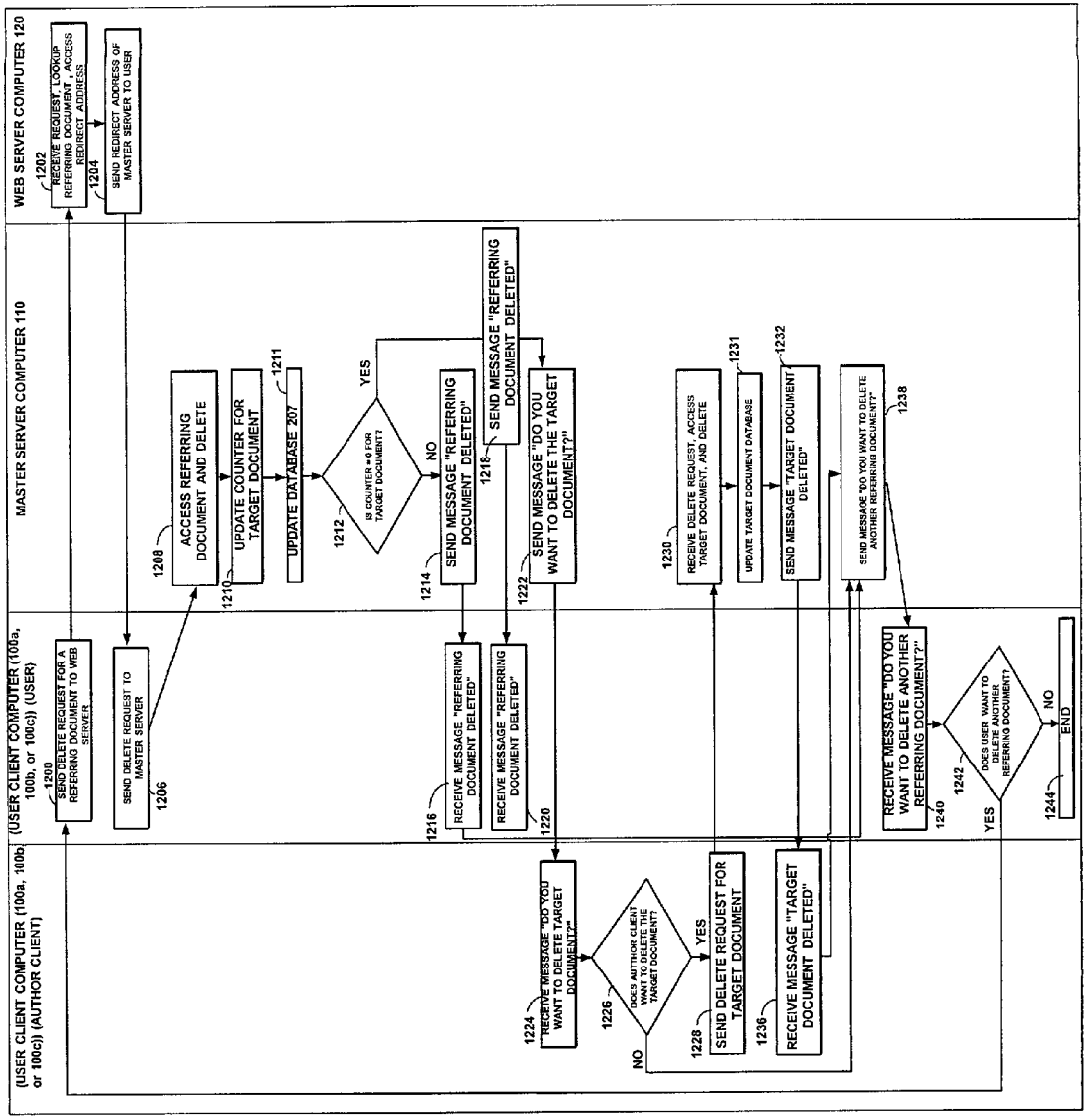
FIG. 7C(1)

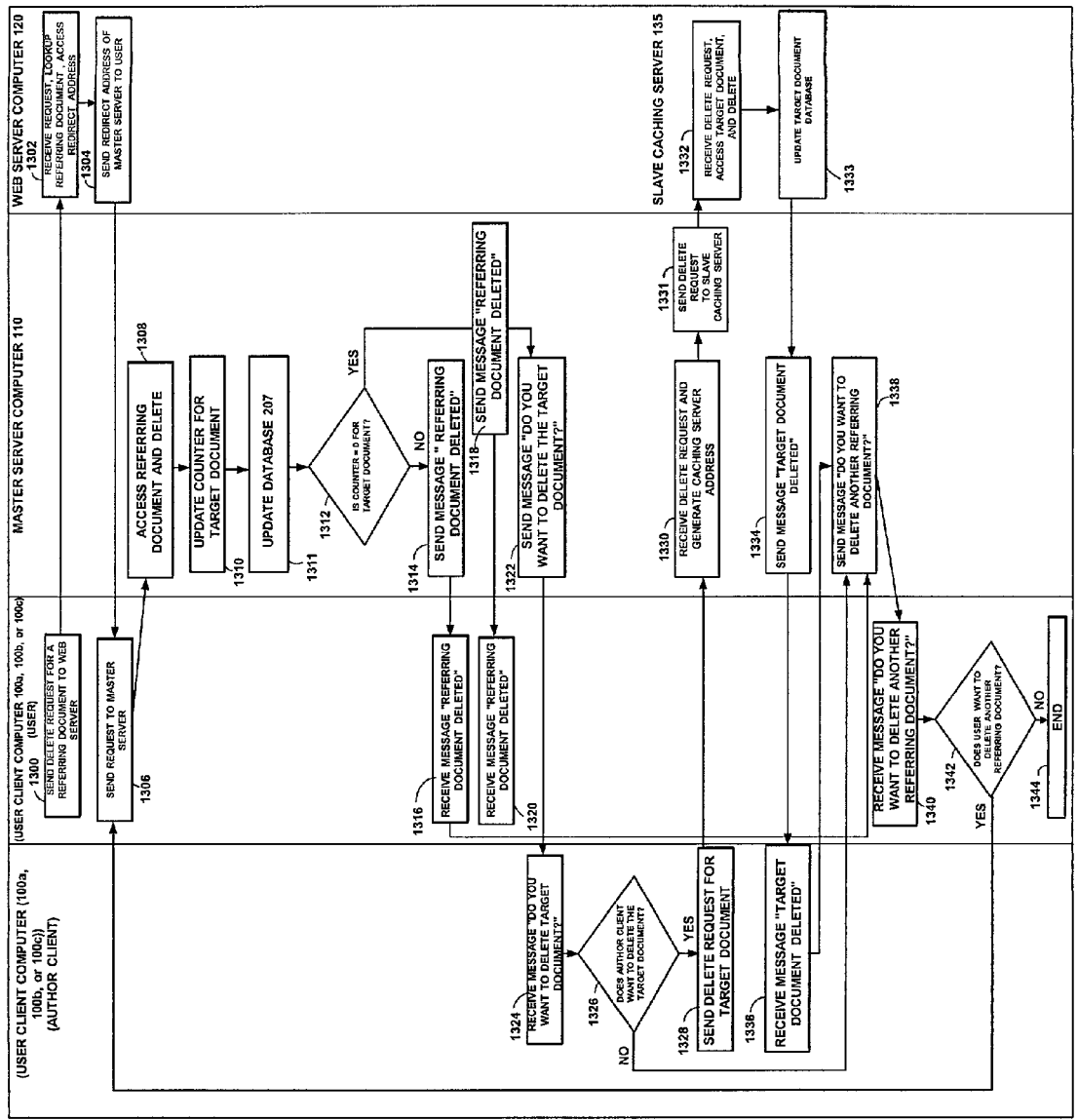
FIG. 7D(1)

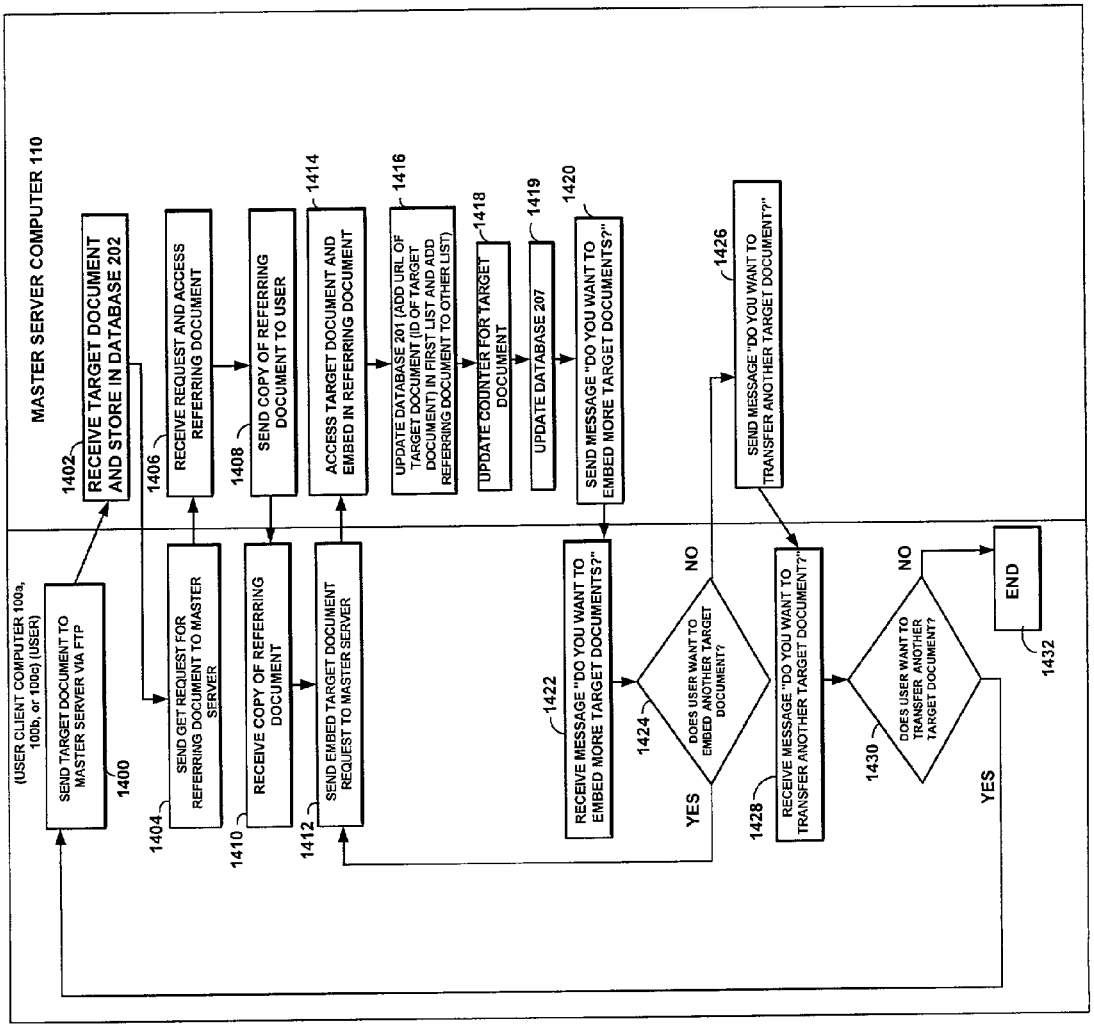
FIG. 8A(1)

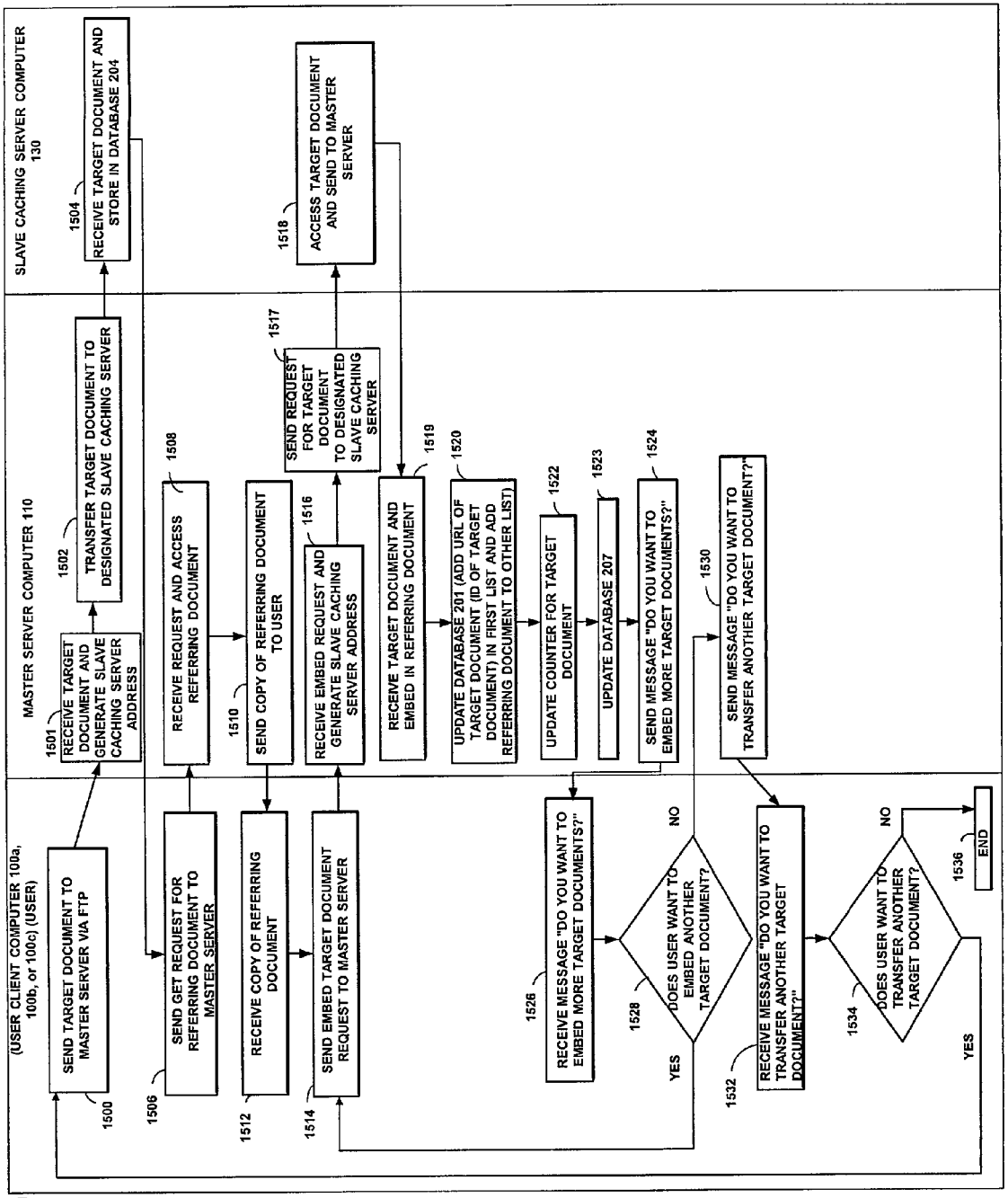
FIG. 8B(1)

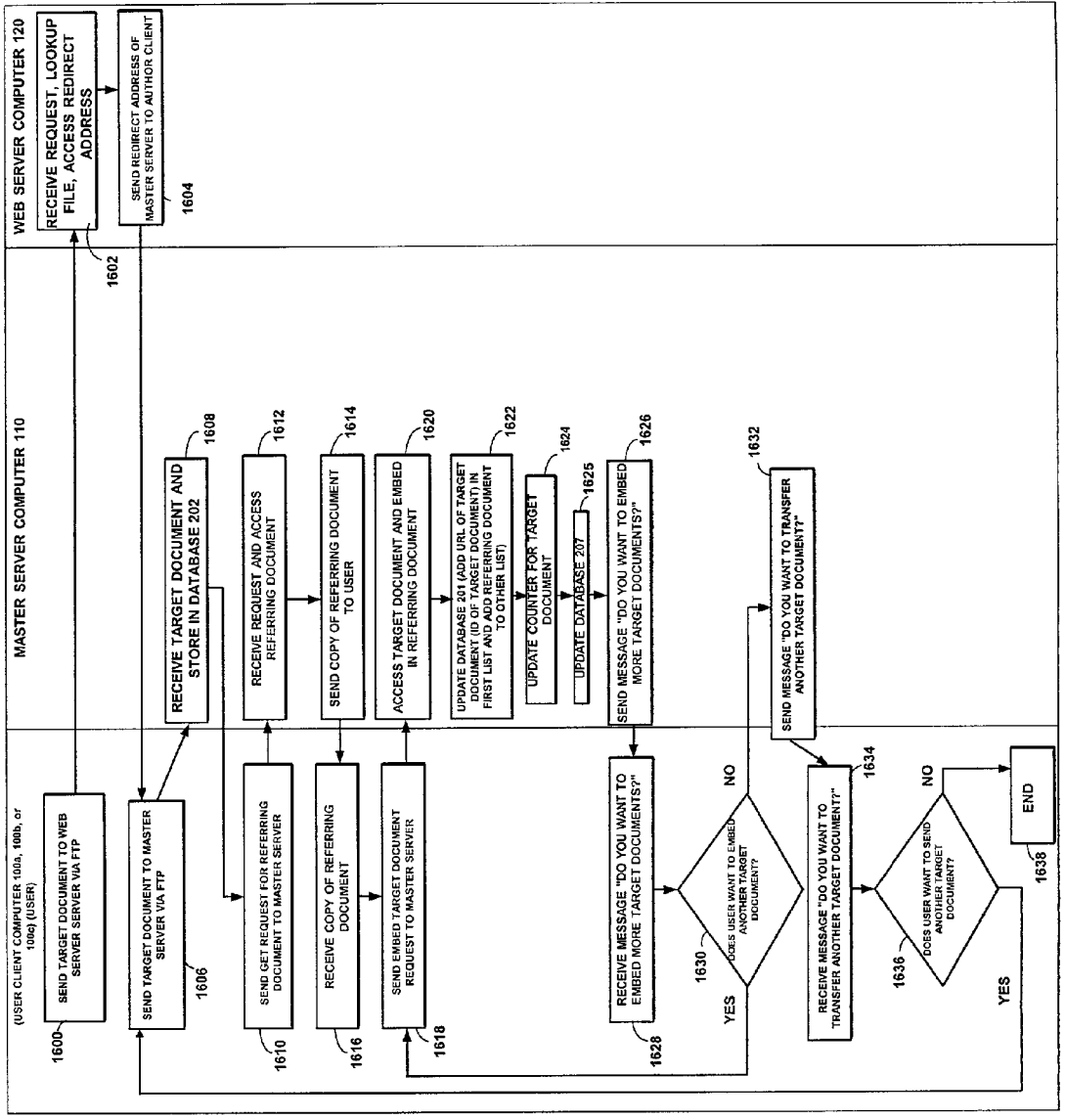
FIG. 8C(1)

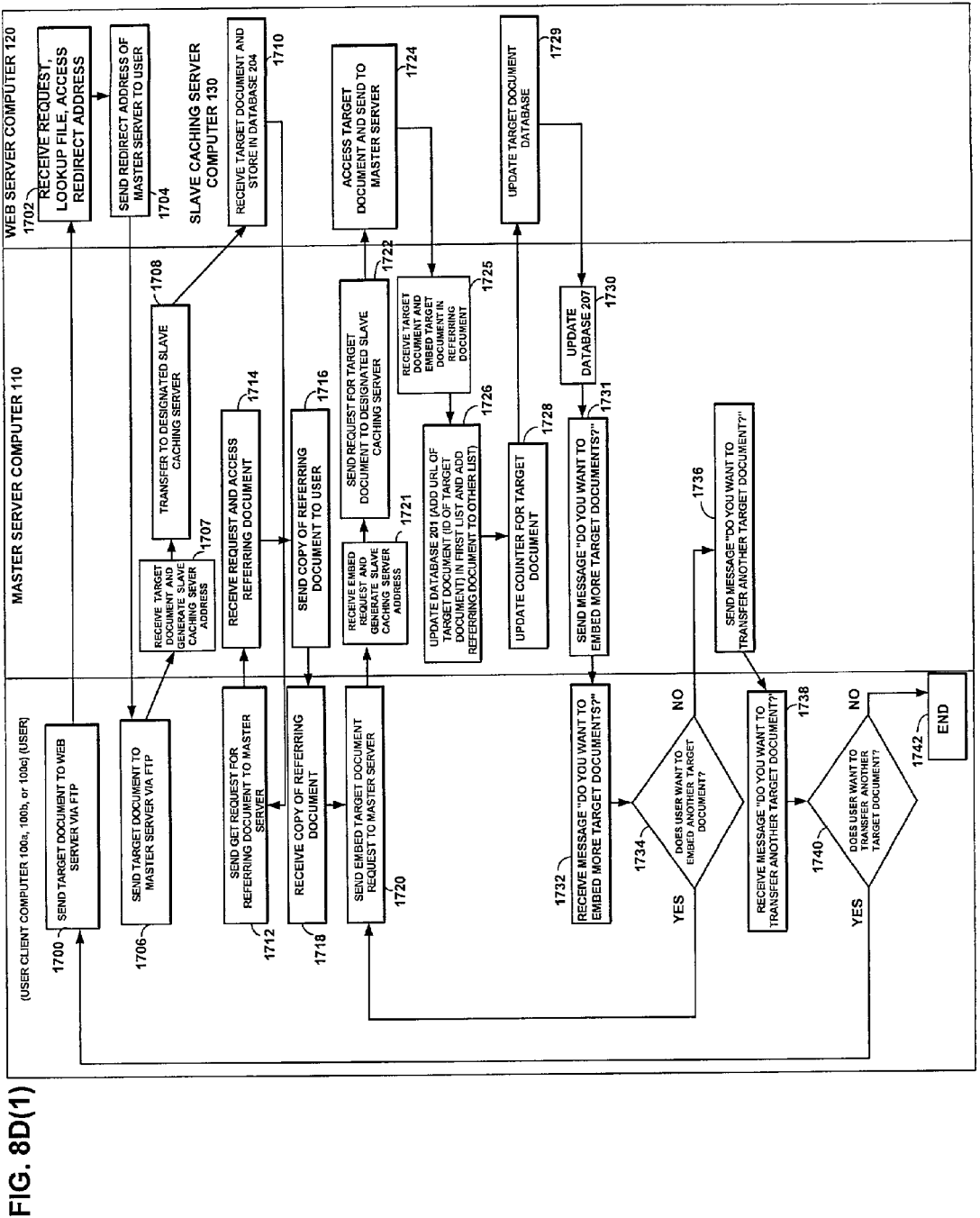
FIG. 8D(1)

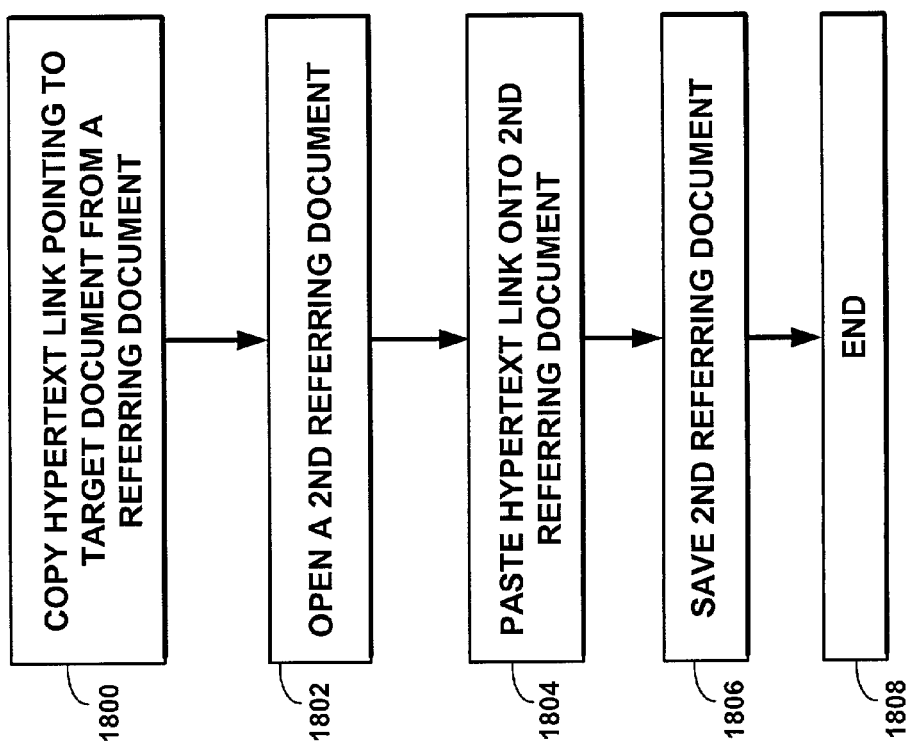

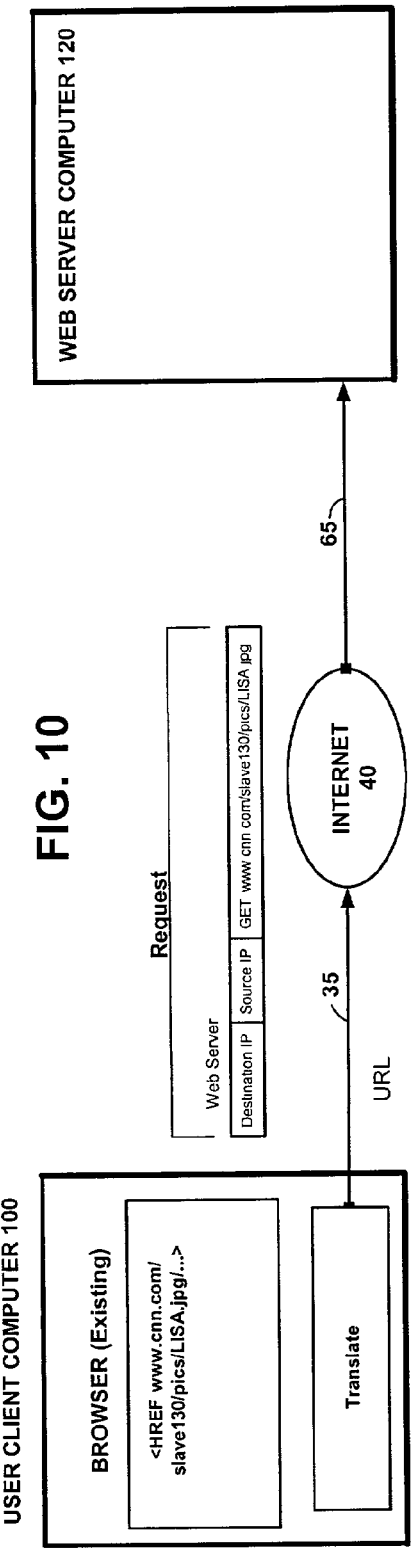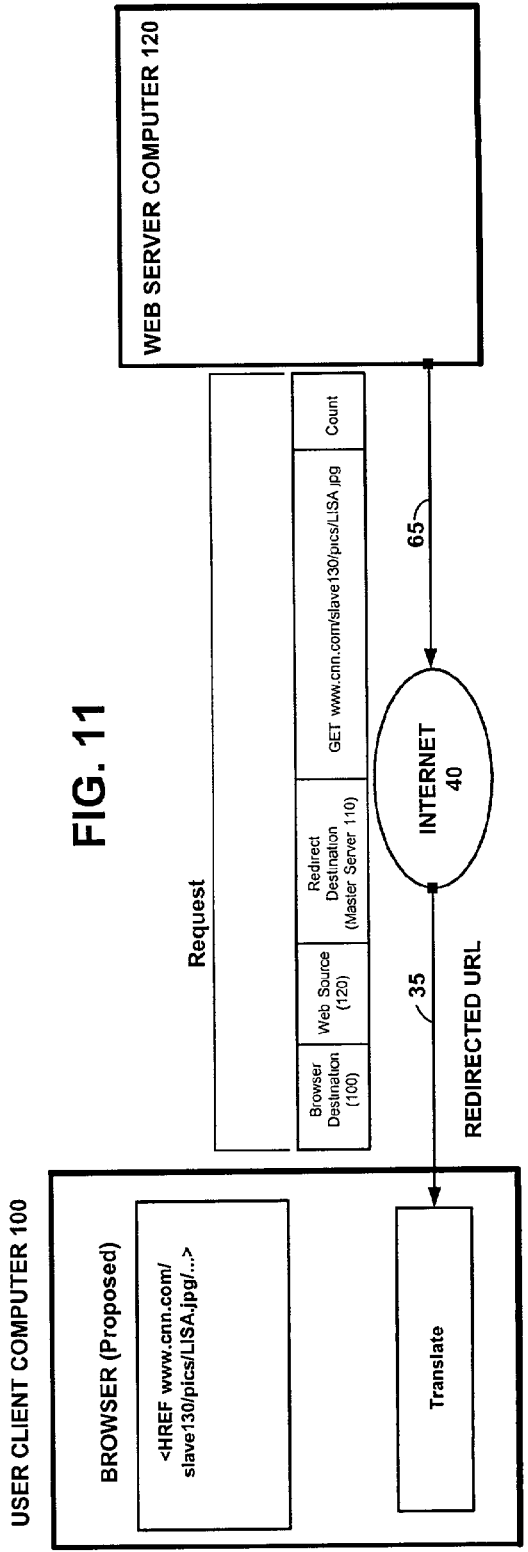

LATCHES-LINKS AS VIRTUAL ATTACHMENTS IN DOCUMENTS

BACKGROUND OF THE INVENTION

1. Field of the Invention

This invention relates generally to a method and system for managing target files linked to referring documents and, more particularly, to a system and method for viewing, embedding, providing security for, and deleting target files referred to by referring documents.

2. Description of Related Art

There are three common ways to incorporate data into a document, as an attachment, as a link, or by embedding the data in the document. Embeds are essentially the same as attachments. A file that is attached to a document becomes a part of that document. The attached file inherits all the services, such as security, available to its host document.

A special type of server computer configuration designed to enhance the support of large attachments is called Single-Copy-Object-Store. Using Single-Copy-Object-Store, an attachment in a document, such as a mail document (hereinafter "referring document"), becomes a pointer to a target document in a server computer where a receiving database resides. One example of a receiving database is a mail.nsf database. From user's perspective the attachment (target document) behaves as if it were a true attachment. But, storage requirements are ameliorated if the attachment is sent to many users serviced by the same server computer, because only a single copy of the attachment is stored.

However, there is not an efficient method or system in the prior art for managing target documents and referring documents to conserve memory in server computers that contain referring documents and target documents, for example, by deleting unneeded documents. Further, there is no system and method in the prior art for effectively providing security for target documents referred to in referring documents.

In light of the above-mentioned disadvantages, there is an apparent need for a system and method for providing security for target files referred to by referring documents. Further, there is a need for a system and method for managing target files referred to by referring documents, which enables a target document to be deleted when the target document is no longer linked to any referring documents.

SUMMARY OF THE INVENTION

The present invention overcomes the above-mentioned disadvantages.

One aspect of the present invention provides a system and method of managing target files referred to by referring documents.

Another aspect of the present invention provides a system and method of providing security for target files referred to by referring documents.

A further aspect of the present invention is to provide a system and method that deletes a target document when there are no longer any referring documents having links to the target document.

Yet another aspect of the present invention is to provide a system and method of managing target documents linked to referring documents, which are stored on a master server.

Another aspect of the present invention is to provide a system and method for managing target documents linked to referring documents, which are stored on a user client computer.

Another aspect of the present invention is to provide a system and method for managing target documents linked to referring documents sent by a user client computer to other user client computers.

Yet another aspect of the present invention is to provide a system and method for providing security, which only allows a user to view a target document if authorization is granted by an author client.

These aspects and other objects, features, and advantages of the present invention are described in the following detailed description of the invention which is to be read in conjunction with the accompanying drawings.

A first aspect of the present invention is a system and method for managing target documents referred to by referring documents. Initially, there are many referring documents in a network that refer to a particular target document. When a user wants to delete his copy of a referring document, the user sends a delete request for the referring document from a user client computer to a master server computer. The process then flows to a step where the master server computer accesses and deletes the referring document.

Next, the master server computer updates a counter for a target document, the target document being a document that is hypertext linked to the referring document. Next, the master server computer updates a database, which contained the deleted referring document. The master server computer then determines in a determining step whether the count for the counter of the target document equals zero. If the counter for the target document is not equal to zero, the master server computer sends a message to the user indicating that the referring document has been deleted. The process then flows to a step where the user receives the message. The process then flows to a step, where the master server computer sends a message to the user asking whether the user wants to delete another referring document. The process then flows to a step where the user receives the message. The process then flows to a determining step where it is determined whether the user wants to delete another referring document. If the user wants to delete another referring document the process goes back to the initial process step, and the user sends another delete request for a referring document.

If the counter for the target document equals zero, the master server computer sends a message to the user indicating that the referring document has been deleted. The process then flows to a step where the master server computer sends a message to an author of the target document (author client) asking whether the author client wants to delete the target document. The process then flows to a step where the author client receives the message. The process then flows to a determining step, where the author client decides whether to delete the target document. If the author client chooses to delete the target document, the process flows to a step, where the author client sends a delete request for the target document to the master server computer. The process then flows to a step where the master server computer receives the delete request, accesses the target document, and deletes the target document. Next, the master server computer updates the target document database. Then the master server computer sends to the author client, a message indicating that the target document has been deleted. The author client receives the message and the process flows to a step, where the master server computer sends a message to the user asking whether the user wants to delete another referring document. If the user wants to delete another referring document, the process then flows back to the initial process step where the user sends another delete request for a referring document. Alternatively, if the user does not want to delete another referring document the process ends.

These and other objects, features and advantages of the present are described in the following detailed description of the invention which is to be read in conjunction with the accompanying drawings.

BRIEF DESCRIPTION OF THE DRAWINGS

FIG. 2A(1) is a schematic diagram illustrating the storage architecture of a user client computer and a master server computer in a first embodiment of the present invention.

FIG. 2A(2) is a schematic diagram illustrating the storage architecture of a user client computer and the master server computer of FIG. 2A(1), which provides security for a target document, which is referred to in a referring document.

FIG. 2B(1) is a schematic diagram illustrating the storage architecture of a user client computer, a master server computer, and a plurality of slave caching server computers in a second embodiment of the present invention.

FIG. 2B(2) is a schematic diagram illustrating the storage architecture of the user client computer, the master server computer, and the slave caching server computers of FIG. 2B(1), which provide security for a target document, which are referred to in a referring document.

FIG. 2C(1) is a schematic diagram illustrating the storage architecture of a user client computer, a master server computer, and a web server computer in a third embodiment of the present invention.

FIG. 2C(2) is a schematic diagram illustrating the storage architecture of the user client computer, the master server computer, and the web server computer of FIG. 2C(1), which provide security for a target document referred to in a referring document.

FIG. 2D(1) is a schematic diagram illustrating the storage architecture of a user client computer 100, a master server computer 110, a web server computer 120, and a plurality of slave caching server computers (130, 135) in a fourth embodiment of the present invention.

FIG. 2D(2) is a schematic diagram illustrating the storage architecture of the user client computer, the master server computer, the web server computer, and the slave caching server computers of FIG. 2D(1), which provide security for a target document referred to in a referring document.

FIG. 3A(1) is a schematic diagram illustrating databases in the master server computer for the storage architectures of FIG. 2A(1) and FIG. 2C(1), with hyper-linked target documents created from a file.

FIG. 3A(2) is a schematic diagram illustrating databases in the master server computer for the storage architectures of FIG. 2A(2) and FIG. 2C(2), with hyper-linked target documents created from a file.

FIG. 3B(1) is a schematic diagram illustrating databases in the master server computer for the storage architectures of FIG. 2B(1) and FIG. 2D(1), with hyper-linked target documents created from a file.

FIG. 3B(2) is a schematic diagram illustrating databases in the master server computer for the storage architecture of FIG. 2B(2) and FIG. 2D(2), with hyper-linked target documents created from a file.

FIG. 3C(1) is a schematic diagram illustrating databases in the master server computer for the storage architecture of FIG. 2A(1) and FIG. 2C(1), with hyper-linked target documents sent from a user client computer to another user client computer.

FIG. 3C(2) is a schematic diagram illustrating databases in the master server computer for the storage architectures of FIG. 2A(2) and FIG. 2C(2), with hyper-linked target documents sent from a user client computer to another user client computer.

FIG. 3C(3) is a schematic diagram illustrating databases in the master server computer for the storage architectures of FIG. 2B(1) and FIG. 2D(1), with hyper-linked target documents sent from a user client computer to another user client computer.

FIG. 3C(4) is a schematic diagram illustrating databases in the master server computer for storage architectures of FIG. 2B(2) and FIG. 2D(2), with hyper-linked target documents sent from a user client computer to another user client computer.

FIG. 6A(1) is a network operation diagram illustrating the sequence of operational steps carried out by a user client computer and a master server computer in viewing target files referred to in referring documents for storage architecture shown in FIG. 2A(1).

FIG. 6A(2) is a network operation diagram illustrating the sequence of operational steps carried out by an author client, a user, and a master server computer in viewing target files referred to in referring documents having security, for the storage architecture shown in FIG. 2A(2).

FIG. 6B(1) is a network operation diagram illustrating the sequence of operational steps carried out by a user client computer, a master server computer, and a slave caching server in viewing target files referred to in referring documents for the storage architecture shown in FIG. 2B(1).

FIG. 6B(2) is a network operation diagram illustrating the sequence of operational steps carried out by an author client, a user, a master server computer, and a slave caching server computer in viewing target files referred to in referring documents having security, for the storage architecture shown in FIG. 2B(2).

FIG. 6C(1) is a network operation diagram illustrating the sequence of operational steps carried out by a user client computer, a master server computer, and a web server computer in viewing target files referred to in referring documents for the storage architecture shown in FIG. 2C(1).

FIG. 6C(2) is a network operation diagram illustrating the sequence of operational steps carried out by an author client, a user, a master server computer, and a web server computer in viewing target files referred to in referring documents having security, for the storage architecture shown in FIG. 2C(2).

FIG. 6D(1) is a network operation diagram illustrating the sequence of operational steps carried out by a user client computer, a master server computer, a web server computer, and a slave caching server computer in viewing target files referred to in referring documents for the storage architecture shown in FIG. 2D(1).

FIG. 6D(2) is a network operation diagram illustrating the sequence of operational steps carried out by an author client, a user, a master server computer, a web server computer, and a slave caching server computer in viewing target files referred to in referring documents having security, for the storage architecture shown in FIG. 2D(2).

FIG. 7A(1) is a network operation diagram illustrating the sequence of operational steps carried out by an author client, a user, and a master server computer in deleting target files/referring documents for the storage architectures shown in FIG. 2A(1) and FIG. 2A(2).

FIG. 7B(1) is a network operation diagram illustrating the sequence of operational steps carried out by an author client, a user, a master server computer, and a slave caching server in deleting target files/referring documents for the storage architectures shown in FIG. 2B(1) and FIG. 2B(2).

FIG. 7C(1) is a network operation diagram illustrating the sequence of operational steps carried out by an author client, a user, a master server computer, and a web server computer in deleting target files/referring documents for the storage architectures shown in FIG. 2C(1) and FIG. 2C(2).

FIG. 7D(1) is a network operation diagram illustrating the sequence of operational steps carried out by an author client, a user, a master server computer, a web server computer, and a slave caching server computer in deleting target files/referring documents for the storage architectures shown in FIG. 2D(1) and FIG. 2D(2).

FIG. 8A(1) is a network operation diagram illustrating the sequence of operational steps carried out by a user client computer and a master server computer in creating a hypertext link between a target file and a referring document for the storage architectures shown in FIG. 2A(1) and FIG. 2A(2).

FIG. 8B(1) is a network operation diagram illustrating the sequence of operational steps carried out by a user client computer, a master server computer, and a slave caching server in creating a hypertext link between a target file and a referring documents for the storage architectures shown in FIG. 2B(1) and FIG. 2B(2).

FIG. 8C(1) is a network operation diagram illustrating the sequence of operational steps carried out by a user client computer, a master server computer, and a web server computer in creating a hypertext link between a target file and a referring document for the storage architectures shown in FIG. 2C(1) and FIG. 2C(2).

FIG. 8D(1) is a network operation diagram illustrating the sequence of operational steps carried out by a user client computer, a master server computer, a web server computer, and a slave caching server computer in creating a hypertext link between a target file and a referring document for the storage architectures shown in FIG. 2D(1) and FIG. 2D(2).

FIG. 9 is a diagram illustrating a sequence of method steps for a method for creating a hypertext link between a target file and a referring document by copying and pasting a hypertext link onto a referring document and saving the referring document.

FIG. 10 is a diagram illustrating an exemplary get request sent from a user client computer to a web server computer.

FIG. 11 is a diagram illustrating an exemplary redirected address sent from a web server computer to a user client computer.

DETAILED DESCRIPTION

Figure 1A:
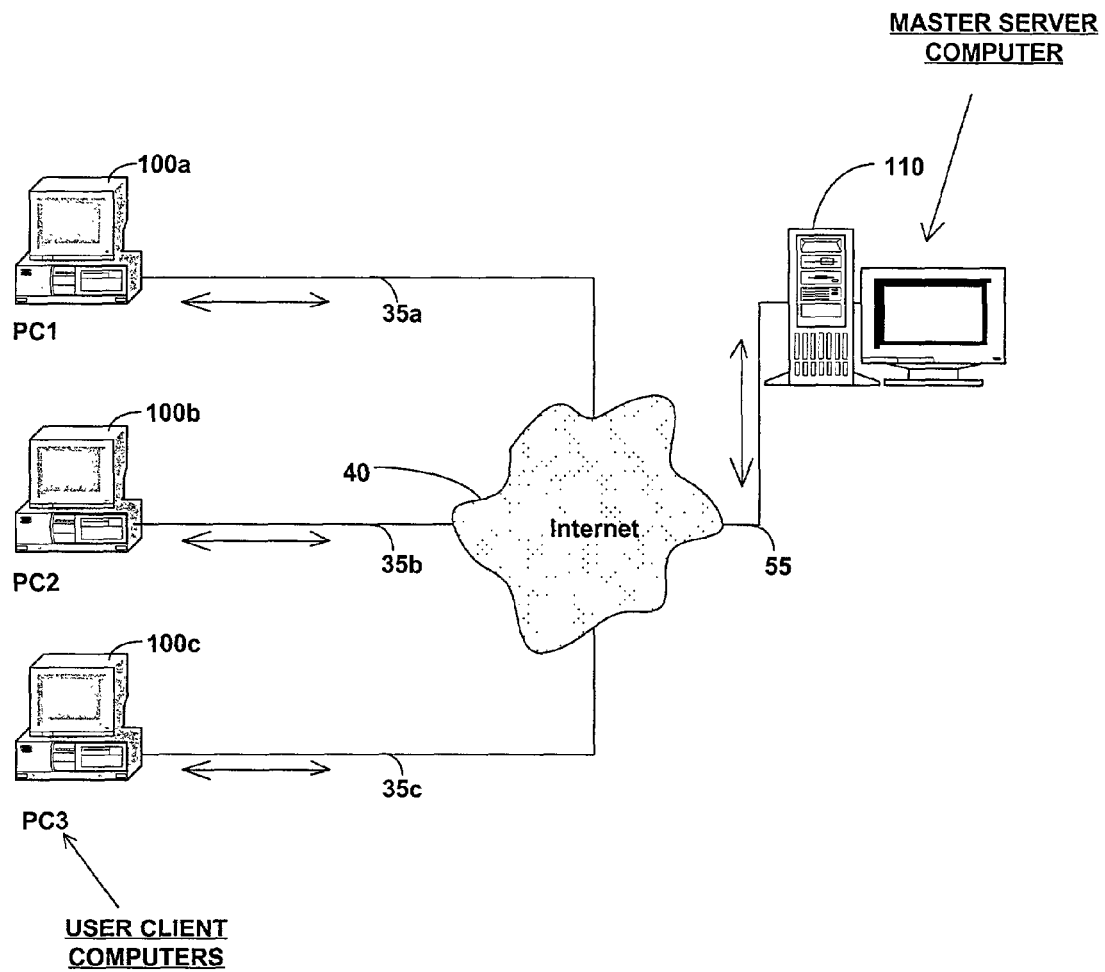
FIG. 1A is a network diagram illustrating the relationship between a plurality of user client computers and a master server computer as they are interconnected over a network.

A "latch" has all the characteristics of an attachment. To clarify how a latch works, we use an example of a network with master client-server pairs, which are serviced by slave caching server computer pairs. In this example there is a master server with both software application clients and browser clients. Further, there is a slave caching server computer. In this example, the master client-server pair has has a standard HTTP server computer for serving a standard browser and a slave caching server computer for servicing different requirements, such as IPIX. Latches can be employed in simple or complex network configurations having combinations of web server computers, user computers, master server computers, and slave caching server computers.

A latch is a link in a document, which is usually stored in a master server computer. As mentioned above, a latch has all of the characteristics of an attachment. The document containing the link is called a "referring document". A "target document" is a document linked to a referring document and is not part of the referring document. Rather, a link to the target document is contained in the referring document. The server computer that stores the target document handles all rights management for the target. Rights management to the link, of course, is that of the referring document containing the link.

When a server computer acts as a slave caching server computer for a master server computer and latches are used, two special databases are usually stored in the master server computer. These databases are: 1) an Owners database and 2) a Permissions database. The Owners database comprises entries (documents) each having two fields. The first field contains a pointer (usually a URL address) to a file (target) in the slave caching server computer. The second field contains a list of names of documents in the master server computer, which contain a latch pointing to the target document (link of the first entry). These documents are the "referring documents". The Permissions database contains dynamically updated entries, each having two fields. The first entries contain links to a target file in the slave caching server computer. The second entries contain random numbers representing access codes, which must be entered for a user to view each target document.

Whenever either a link (latch) is deleted from a referring document or a referring document containing a link is deleted, the master server computer containing the referring document deletes that referring document's name from the list of documents in the second field of the database in the master server computer. The entries in the list are also referred to as IDs of target documents. When such action deletes the very last document name from the second field, the entire entry in the Owners database and the target document in the slave caching server computer are automatically or selectively deleted. Note, the name of the same referring document may appear several times in a list.

This will occur when several links pointing to the same target document are embedded into a single referring document. Whenever a link is deleted, one entry from the list will also be deleted. If a referring document is deleted, all the listings for the deleted referring document will also be deleted. Thus, care is taken in handling deletions of referring documents containing links under Single-Copy-Object-Store, so that when one receiver deletes a referring document, others still have access to the target document, until all users with access to the target document have deleted the referring documents.

There are two ways to create a link (latch) in a referring document, from a file or from another link. Creating a link from a file involves moving that file (typically via FTP) to the server computer on which it is to be stored, which also updates entries in the Owners database. The first update being the URL address of the transferred file in the server computer and second update is the name of the referring document into which the link will be embedded. Then, the user embeds the link in the referring document.

Alternatively, if a user wants to create a hypertext link in a referring document already containing a link to a target document, the user simply copies and pastes the link using APIs. The paste process (actually the save document after the paste) adds the name of the referring document to the list in the Owners database to update the database.

One practical use for target documents linked in referring documents is in the Domino application called "Learning Space." Learning space comprises web-based courses enriched with audio and video. The Learning Space database comprises documents that make up the courses. A new database called Learning Space Media is first created. This database contains the metadata for the media files, which are or could be used by Learning Space. This database comprises documents with fields of various metadata descriptions. Further, one field has a link (latch) pointing to the media data stored on a server computer. Posting new media files for use in Learning Space involves creating a document in the Learning Space Media database containing the metadata in the appropriate fields and linking from a file, the media file to the appropriate field in the new document. A course creator can browse the Learning Space Media database using Notes search on the metadata and latch view of the media content. If she wants to utilize a target document in a referring document (publish) in a course in Learning Space, she can copy the link in the Learning Space Media database and paste it in the appropriate field.

The Learning Space administrator may wish that all media used in Learning Space first be posted. That is, latched onto the Learning Space Media database and then published as links (latches) in Learning Space documents using the copy and paste procedure. An author can link directly from a file, but this would not add to the Learning Space Media database. This would make the file difficult to use, for example, difficult to be searched by other authors in Learning Space.

Another practical example for the use of target documents linked to referring documents is in Notes mail containing links. A user sending a mail document can link video from a referring document. First, the video file is FTP'ed from a user computer to a server computer in which it will be stored. The user then sends out the mail document and the link. When the mail document is sent, the Owners Database is updated to include the video file's URL storage address and the list of names of mail documents corresponding to all recipients of the mail document. If the mail system is set to automatically save the sent mail document, then the name of the sent document in the sender's server is also added to the list in a database "mailmedia.nsf." If the user decides to save the sent document after a prompt, then the name of the sent document in the sender's server is also added to the list in mailmedia.nsf.

In another embodiment, only a mail document itself is sent to a recipient. When a recipient wants to view the target file, it will be streamed from the sender's slave caching server computer. Security can be implemented to the target document by relegation of access authorization. A slave server can relegate access authorization to a master server computer if (1) it can pass user data between an author client and the master server computer and (2) if it can relegate access authorization to the master server computer. Condition (1) can be met if either the author client can send data to a user having a referring document, who in turn can send it to the master server computer, or if the master server computer can send data to the slave caching server, which then sends it via a private channel to the client of the master server. Security can be implemented to the viewing, launching or detaching of links (latches).

Referring to FIG. 1A, a network diagram illustrates the relationship between a plurality of user client computers 100a, 100b and 100c, and a master server computer 110 as they are interconnected a network 40. User client computers (100a, 100b, and 100c) are typically personal computers, which operate on a Microsoft Windows NT or a Unix operating system. Master server computer 110 is typically a workstation equipped with video cards, sound cards, and a Microsoft Windows NT or Unix operating system. However, a personal computer is also suitable for use as a master server computer. FIG. 1A shows master server computer 110 connected to user client computers (100a, 100b, and 100c) over network 40, which is the Internet. User client computer 100a is shown connected to network 40 using a connector 35a. User computer 100b is shown connected to network 40 using a connector 35b. User computer 100c is shown connected to network 40 using a connector 35c.

Master server computer 110 is shown connected to network 40 using a connector 55. As shown, master server computer 110 is connected over network 40 to user client computers (100a, 100b, and 100c) over the Internet. However, connection between master server computer 110 and user client computers (100a, 100b, and 100c) can be made over a local area network (LAN), a wireless network, or connection using direct connectors. The type of connection to be used between master server computer 110 and user client computers (100a, 100b, and 100c) should be selected according to the type of data sent between master server computer 110 and user client computers (100a, 100b, 100c) and the total band width of the data sent. For FIGS. 1B, 1C, and 1D, user client computers (100a, 100b, and 100c) are also typically personal computers, which operate on a Microsoft Windows NT or a Unix operating system. Similarly, master server computer 110, web server computer 120, and slave caching server computers (130, 135) are typically work stations equipped with video cards, sound cards, and Microsoft windows NT or Unix operating systems, but can be suitably replaced by personal computers. Thus, detailed description for the individual components of FIGS. 1B, 1C, and 1D is omitted below.

Figure 1B:
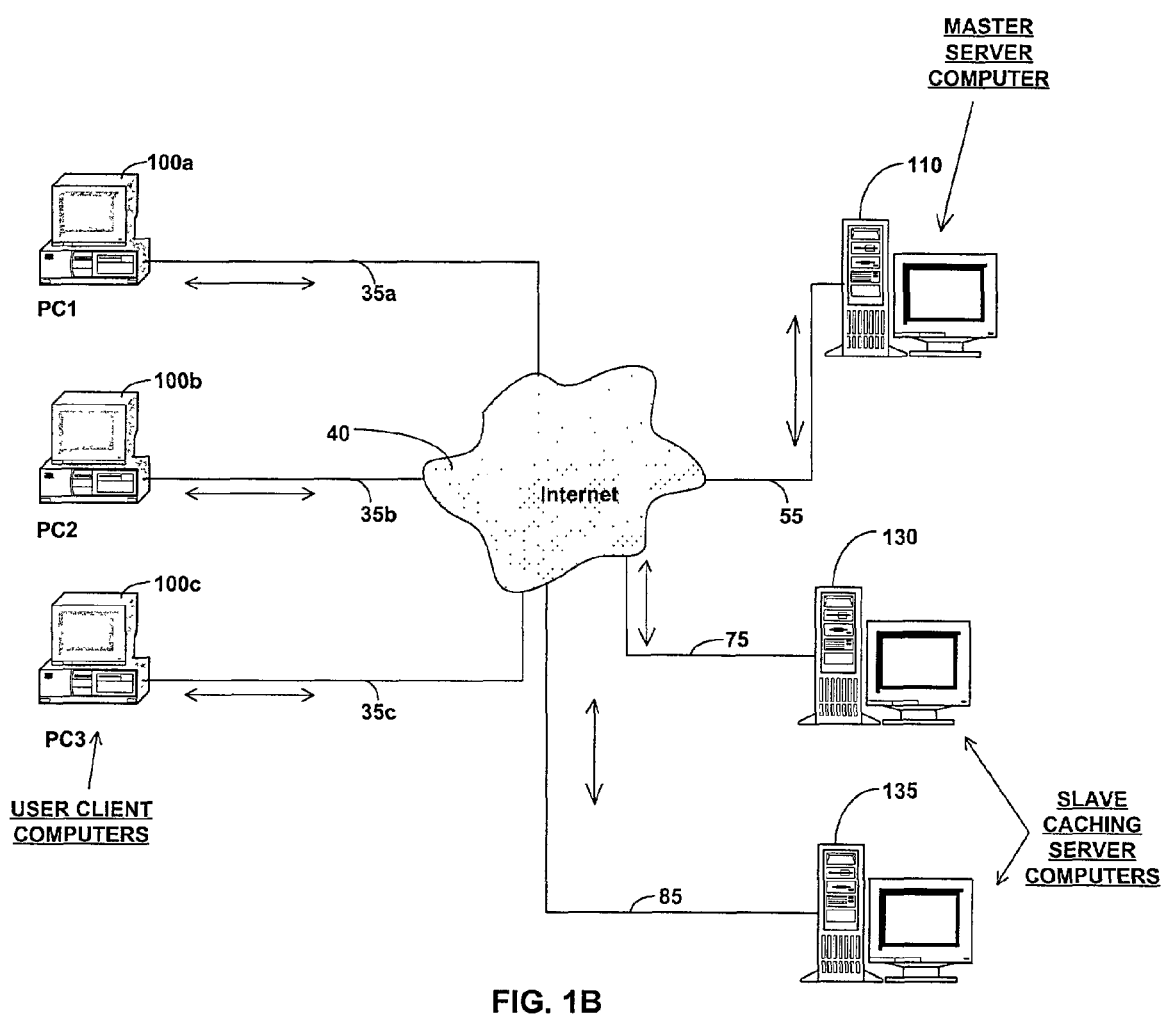
FIG. 1B is a network diagram illustrating the relationship between the plurality of user client computers is a master server computer and slave caching servers as they are interconnected over a network.

Referring to FIG. 1B, a network diagram illustrates the relationship between a plurality of user client computers (100a, 100b, and 100c), a master server computer 110, and slave caching servers (130, 135) as they are interconnected over a network 40. In this second embodiment, master server computer 110 and slave cashing server computers (130, 135) are shown connected over network 40, which is the Internet, to user client computers (100a, 100b, and 100c). User client computer 100a is shown connected to network 40 using connector 35a. User client computer 100b is shown connected to network 40 using connector 35b. User client computer 100c is shown connected to network 40 using connector 35c. Master server computer 110 is shown connected to network 40 using a connector 55. Slave cashing server 130 is shown connected to network 40 using a connector 75. Slave cashing server 135 is shown connected to network 40 using a connector 85.

However, there are multiple alternative network configurations that are suitable for the present invention. For example, user client computers (100a, 100b, and 100c), master server computer 110, and slave cashing server computers (130, 135) can be interconnected over a local area network (LAN), a wireless network, or directly connect to one another. Alternatively, different combinations of the aforementioned network configurations can be used to connect master computer 110 to slave cashing server computers (130, 135) and user client computers (100a, 100b, and 100c). As mentioned above, the type of connections to be used should be selected according to the type of data sent and the total bandwidth of the data sent.

Figure 1C:
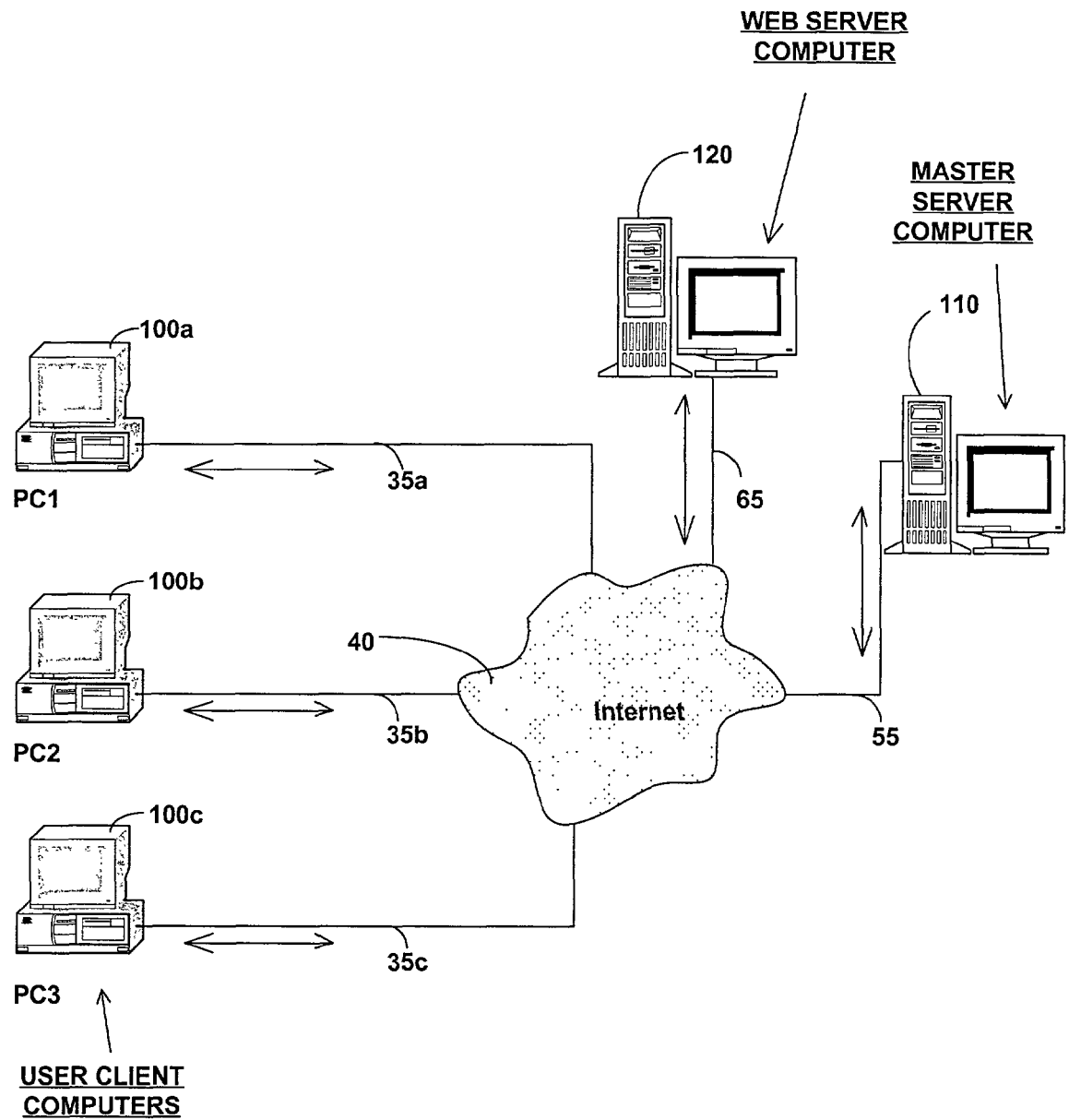
FIG. 1C is a network diagram illustrating the relationship between a plurality of user client computers, a master server computer, and a web server computer as they are interconnected over a network.
Figure 1D:
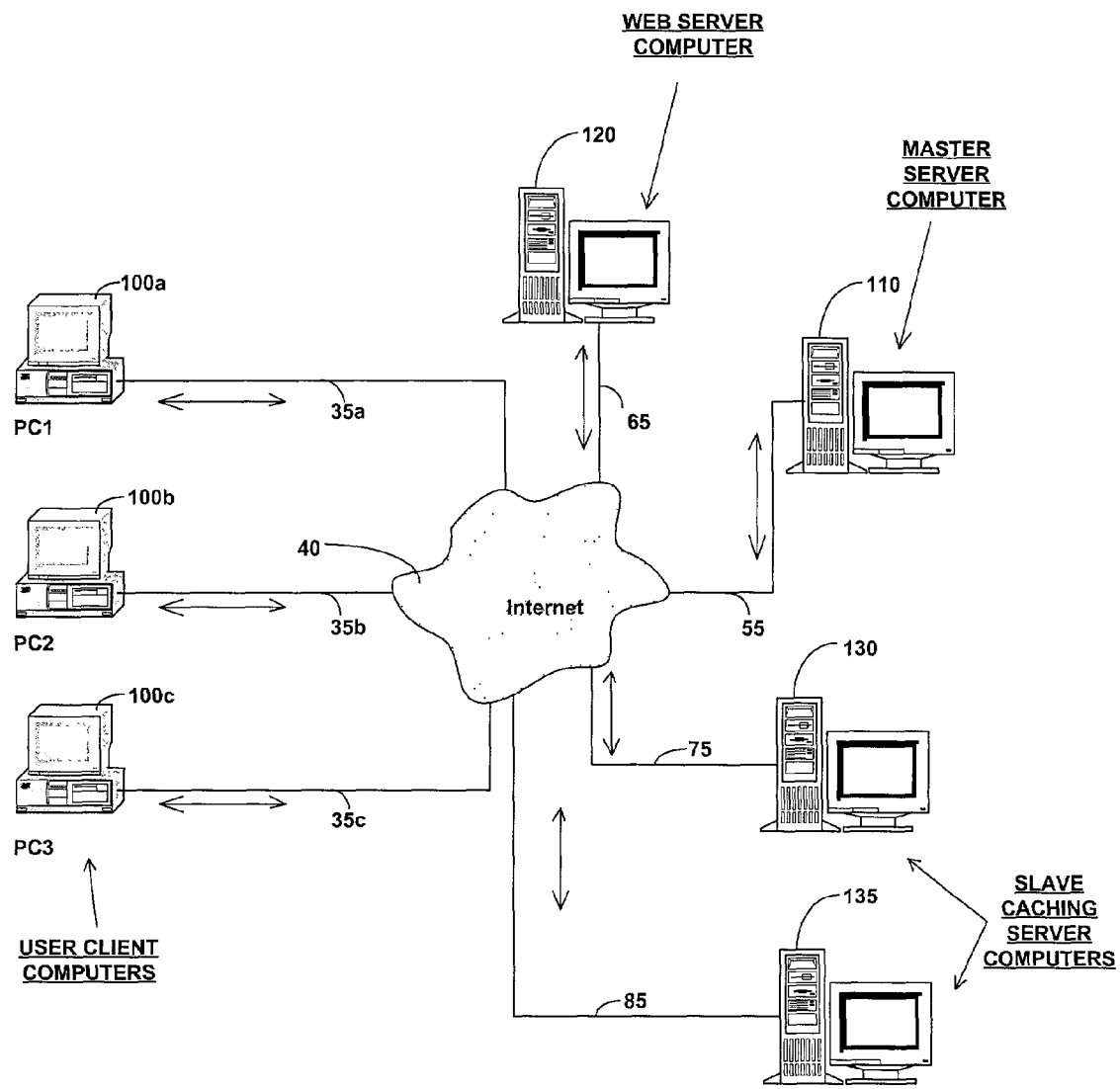
FIG. 1D is a network diagram illustrating the relationship between a plurality of user client computers, a master server computer, a web server computer, and slave caching servers as they are interconnected over a network.

Referring to FIG. 1C, a network diagram illustrates the relationship between a plurality of user client computers (100a, 100b, and 100c), a master server computer 110, and a web server computer 120, as they are interconnected over a network 40. In this third embodiment, master server computer 110 and web server computer 120 are shown connected to user client computers (100a, 100b, and 100c) over network 40, which is the Internet. User client computer 100a is shown connected to network 40 using a connector 35a. User client computer 100b is shown connected to network 40 using a connector 35b. User client computer 100c is shown connected to network 40 using a connector 35c. Web server computer 120 is shown connected to network 40 using a connector 65. Master server computer 110 is shown connected to network 40 using a connector 55.

However, several alternative network configurations are suitable for this embodiment of the invention. For example, master server computer 110, web server computer 120, and user client computers (100a, 100b, and 100c) can be interconnected over local area networks (LAN), wireless networks, directly connected to one another or connected using combinations of the aforementioned network configurations. As mentioned above, the type of connections to be used should be selected according to the type of data sent and the total bandwidth of the data sent.

Referring to FIG. 1D, a network diagram illustrates the relationship between a plurality of user client computers (100a, 100b, and 100c), a master server computer 110, a web server computer 120, and slave caching servers (130, 135) as they are interconnected over a network 40. In this forth embodiment of the invention, master server computer 110, web server computer 120, and slave cashing server computers (130, 135) are shown connected to user client computers (100a, 100b, and 100c) over network 40, which is the Internet. User client computer 100a is shown connected to network 40 using a connector 35a. User client computer 100b is shown connected to network 40 using a connector 35b. User client computer 100c is shown connected to network 40 using a connector 35c. Web server computer 120 is shown connected to network 40 using a connector 65. Master server computer 110 is shown connected to network 40 using a connector 55. Slave cashing server 130 is shown connected to network 40 using a connector 75. Slave cashing server computer 135 is shown connected to network 40 using a connector 85.

However, several alternative network configurations are suitable for this embodiment of the present invention. For example, web server computer 120, master server computer 110, slave cashing server computer 130, slave cashing server computer 135, and user client computers (100a, 100b, and 100c) can be connected using a local area network (LAN), a wireless network, direct connected to one another, or any combination of these network configurations. As mentioned above, the type of connections to be used should be selected according to the type of data sent and the total bandwidth of the data sent.

Referring to FIG. 2A(1), a schematic diagram illustrates the storage architecture of a user client computer 100 and a master server computer 110 in a first embodiment of the present invention. Master server computer 110 includes an operating system program 80, a latching software 67, a network program 95, and a storage 175. A useful text describing Internet standards and protocols is the book by D. C. Naik entitled "Internet Standards and Protocols", Microsoft Press, 1998. Operating System Program 80 can be, for example, Microsoft Windows NT, Linux, IBM AIX, or any other suitable operating system program. Latching software 67 is shown in greater detail in FIG. 6A(1). More particularly, latching software 67 is detailed in steps 302, 304, 306, 307, 308, and 310. Further, in an alternative embodiment of the present invention, latching software 67 is described in greater detail in FIG. 7A(1). More particularly, latching software 67 is detailed in steps 1002, 1004, 1005, 1006, 1008, 1012, 1016, 1024, 1025, 1026, and 1030. Additionally, in yet another embodiment of the present invention, latching software 67 is described in greater detail in FIG. 8A(1). More particularly, latching software 67 is detailed in steps 1402, 1406, 1408, 1414, 1416, 1418, 1419, 1420, and 1426.

Storage 175 includes a database 207, a database 201, and a database 202. For this embodiment of the invention, database 207, database 201, and database 202, which are shown in greater detail in FIG. 3A(1) and FIG. 3C(1). User client computer 100 includes an operating system program 50, a control program 25, a browser program 30, and a network program 60. A useful text describing Internet standards and protocols is the book by D. C. Naik entitled "Internet Standards and Protocols, Microsoft Press, 1998. Operating system program 50 can be, for example, Microsoft Windows NT or the Unix operating system. A useful text describing the Windows NT operation system is the book by M. Brain, entitled "Win32 System Services", Prentice Hall, 1996. Browser Program 30 can be, for example, Netscape Navigator, Internet Explorer, or any other suitable browser program. A useful text detailing Internet Explorer is the book by S. Roberts entitled, "Programming Microsoft Internet Explorer 5", Microsoft Press, 1999.

Control program 50 is shown in greater detail in FIG. 6A(1). More particularly, control program 25 is detailed in steps 300 and 312. Further, in an alternative embodiment of the present invention, control program 50 is detailed in FIG. 7A(1). More particularly, control program 50 is detailed in steps 1000, 1010, 1014, 1032, 1034, and 1036. Additionally, in yet another embodiment of the present invention, control program 50 is shown in greater detail in FIG. 8A(1). More particularly, control program 50 is detailed in steps 1400, 1404, 1410, 1412, 1422, 1424, 1428, 1430, and 1432. Note, FIG. 2A(1) shows user client computer 100 connected over network 40, which is the Internet, to master server 110 using connectors (35, 55). However, user client computer 100 can be connected to master server 110 using a direct connector, a wireless network, or a local area network (LAN).

Referring to FIG. 2A(2), a schematic diagram illustrates the storage architecture of a user client computer 100 and master server computer 110 of FIG. 2A(1), with the added feature of providing security for a target document, which is referred to in a referring document. User client computer 100 includes an operating system program 50, a browser program 30 a control program 25', and a network program 60. Operating system program 50, browser program 30, and network program 60 were described in the detailed description for FIG. 2A(1) above. Thus, further elaboration is omitted for these components.

Control program 25' is described in greater detail in FIG. 6A(2). More particularly, control program 25' is detailed in steps 411, 412, and 413. Further, in an alternative embodiment of the invention, control program 25' is described in greater detail in FIG. 7A(1). More particularly, control program 25' is detailed in steps 1000, 1010, 1014, 1032, 1034, and 1036. Additionally, in yet another embodiment of the present invention, control program 25' is described in greater detail in FIG. 8A(1). More particularly, control program 25' is detailed in steps 1400, 1404, 1410, 1412, 1422, 1424, 1428, 1430, and 1432.

Master server computer 110 includes an operating system program 80, latching software 67', network program 95, and a storage 175. Operating system program 80 and network 95 were described in the detailed description for FIG. 2A(1) above. Thus, further elaboration is omitted for these components. Latching software 67' is described in greater detail in FIG. 6A(2). More particularly, latching software 67' is detailed in steps 402, 404, 406, 407, 408, 410, 416, 418, 420, 422, and 428. Further, in an alternative embodiment of the present invention, latching software 67' is described in greater detail in FIG. 7A(1). More particularly, latching software 67' is detailed in steps 1002, 1004, 1005, 1006, 1008, 1012, 1016, 1024, 1025, 1026, and 1030. Additionally, in yet another embodiment of the invention, latching software 67' is described in greater detail in FIG. 8A(1). More particularly, latching software 67' is detailed in steps 1402, 1406, 1408, 1414, 1416, 1418, 1419, 1420, and 1426.

Storage 175 includes a database 207, a database 201, a database 202, and a database 203. Database 207, database 201, database 202, and database 203 are shown in greater detail in FIG. 3A(2) and FIG. 3C(2). Note, user client computer 100 is shown connected over network 40, which is the Internet, to master server computer 110 using connectors (35, 55). However, user client computer 100 can be connected to master server computer 110 using a direct connection, a wireless network, or a local area network (LAN).

Referring to FIG. 2B(1), a schematic diagram illustrates the storage architecture of a user client computer 100, a master server computer 110, and a plurality of slave caching server computers (130, 135) in a second embodiment of the present invention. User client computer 100 includes an operating system program 50, a browser program 30, a control program 26, and a network program 60. Operating system program 50, browser program 30, and network program 60 were described in the detailed description for FIG. 2A(1) above. Thus, further elaboration is omitted for these components.

Control program 26 is described in greater detail in FIG. 6B(1). More particularly, control program 26 is detailed in steps 500 and 514. Further, in an alternative embodiment of the invention, control program 26 is described in greater detail in FIG. 7B(1). More particularly, control program 26 is detailed in steps 1100, 1110, 1114, 1134, 1136, and 1140. Additionally, in yet another embodiment of the invention, control program 26 is described in greater detail in FIG. 8B(1). More particularly, control program 26 is detailed in steps 1500, 1506, 1512, 1514, 1526, 1528, 1532, 1534, and 1536.

Master server computer 110 includes an operating system program 80, a latching software 63, a network program 95, and a storage 175. Operating system program 80 and network program 95 were described in the detailed description for FIG. 2A(1) above. Thus, further elaboration is omitted for these components. Latching software 63 is described in greater detail in FIG. 6B(1). More particularly, latching software 63 is detailed in steps 502, 504, 506, 507, 508, and 509. Further, in an alternative embodiment of the invention, latching software 63 is described in greater detail in FIG. 7B(1). More particularly, latching software 63 is detailed in steps 1102, 1104, 1105, 1106, 1108, 1112, 1113, 1116, 1124, 1128, and 1132. Additionally, in yet another embodiment of the invention, latching software 63 is described in greater detail in FIG. 8B(1). More particularly, latching software 63 is detailed in steps 1501, 1502, 1508, 1510, 1516, 1517, 1519, 1520, 1522, 1523, 1524, and 1530. Storage 175 includes a database 201 and a database 207, which are described in greater detail in FIG. 3B(1) and FIG. 3C(3).

Slave caching server computer 130 includes an operating system program 82. Similarly, slave cashing server computer 135 includes an operating system program 84. Operating system program 82 and operating system program 84 can be, for example, Microsoft Windows NT, Red Hat Linux, IBM AIX, or another suitable server computer operating system program. Slave caching server computer 130 further includes a network program 98 and slave caching server computer 135 further includes a network program 96. As described above, a useful text describing Internet standards and protocols is the book by D. C. Naik entitled "Internet Standards and Protocols" Microsoft Press, 1998.

Slave caching server computer 130 further includes a control program 78, which is described in greater detail in FIG. 6B(1). More particularly, control program 78 is detailed in steps 510 and 512. Further, in an alternative embodiment of the invention, control program 78 is described in greater detail in FIG. 8B(1). More particularly, control program 78 is detailed in steps 1504 and 1518. Note, control program 78 is capable of performing the same operational steps are detailed in FIG. 7B(1) for a control program 79 in slave caching server computer 135.

Slave caching server computer 130 further includes a storage 177. Storage 177 includes a database 204, which is described in greater detail in FIG. 4.

Slave caching server computer 135 further includes control program 79, which is very similar to control program 78 of slave caching server computer 130. Control program 79 is capable of performing the same operational steps performed by control programs 78, shown in FIG. 6B(1) and FIG. 7B(1). One set of operational steps illustrating control program 79 is described in FIG. 7B(1). More particularly, control program 79 is detailed in steps 1126 and 1127. Slave caching server computer 135 further includes a storage 179.

Figure 5:
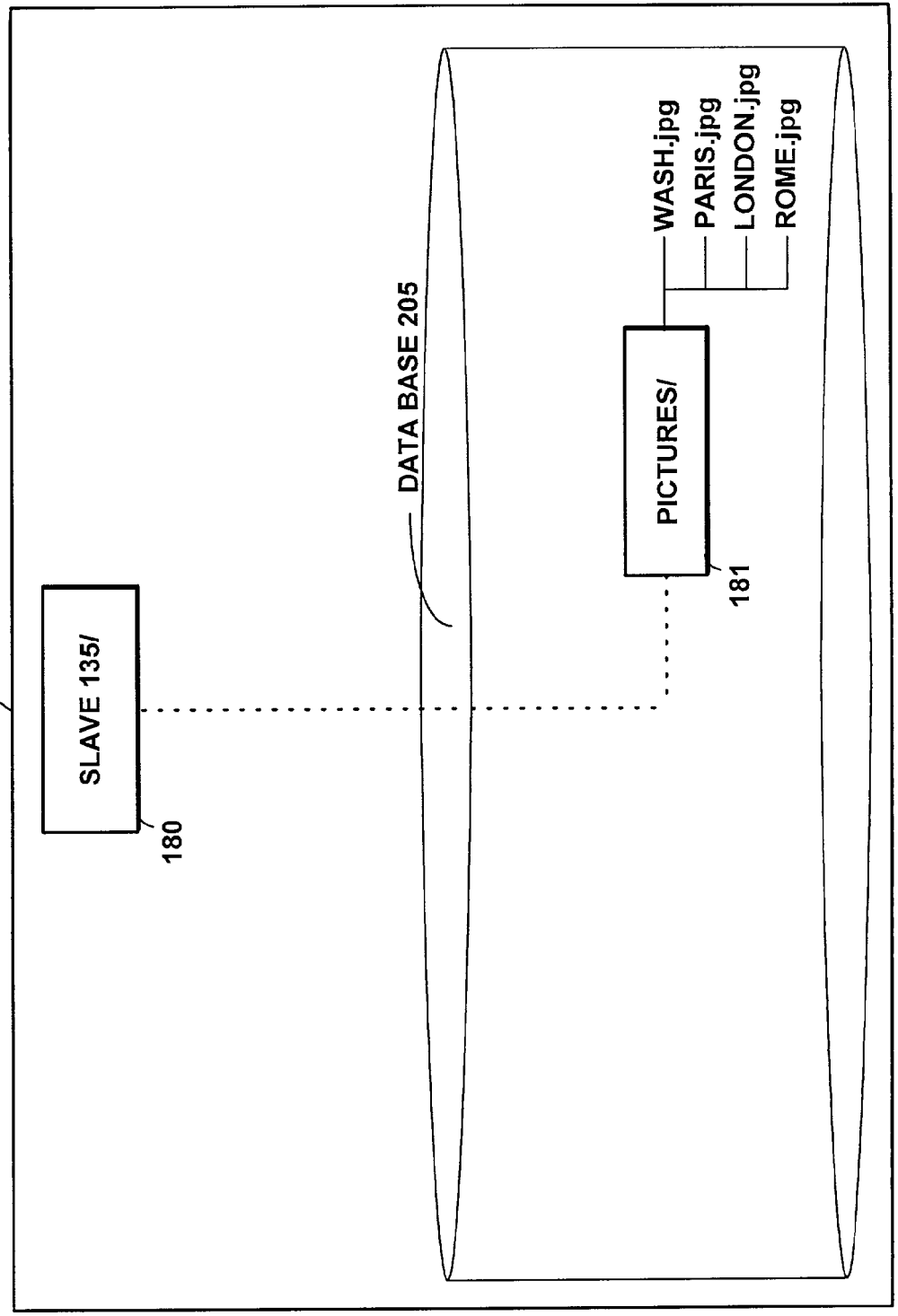
FIG. 5 is a schematic diagram illustrating a database for storing target documents in a slave caching server computer for the storage architectures shown in FIG. 2B(1), FIG. 2B(2), FIG. 2D(1), and FIG. 2D(2).

Storage 179 includes a database 205, which is shown in greater detail in FIG. 5. Note, user client computer 100, master server computer 110, slave caching server computer 130, and slave caching server computers (130,135) are shown interconnected over network 40, which is the Internet. User client computer 100 is shown connected to network 40 using a connector 35. Master server computer 110 is shown connected to network 40 using a connector 55. Slave caching server computer 135 is shown connected to network 40 using a connector 85. Slave caching server computer 130 is shown connected to network 40 using a connector 75. However, user client computer 100, master server computer 110, and slave caching server computers (130, 135) can be interconnected using alternative network configurations. For example, user client computer 100, master server computer 110, and slave caching server computers (130, 135) can be interconnected over a local area network (LAN), a wireless network, directly connected to one another, or connected using combinations of these network configurations.

Referring to FIG. 2B(2), a schematic diagram illustrates the storage architecture of user client computer 100, master server computer 110, and slave caching server computers (130, 135) of FIG. 2B(1), with the added feature of providing security for target documents, which are referred to in a referring document. User client computer 100 includes an operating system program 50, a browser program 30, a control program 26', and a network program 60. Operating system program 50, browser program 30, and network program 60 were described in the detailed description for FIG. 2A(1) above. Thus, further elaboration is omitted for these components. Control program 26' is described in greater detail in FIG. 6B(2). More particularly, control program 26' is detailed in steps 600, 616, 628, and 634. Further, in an alternative embodiment of the invention, control program 26' is described in greater detail in FIG. 7B(1). More particularly, control program 26' is detailed in steps 1100, 1110, 1114, 1134, 1136, and 1140. In yet another embodiment of the invention, control program 26' is described in greater detail in FIG. 8B(1). More particularly, control program 26' is detailed in steps 1500, 1506, 1512, 1514, 1526, 1528, 1532, 1534, and 1536.

Master server computer 110 includes an operating system program 80, a latching software 63', a network program 95, and a storage 175. Operating system program 80 and network program 95 were described in the detailed description of FIG. 2A(1) above. Thus, further elaboration is omitted for these components. Latching software 63' is described in greater detail in FIG. 6B(2). More particularly, latching software 63' is detailed in steps 602, 604, 606, 607, 608, 609, 610, 622, 624, and 626. Further, in an alternative embodiment of the invention, latching software 63' is described in greater detail in FIG. 7B(1). More particularly, latching software 63' is detailed in steps 1102, 1104, 1105, 1106, 1108, 1112, 1113, 1116, 1124, 1128, and 1132. In yet another embodiment of the invention, latching software 63' is described in greater detail in FIG. 8B(1). More particularly, latching software 63' is detailed in steps 1501, 1502, 1508, 1510, 1516, 1517, 1519, 1520, 1522, 1523, 1524, and 1530. Storage 175 includes a database 201, a database 207, and a database 203, which are described in greater detail in FIG. 3B(2) and FIG. 3C(4).

Slave caching server computer 130 includes an operating system program 82 and a network program 98. Similarly, slave caching server computer 135 includes an operating system program 84 and a network program 96. Operating system programs (82, 84) and network programs (98, 96) were described in the detail description of FIG. 2B(1) above. Thus, further elaboration is omitted for these components.

Control program 78' of slave caching server computer 130 is described in greater detail in FIG. 6B(2). More particularly, control program 78' is detailed in steps 618, 620, 630, and 632. Further, in an alternative embodiment of the invention, control program 78' is described in greater detail in FIG. 8B(1). More particularly, control program 78' is detailed in steps 1504 and 1518. Note, control program 78' is capable of performing the same operational steps as shown in FIG. 7B(1) in steps 1126 and 1127, for slave caching server computer 135. Storage 177 includes a database 204, which is described in greater detail in FIG. 4.

Slave caching server computer 135 further includes a control program 79', which is described in greater detail in FIG. 7B(1). More particularly, control program 79' is detailed in steps 1126 and 1127. Note, control program 79' of slave caching server computer 135 is capable of performing the same operational steps shown in FIG. 6B(2) and FIG. 8B(1) for slave caching server 130.

User client computer 100, master server computer 110, and slave caching server computers (130, 135) are shown interconnected over network 40, which is the Internet. User client computer 100 is shown connected to network 40 using a connector 35. Master server computer 110 is shown connected to network 40 using a connector 55. Slave caching server computer 135 is shown connected to network 40 using a connector 85. Slave caching server computer 130 is shown connected to network 40 using a connector 75. However, user client computer 100, master server computer 110, and slave caching server computers (130,135) can be interconnected using a local area network (LAN), a wireless network, a direct connection, or a combination of these network configurations.

Referring to FIG. 2C(1), a schematic diagram illustrates the storage architecture of a user client computer 100, a master server computer 110, and a web server computer 120 in a third embodiment of the present invention. User client computer 100 includes an operating system program 50, a browser program 30, a control program 27, and a network program 60. Operating system program 50, browser program 30, and network program 60 were described in the detailed description for FIG. 2A(1) above. Thus, further elaboration is omitted for these components. Control program 27 is described in greater detail in FIG. 6C(1). More particularly, control program 27 is detailed in steps 700, 706, and 718. Further, in an alternative embodiment of the invention, control program 27 is described in greater detail in FIG. 7C(1). More particularly, control program 27 is detailed in steps 1200, 1206, 1216, 1220, 1240, 1242, and 1244. Additionally, in yet another embodiment of the invention, control program 27 is described in greater detail in FIG. 8C(1). More particularly, control program 27 is detailed in steps 1600, 1606, 1610, 1616, 1618, 1628, 1630, 1634, 1636, and 1638.

Master server computer 110 includes an operating system program 80, a latching software 69, a network program 95, and a storage 175. Operating system program 80 and network program 95 were described in the detailed description of FIG. 2A(1) above. Thus, further elaboration is omitted for these components. Latching software 69 is described in greater detail in FIG. 6C(1). More particularly, latching software 69 is detailed in steps 708, 710, 712, 713, 714, and 716. Further, in an alternative embodiment of the invention, latching software 69 is described in greater detail in FIG. 7C(1). More particularly, latching software 69 is detailed in steps 1208, 1210, 1211, 1212, 1214, 1218, 1222, 1230, 1231, 1232, and 1238. Additionally, in yet another embodiment of the invention latching software 69 is described in greater detail in FIG. 8C(1). More particularly, latching software 69 is detailed in steps 1608, 1612, 1614, 1620, 1622, 1624, 1625, 1626, and 1632. Storage 175 includes a database 207, a database 201 and a database 202, which are described in greater detail in FIG. 3A(1) and FIG. 3C(1).

Web server computer 120 includes a control program 22, a network program 60', an operating system program 50', a browser program 30', and a table 178. Network program 60', operating system program 50', and browser program 30' can be similar to operating system program 50, browser program 30, and network program 60 of the user client computer 100. Operating system program 50' can be, for example, the Microsoft Windows NT operating system. Browser program 30' can be, for example, the Microsoft Internet Explorer browser program or the Netscape navigator browser program. Network program 60' is analogous to network program 60 in user client computer 100.

Table 178 has a left-hand column and a right-hand column. The left-hand column lists requested addresses and the right-hand columns lists corresponding redirected addresses for master server computer 110. In a first entry in the left-hand column, a requested address for a target document is listed. In a first entry in the right-hand column a corresponding redirected address for the address of the target document located in master server computer 110. In the left-hand column in a second entry a referring document name is listed, which refers to the name of a referring document having a hypertext link to the target document in the first entry in the left-hand column. In the right-hand column in a second entry a corresponding master address for the referring document is listed. Table 178 is referenced when a user connects to web server computer 120. Table 178 directs the user to a target or referring document that is stored on master server computer 110 by providing the user with a hypertext link to the redirected address of the target or referring document.

Control program 22' is described in greater detail in FIG. 6C(1). More particularly, control program 22' is detailed in steps 702 and 704. Further, in an alternative embodiment of the invention, control program 22' is described in greater detail in FIG. 7C(1). More particularly, control program 22' is detailed in steps 1202 and 1204. Additionally, in yet another embodiment of the invention, control program 22' is described in greater detail in FIG. 8C(1). More particularly, control program 22' is detailed in steps 1602 and 1604.

Referring to FIG. 2C(2), a schematic diagram illustrates the storage architecture of user client computer 100, master server computer 110, and web server computer 120 of FIG. 2C(1), with the added feature of providing security for a target document referred to in a referring document. User client computer 100 includes an operating system program 50, a browser program 30, a control program 27' and a network program 60. Operating system program 50, browser program 30, and network program 60 were described in the detailed description for FIG. 2A(1) above. Thus, further elaboration is omitted for these components.

Control program 27' is described in greater detail in FIG. 6C(2). More particularly, control program 27' is detailed in steps 800, 806, 822, 830, and 836. Further, in an alternative embodiment of the invention, control program 27' is described in greater detail in FIG. 7C(1). More particularly, control program 27' is detailed in steps 1200, 1206, 1216, 1220, 1240, 1242, and 1244. Additionally, in yet another embodiment of the invention, control program 27' is described in greater detail in FIG. 8C(1). More particularly, control program 27' is detailed in steps 1600, 1606, 1610, 1616, 1618, 1628, 1630, 1634, 1636, and 1638.

Master server computer 110 includes an operating system program 80, a latching software 69', a network program 95, and a storage 175. Operating system program 80 and network program 95 were described in the detailed description for FIG. 2A(1) above. Thus, further elaboration is omitted for these components. Latching software 69' is described in greater detail in FIG. 6C(2). More particularly, latching software 69' is detailed in steps 808, 810, 812, 813, 814, 816, 824, 826, 828, 832, and 834. Further, latching software 69' is described in greater detail in FIG. 7C(1). More particularly, latching software 69' is detailed in steps 1208, 1210, 1211, 1212, 1214, 1218, 1222, 1230, 1231, 1232, and 1238. In yet another embodiment of the invention, latching software 69' is described in greater detail in FIG. 8C(1). More particularly, latching software 69' is detailed in steps 1608, 1612, 1614, 1620, 1622, 1624, 1625, 1626, and 1632. Storage 175 includes a database 207, a database 201, a database 202, and a database 203. Database 207, database 202, database 201, and database 203 are described in greater detail in FIG. 3A(2) and FIG. 3C(2).

Web server computer 120 includes a control program 22', a network program 60', an operating system program 50', a browser program 30', and a table 178. Network program 60', operating system program 50', browser program 30', and table 178 were described above in the detailed description for FIG. 2C(1) above. Thus, further elaboration is omitted for these components.

Control program 22' is described in greater detail in FIG. 6C(2). More particularly, control program 22' is detailed in steps 802 and 804. Further, in an alternative embodiment of the invention, control program 22' is described in greater detail in FIG. 7C(1). More particularly, control program 22' is detailed in steps 1202 and 1204. Additionally, in yet another embodiment of the invention, control program 22' is described in greater detail in FIG. 8C1. More particularly, control program 22' is detailed in steps 1602 and 1604.

Referring to FIG. 2D(1), a schematic diagram illustrates the storage architecture of a user client computer 100, a master server computer 110, a web server computer 120, and a plurality of slave caching server computers (130, 135) in a fourth embodiment of the present invention. User client computer 100 includes an operating system program 50, a browser program 30, a control program 28, and a network program 60. Operating system program 50, browser program 30, and network program 60 were described in the detailed description for FIG. 2A(1) above. Thus, further elaboration is omitted for these components. Control program 28 is described in greater detail in FIG. 6D(1). More particularly, control program 28 is detailed in steps 800, 806, and 820. Further, in an alternative embodiment of the invention, control program 28 is described in greater detail in FIG. 7D(1). More particularly, control program 28 is detailed in steps 1300, 1306, 1316, 1320, 1340, 1342, and 1344. In yet another embodiment of the invention, control program 28 is described in greater detail in FIG. 8D(1). More particularly, control program 28 is detailed in steps 1700, 1706, 1712, 1718, 1720, 1732, 1734, 1738, 1740, and 1742.

Master server computer 110 includes an operating system program 80, a network program 95, a latching software 66, and a storage 175. Operating system program 80 and network program 95 were described in the detailed description for FIG. 2A(1) above. Thus, further elaboration is omitted for these components. Latching software 66 is described in greater detail in FIG. 6D(1). More particularly, latching software 66 is detailed in steps 808, 810, 812, 813, 814, and 815.

Further, in an alternative embodiment of the invention, latching software 66 is described in greater detail in FIG. 7D(1). More particularly, latching software 66 is detailed in steps 1308, 1310, 1311, 1312, 1314, 1318, 1322, 1330, 1331, 1334, and 1338. In yet another embodiment of the invention, latching software 66 is described in greater detail in FIG. 8D(1). More particularly, latching software 66 is detailed in steps 1707, 1708, 1714, 1716, 1721, 1722, 1725, 1726, 1728, 1730, 1731, and 1736. Storage 175 includes a database 201 and a database 207, which are described in greater detail in FIG. 3B(1) and FIG. 3C(3).

Web server computer 120 includes a control program 24, a network program 60' an operating system program 50', a browser program 30' and a table 178. Network program 60', operating system program 50', browser program 30', and table 178 were described in the detailed description of FIG. 2C(1) and FIG. 2C(2) above. Thus, further elaboration is omitted for these components. Control program 24 is described in greater detail in FIG. 6D(1). More particularly, control program 24 is detailed in steps 802 and 804. Further, in an alternative embodiment of the invention, control program 24 is described in greater detail in FIG. 7D(1). More particularly, control program 24 is detailed in steps 1302 and 1304. In yet another embodiment of the invention, control program 24 is described in greater detail in FIG. 8D(1). More particularly, control program 24 is detailed in steps 1702 and 1704.

Slave caching server computer 130 includes an operating system program 82, a network program 98, a control program 97, and a storage 177. Operating system program 82 and network program 98 were described in the detailed description for FIGS. 2B(1) and 2B(2) above. Thus, further elaboration is omitted for these components. Control program 97 is described in greater detail in FIG. 6D(1). More particularly, control program 97 is detailed in steps 816 and 818. Further, in an alternative embodiment of the invention control program 97 is described in greater detail in FIG. 8D1. More particularly, control program 97 is detailed in steps 1710, 1724, and 1729. Note, control program 97 is capable of performing the same operational steps, steps 1332 and 1333 of FIG. 7D(1) as a control program 99 described below for slave caching server 135. Storage 177 includes a database 204, which is described in greater detail in FIG. 4.

Slave caching server computer 135 includes an operating system program 84, a network program 96, control program 99, and a storage 179. Operating system program 84 and network program 96 were described in the detailed description of FIGS. 2B(1) and 2B(2) above. Thus, further elaboration is omitted for these components. One example of operational steps performed by control program 99 is described in greater detail in FIG. 7D(1). More particularly control program 99 is detailed in steps 1332 and 1333. Note, control program 99 of slave caching server computer 135 is capable of performing steps 816 and 818 in FIG. 6D(1), as shown for slave caching server computer 130. Further, control program 99 is capable of performing steps 1710, 1724, and 1729 of FIG. 8D(1), as shown for slave caching server computer 130.

Storage 179 includes a database 205, which is described in greater detail in FIG. 5. Note, user client computer 100, master server computer 110, web server computer 120, and slave caching server computers (130, 135) are shown interconnected over an network 40, which is the Internet. User client computer 100 is shown connected to network 40 using a connector 35. Master server computer 110 is shown connected to network 40 using a connector 55. Web server computer 120 is shown connected to network 40 using a connector 65. Slave caching server computer 130 is shown connected to network 40 using a connector 75. Slave caching server computer 135 is shown connected to network 40 using a connector 85.

However, user client computer 100, master server computer 110, web server computer 120, and slave caching server computers (130, 135) can be interconnected over a local area network (LAN), a wireless network, directly connected, or interconnected over a combination of these network configurations.

Referring to FIG. 2D(2), a schematic diagram illustrates the storage architecture of user client computer 100, master server computer 110, web server computer 120, and slave caching server computers (130, 135) of FIG. 2D(1), with the added feature of providing security for a target document referred to in a referring document. User client computer 100 includes an operating system program 50, a browser program 30, a control program 28', and a network program 60. Operating system program 50, browser program 30, and network program 60 were described in the detailed description for FIG. 2A(1) above. Thus, further elaboration is omitted for these components. Control program 28' is described in greater detail in FIG. 6D(2). More particularly, control program 28' is detailed in steps 900, 906, 922, 938, and 940. Further, in an alternative embodiment of the invention, control program 28' is described in greater detail in FIG. 7D(1). More particularly, control program 28' is detailed in steps 1300, 1306, 1316, 1320, 1340, 1342, and 1344. In yet another embodiment of the invention, control program 28' is described in greater detail in FIG. 8D(1). More particularly, control program 28' is detailed in steps 1700, 1706, 1712, 1718, 1720, 1732, 1734, 1738, 1740, and 1742.

Master server computer 110 includes an operating system program 80, a network program 95, a latching software 66', and a storage 175. Operating system program 80 and network program 95 were described in the detailed description for FIG. 2A(1) above. Thus, further elaboration is omitted for these components. Latching software 66' is described in greater in FIG. 6D(2). More particularly, latching software 66' is detailed in steps 908, 910, 912, 913, 914, 915, 916, 928, 930, and 936. Further, in an alternative embodiment of the invention latching software 66' is described in greater detail in FIG. 7D(1). More particularly, latching software 66' is detailed in steps 1308, 1310, 1311, 1312, 1314, 1318, 1322, 1330, 1331, 1334, and 1338. In yet another embodiment of the invention, latching software 66' is described in greater detail in FIG. 8D(1). More particularly, latching software 66' is detailed in steps 1707, 1708, 1714, 1716, 1721, 1722, 1726, 1725, 1728, 1730, 1731, and 1736. Storage 175 includes a database 201, a database 207, and a database 203, which are described in greater detail in FIG. 3B(2) and FIG. 3C(4).

Web server computer 120 includes a control program 24', a network program 60', an operating system program 50', a browser program 30', and a table 178. Network program 60', operating system program 50', browser program 30', and table 178 were described in the detailed description for FIG. 2C(1) and FIG. 2C(2) above. Thus, further elaboration is omitted for these components. Control program 24' is described in greater detail in FIG. 6D(2). More particularly, control program 24' is detailed in steps 902 and 904. In an alternative embodiment of the invention, control program 24' is described in greater detail in FIG. 7D(1). More particularly, control program 24' is detailed in steps 1302 and 1304. In yet another embodiment of the invention, control program 24' is described in greater detail in FIG. 8D(1). More particularly, control program 24' is detailed in steps 1702 and 1704.

Slave caching server computer 130 includes an operating system program 82, a network program 98, a control program 97', and a storage 177. Operating system program 82 and network program 98 were described in the detailed description for FIG. 2B(1) and FIG. 2B(2) above. Thus, further elaboration is omitted for these components. Control program 97' is described in greater detail in FIG. 6D(2). More particularly, control program 97' is detailed in steps 924, 926, 932, and 934. Further, in an alternative embodiment of the invention, control program 97' is described in greater detail in FIG. 8D1. More particularly, control program 97' is detailed in steps 1710, 1724, and 1729. Note, control program 97' is capable of performing the same operational steps, steps 1332 and 1333, as described below for a control program 99' for slave caching server computer 135.

Slave caching server computer 135 includes an operating system program 84, a network program 96, control program 99', and a storage 179. Operating system program 84 and network program 96 were described in the detailed description of FIG. 2B(1) and FIG. 2B(2) above. Thus, further elaboration is omitted for these components. One example of operational steps performed by control program 99' is described in greater detail in FIG. 7D(1). More particularly, control program 99' is detailed in steps 1332 and 1333. Note, control program 99' is capable of performing steps 924, 926, 932, and 934, as shown in FIG. 6D(2) for slave caching server 130. Further, control program 99' is capable of performing steps 1710, 1724, and 1729, as shown in FIG. 8D(1) for slaving caching server computer 130.

User client computer 100, master server computer 110, web server computer 120, and slave caching server computers (130, 135) are shown interconnected over an network 40, which is the Internet. User client computer 100 is shown connected to network 40 using a connector 35. Master server computer 110 is shown connected to network 40 using a connector 55. Web server computer 120 is shown connected to network 40 using a connector 65. Slave caching server computer 130 is shown connected to network 40 using a connector 75. Slave caching server computer 135 is shown connected to network 40 using a connector 85.

However, user client computer 100, master server computer 110, web server computer 120, and slave caching server computers (130, 135) can be interconnected using a local area network (LAN), a wireless network, directly connected, or interconnected using a combination of these network configurations.

Referring to FIG. 3A(1), a schematic diagram illustrates databases in master server computer 110 for the storage architectures of FIG. 2A(1) and FIG. 2C(1), with hyper-linked target documents created from a file. Processes for hypertext linking target documents in referring documents from a transferred file are described later with reference to FIG. 8A(1), FIG. 8B(1), FIG. 8C(1), and FIG. 8D(1). FIG. 3A(1) shows databases inside a storage 175, which is inside master server computer 110. A root directory 176 is entitled "Master 110". Under root directory 176 there is a database 201, a database 202, and a database 207. Database 201 is under a subdirectory entitled "DB201". Database 201 contains two columns. In a left-hand column is a list of URL addresses of target documents (IDs of target documents). Target documents are documents, which are hypertext linked from other documents called referring documents.

In a right-hand column in database 201, is a list of all referring documents stored a master server 110 with a hypertext link to a target document on master server 110. For example, in the left-hand column in a first entry is a URL address www.cnn.com/master110/pics/LISA.jpg. This is the URL address of a target document (ID of the target document). The target document name is LISA.jpg. In the right-hand column in a first entry is a URL address for each referring document having a hypertext link to the target document LISA.jpg. Note, the first entry in the left-hand column is in the subdirectory "pics", which means that the target document is located under the subdirectory "pics" in database 202.

Database 202 contains two subdirectories. A first subdirectory 184 is entitled "pics", which contains four target documents. For example, one of the target documents is LISA.jpg. A second subdirectory 186 is entitled "pictures", which includes four target documents. For example, WASH.jpg is a target document located in second subdirectory 186. Database 202 also includes a first use table 193 and a second use table 197. First use table 193 includes a counter for each of the target documents listed in subdirectory 184. Used Table 197 includes a counter for each of the target documents under second subdirectory 186. For example, in use table 193 the target document LISA.jpg has a count equal to 4. This refers to the number of referring documents having a hypertext link to the target document LISA.jpg.

A database 207 is located in a subdirectory entitled "DB 207". Database 207 includes all referring documents having hypertext links to target documents stored in database 202. As shown, referring documents 91, 92, 93, and 98 each have a hypertext link entitled "target document one", which links each of these referring documents to target document one. Target document 1 has the URL address www.cnn.com/master110/pics/LISA.jpg. Thus, referring documents 91, 92, 93, and 98 each have hypertext links to the target document LISA.jpg. A referring document can be, for example, an email message, a report stored on a hard drive, or any electronic medium in which a hypertext link can be added. For example, referring document 91 shows an email message entitled "Mom_letter.doc", which includes the hypertext link target document one.

Similarly, referring documents 101, 102, 103, and 104 each have hypertext links entitled "target document two". Target document two has a URL address, which is www.cnn.com/master110/pictures/WASH.jpg. Therefore, referring documents 101, 102, 103, and 104 each have hypertext links to the target document WASH.jpg.

Referring to FIG. 3A(2), a schematic diagram illustrates databases in master server computer 110 for the storage architectures of FIG. 2A(2) and FIG. 2C(2), with hyper-linked target documents created from a file. As mentioned above, processes for hypertext linking target documents in referring documents from a transferred file are described later with reference to FIG. 8A(1), FIG. 8B(1), FIG. 8C(1), and FIG. 8D(1). FIG. 3A(2) shows a storage 175, which is located in master server computer 110. Storage 175 includes a database 203, a database 201, a database 202, and a database 207. Storage 175 has a root directory entitled "Master 110". Database 201, database 202, and database 207 were described in the detailed description of FIG. 3A(1) above. Therefore, now only database 203 will be described in greater detail.

Database 203 is under a subdirectory entitled "DB203". Database 203 contains a table having a right-hand column and a left-hand column. In the left-hand column in a first entry, there is a URL address of a target document (ID of the target document). The URL address is www.cnn.com/master110/pics/LISA.jpg. This is the ID of the target document LISA.jpg. In the right-hand column in a first entry there are four access codes. Each access code is associated with a referring document having a hypertext link to the target document LISA.jpg. As mentioned above, each referring document having a hypertext link to a target document is listed in database 201.

In this example, the first access code in the first entry in the right-hand column is 12345. The access code 12345 is associated with a referring document in a first entry of a right-hand column in database 201. Thus, the associated referring document with access code 12345 is www.cnn.com/master110/DB201/Mom_letter.doc. Similarly, in the right-hand column in the first entry, a second access code is 68142. The second access code 68142 is associated with a second referring document in the right-hand column in the first entry of database 201. This associated referring document is www.cnn.com/master110/DB201/Son_letter.doc. Database 203 provides an access code for each referring document stored in database 201. Each access code is associated with a target document in each referring document.

A user who receives a referring document can only access a target document if the user enters an associated access code. Otherwise, access will be denied to the target document. Using database 203, a security officer or network administrator in charge of master server 110 can grant or deny access to a target document based on an access code entered by a user. This allows target documents to have the same security level as the associated referring document. Additionally, if a referring document is accidentally sent to a recipient the recipient will be denied access to the target document unless the recipient enters the correct access code. Thus, a security method is provided for preventing access to target documents.

Referring to FIG. 3B(1), a schematic diagram illustrates databases in master server computer 110 for the storage architectures of FIG. 2B(1) and FIG. 2D(1), with hyper-linked target documents created from a file. As mentioned above, processes for hypertext linking target documents in referring documents from a transferred file are described later with reference to FIG. 8A(1), FIG. 8B(1), FIG. 8C(1), and FIG. 8D(1). FIG. 3B(1) shows a storage 175 including a database 201 and a database 207. Database 207 was described in the detailed description for FIG. 3A(1) above. Therefore, now we describe only database 201. Storage 175 has a root directory 176 entitled "Master 110" and a subdirectory for database 201 entitled "DB201". Database 201 includes a table having a right-hand column and a left-hand column. In a first entry in the left-hand column is a URL address of a target document (ID of the target document). In this example the URL address of the target document is www.cnn.com/slave130/pics/LISA.jpg. Thus, the target document is LISA.jpg. The "slave 130" subdirectory and "pics" subsubdirectory indicates that the file "LISA.jpg" is stored on a slave caching server computer 130 in a subdirectory "pics", as shown in FIG. 2B(1) and FIG. 2D(1).

In the right-hand column in the first entry of database 201, there is a list of referring documents having hypertext links to the target document LISA.jpg. For example, one referring document having a hypertext link to the target document LISA.jpg has a URL address, which is www.cnn.com/master110/DB201/Mom_letter.doc. Entries in the left-hand column are URL addresses of target documents stored in slave caching sever computers. The URL address of the target document is www.cnn.com/slave130/pics/lisa.jpg. Similarly, a second entry in the left-hand column is a URL address of another target document. The URL address is www.cnn.com/slave135/pictures/wash.jpg. This address indicates that the target document WASH.jpg is stored in a slave cashing server 135 in a subsubdirectory "pictures". Further included in database 201 is a first use table 193, which contains a counter for 4 target documents, which are hypertext linked from referring documents stored in database 207. For example, the target document "Kim.jpg" has a count equal to zero, which indicates that there are no referring documents having hypertext links to "KIM.jpg". Database 201 similarly includes a second use table 197, which contains a counter for 4 target documents, which are hypertext linked from referring documents stored in database 207.

Referring to FIG. 3B(2), a schematic diagram illustrates databases in master server computer 110 for the storage architectures of FIG. 2B(2) and FIG. 2D(2), with hyper-linked target documents created from a file. As mentioned above, processes for hypertext linking target documents in referring documents from a transferred file are described later with reference to FIG. 8A(1), FIG. 8B(1), FIG. 8C(1), and FIG. 8D(1). FIG. 3B shows a storage 175 including a database 203, a database 201, and a database 207. Database 207 was described in the detailed description for FIG. 3A(1) above. Database 201 was described in the detailed description for FIG. 3B(1) above. Therefore, a detailed description is provided for only database 203. Storage 175 has a root directory 176 entitled "Master 110." Database 203 is under a subdirectory entitled "DB203". Database 203 includes a table having a right-hand column and a left-hand column. Entries in the left-hand column are URLs of target documents stored on slave caching servers. In the left-hand column in a first entry there is a URL address of a target document, which is www.cnn.com/slave130/pics/lisa.jpg.

In the right-hand column in a first entry there are four access codes. The access codes are associated with referring documents stored in database 207, which contain hypertext links to the target document LISA.jpg. The first access code is 12345, which is associated with a URL address of a first referring document in the first entry of the left-hand column in database 201. The associated referring document has a URL address www.cnn.com/master110/Mom_letter.doc. As described above, each access code is associated with a referring document containing a hypertext link to a target document. A user wanting to view a target document must enter the associated access code. As described above the access code provides security for the target document, which allows a network administrator or security officer in charge of master server computer 110 to grant or deny access to the target document. This is helpful in a situation where a referring document is accidentally sent to an unauthorized user. When an unauthorized user tries to view the target document the unauthorized user cannot have access to the target document without the proper access code. This provides a security method for target documents.

Referring to FIG. 3C(1), a schematic diagram illustrates databases in master server computer 110 for the storage architecture of FIG. 2A(1) and FIG. 2C(1), with hypertext linked target documents sent from a user client computer to another user client computer. Processes involving sending referring documents between user computers are described later with reference to FIG. 6A(2), FIG. 6B(2), and FIG. 6C(2), and FIG. 6D(2). FIG. 3C(1) shows a storage 175 including a database 201, a database 202, and a database 207. Database 202 and database 207 were described in the detailed description for FIG. 3A1 above. Therefore, only database 201 will be described in greater detail. Storage 175 has a root directory 176 entitled "Master 110". Database 201 is in a subdirectory entitled "DB201". Database 201 includes a table having a left-hand column and a right-hand column. In the left-hand column in a first entry a URL of a target document is listed. The URL address of a target document is www.cnn.com/master110/pics/lisa.jpg.

This URL address indicates that the target document LISA.jpg is stored on master server computer 110 in a subdirectory "pics". The "pics" subdirectory is located in database 202 in master server computer 110. A first entry in the right-hand column of database 201 contains a list of referring documents having a hypertext link to the target document LISA.jpg. In this example the referring documents are documents that have been emailed from an author client to a user client. In this example, a second referring document listed in a first entry in the right-hand column has a URL address which is psmith@aol.com/Son_letter.doc. This is the URL address of the user who received the referring document from an author client. A first referring document listed in the first entry in the right-hand column has a URL address, which is jsmith@aol.nsf/mom_letter.doc. The "NSF" extension indicates that the right-hand column of database 201 contains e-mail messages sent by the author client, as well as received referring documents. Therefore, all referring documents having hyperlinks to the target document LISA.jpg are listed in the right-hand column in database 201. When a user or an author client deletes a referring document having a hypertext link to a target document, the referring document is deleted from the list in the right-hand column in database 201. This is true also for referring documents listed in the right-hand columns of database 201 in FIG. 3A(1), FIG. 3A(2), FIG. 3B(1), FIG. 3B(2), FIG. 3C(2), FIG. 3C(3), and FIG. 3C(4).

Referring to FIG. 3C(2), a schematic diagram illustrates databases in master server computer 110 for the storage architectures of FIG. 2A(2) and FIG. 2C(2), with hyper-linked target documents sent from a user client computer to another user client computer. As described above, processes involving sending referring documents between user computers are described later with reference to FIG. 6A(2), FIG. 6B(2), FIG. 6C(2), and FIG. 6D(2). FIG. 3C(2) shows a storage 175, which includes a database 203, a database 201, a database 202, and a database 207. Database 201, 202, and 207 were described in the detailed description for FIG. 3C(1) above. Therefore, detailed description for only database 203 is now provided. Storage 175 has a root directory entitled "Master 110". Database 203 is under a subdirectory entitled "DB203". Database 203 includes a table having a right-hand column and a left-hand column. The left-hand column contains URL addresses of target documents (ID of the target document) stored in master server computer 110.

The right-hand column contains access codes associated with the target documents stored in the master server computer 110. For example, in the left-hand column in a first entry, a URL address of a target document is listed. The URL address is www.cnn.com/master110/pics/LISA.jpg. This URL address indicates that the target document LISA.jpg is stored on master server computer 110 in the subdirectory "pics". In the right-hand column in a first entry, four access codes are listed. Each access code is associated with a referring document stored in database 201. In this example the second access code in the first entry in the right-hand column is 68142, which is associated with the second referring document listed in database 201. The associated referring document is psmith@aol.com/Son_letter.doc.

This URL address is an e-mail address of a user client who received a referring document from an author client. On the other hand, a first access code in database 203 is 12345, which is associated with a first referring document listed in database 201. The first referring document in database 201 is jsmith@aol.nsf/Mom_letter.doc. As mentioned above, the "NSF" extension indicates that the referring document is a document sent from an author client. When a user client deletes a referring document that referring document is deleted from the list in database 201. Further, the corresponding access code is deleted from the list in the entries in the right-hand column of database 203. As described above, the access code associated with each referring document allows a network administrator or security officer to grant or deny access to a target document hypertext linked in a referring document. This provides a method of security for target documents.

Referring to FIG. 3C(3), a schematic diagram illustrates databases in master server computer 110 for the storage architectures of FIG. 2B(1) and FIG. 2D(1), with hypertext linked target documents sent from a user client computer to another user client computer. As described above, processes involving sending referring documents between user computers are described later with reference to FIG. 6A(2), FIG. 6B(2), FIG. 6C(2), and FIG. 6D(2). FIG. 3C(3) shows a storage 175, which includes a database 201 and a database 207. Storage 175 has a root directory entitled "Master 110". Database 207 was described in the detailed description for FIG. 3C(1) above. Therefore, only detailed description for database 201 will be provided. Database 201 is included under a subdirectory entitled "DB201". Database 201 includes a table having a left-hand column and a right-hand column. In a first entry in the left-hand column a URL address of a target document (ID of the target document) is included. In this example, the URL address of the target document is www.cnn.com/slave130/pics/lisa.jpg.

This address indicates that the target document LISA.jpg is located in slave caching server 130 under the subdirectory "pics". In a first entry in the right-hand column referring documents having a hypertext link to the URL of the target document (ID of the target document) are included. The second referring document listed in the first entry of the right-hand column is psmith@aol.com/Son_letter.doc. This is a referring document having a hypertext link to the target document LISA.jpg. Further, it is a URL address to a computer to which the referring document with a hypertext link to the target document LISA.jpg was sent. On the other hand, the first entry in the right hand column is jsmith@aol.nsf/Mom_letter.doc. The "NSF" extension indicates that the URL address is an address of from which the referring document was sent. If one of the referring documents is deleted from database 207 the URL addresses listed for that referring document would be deleted.

Similarly, in a second entry in the left-hand column of the table in database 201, a URL address of a target document is listed. The address is www.cnn.com/slave135/pics/WASH.jpg. This URL address indicates that the target document WASH.jpg is stored on a slave caching server computer 135 in a subdirectory "pics". In a second entry in the right-hand column are corresponding referring documents having hypertext links to the target document WASH.jpg. Further included in database 203 is a first use table 193 and a second use table 197, which contain counters for target documents. For example, the count for the target document "KAREN.jpg" is equal to zero. This indicates that no referring documents contain a hypertext link to the target document "KAREN.jpg" As mentioned above, when a referring document is deleted from database 207, the referring document list is changed in database 203. Similarly, the count for the use table listing the target document is changed.

Referring to FIG. 3C(4), a schematic diagram illustrates databases in master server computer 110 for storage architectures of FIG. 2B(2) and FIG. 2D(2), with hypertext linked target documents sent from a user client computer to another user client computer. As described above, processes involving sending referring documents between user computers are described later with reference to FIG. 6A(2), FIG. 6B(2), FIG. 6C(2), and FIG. 6D(2). FIG. 3C(4) shows a storage 175 including a database 203, a database 201, and a database 207. Storage 175 has a root directory entitled "Master 110". Database 201 was described in the detailed description for FIG. 3C(3) above. Database 207 was described in the detailed description for FIG. 3A(1) above. Therefore, detailed description is provided only for database 203. Database 203 is included under a subdirectory entitled "DB203". Database 203 includes a table having a left-hand column and a right-hand column. The left-hand column lists URL addresses of target documents (IDs of target documents). For example, in a first entry in the left-hand column, the URL address www.cnn.com/slave130/pics/LISA.jpg is listed.

This means that the target document LISA.jpg is stored in slave caching server computer 130 under the subdirectory "pics". The right-hand column lists corresponding access codes for each referring document in database 207 having a hypertext link to a target document listed in the left-hand column of the table in database 203. A user wanting to access a target document from a referring document must enter the corresponding access code. This provides a method for securing target documents. A network administrator or security office in charge of slave caching server computer 130 can deny access to the target document if a user of a referring document enters an improper access code.

Figure 4:
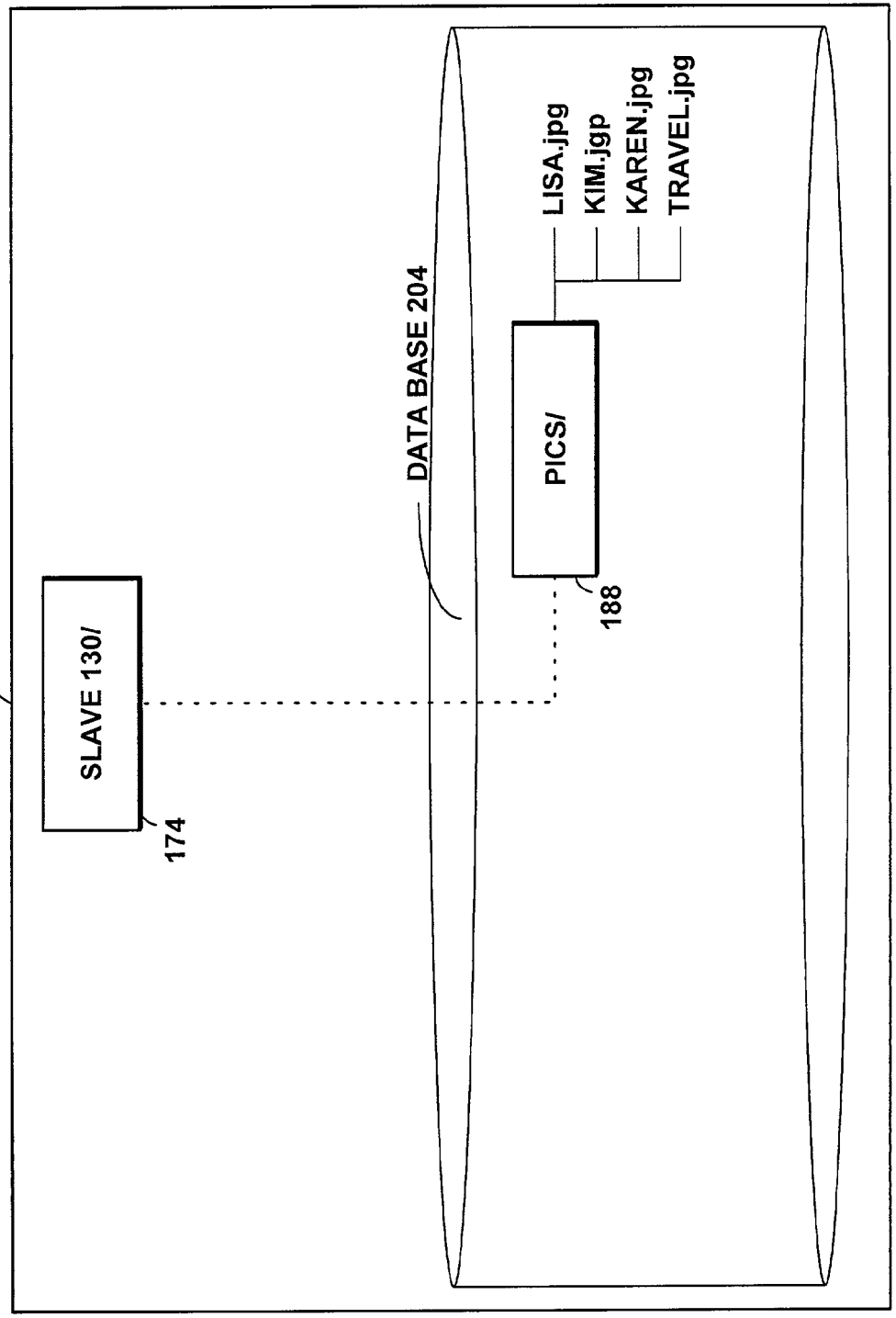
FIG. 4 is a schematic diagram illustrating a database for storing target documents located in a slave caching server computer for the storage architectures shown in FIG. 2B(1), FIG. 2B(2), FIG. 2D(1), and FIG. 2D(2).

Referring to FIG. 4, a schematic diagram illustrates a database for storing target documents located in a slave caching server computer 130 for the storage architectures shown in FIG. 2B(1), FIG. 2B(2), FIG. 2D(1), and FIG. 2D(2). FIG. 4 shows a storage 177 including a database 204. Storage 177 has a root directory entitled "Slave 130". Database 204 includes a subdirectory "pics". Four target documents are listed under the "pics" subdirectory. The four target documents are LISA.jpg, KIM.jpg, KAREN.jpg, and TRAVEL.jpg. Storage of the target documents in slave caching server computer 130 frees up memory space in master server computer 110. This prevents master server computer 110 from being overloaded due to a large number of client requests for target documents referred to in referring documents, which are stored on master server computer 110.

Referring to FIG. 5, a schematic diagram illustrates a database 205 for storing target documents in a slave caching server computer 135 for the storage architectures shown in FIG. 2B(1), FIG. 2B(2), FIG. 2D(1), and FIG. 2D(2). FIG. 5 shows a storage 179 including database 205. Storage 179 has a root directory 180 entitled "Slave 135". Database 205 is stored under a subdirectory 181 entitled "Pictures". Database 205 contains four target documents under subdirectory 181. For example, one target document is WASH.jpg. Storage of target documents in slave caching server computer 135 frees up memory in master server computer 110. This prevents overloading of master server computer 110 due to the receipt of a large number of requests for target documents hypertext linked to referring documents, which are stored on master server computer 110.

Referring to FIG. 6A(1), a network operation diagram illustrates the sequence of operational steps carried out by a user client computer 100 and a master server computer 110 in viewing target files referred by hypertext links in referring documents, for the storage architecture shown in FIG. 2A(1).

In a step 300, a user selects a hypertext link in a referring document and sends a "GET Request" to master server computer 110. The process then flows to a step 302, where master server computer 110 checks to see if the referring document is found or not found. The process then flows to a step 304, where master server computer 110 checks to see if the referring document is listed in master server computer 110. If the referring document is not listed in master server computer 110, the process then flows to a step 306, where a counter for the selected target document referred to in the referring document is updated. The process then flows to a step 307, where a database 207 is updated. Database 207 contains original copies of all of the referring documents.

The process then flows to a step 308, where master server computer 110 accesses target document LISA.jpg. In this example, the referring document has a hypertext link to the target document LISA.jpg. The process then flows to a step 310, where master server computer 110 sends the target document LISA.jpg to the user. Next, in a step 312, the user receives the target document LISA.jpg. In step 312 the user is able to view a copy of the target document LISA.jpg for at least the duration of the session.

Referring back to step 304, if the referring document is listed in master server computer 110, the process flows directly from step 304 to step 308, where master server computer 110 accesses the target document LISA.jpg. The process is completed flowing through steps 310 and 312.

Referring to FIG. 6A(2), a network operation diagram illustrates the sequence of operational steps carried out by an author client, a user, and a master server computer 110 in viewing target files referred to by hypertext links in referring documents, with the added feature of security for the target documents. FIG. 6A(2) illustrates operational steps for the storage architecture shown in FIG. 2A(2). In a step 400, a user selects a hypertext link in a referring document and sends a "GET Request" to master server computer 110. The process then flows to a step 402, where master server computer 110 checks to see if the referring document is found or not found. The process then flows to a step 404, where master server computer 110 determines if the referring document is listed in master server computer 110. If the referring document is not listed in master server computer 110, the process then flows to a step 406. In step 406, a counter for the selected target document is updated. The process then flows to a step 407, where a database 207 is updated. Database 207 contains original copies of all of the referring documents having hypertext links to target documents.

The process then flows to a step 408, where master server computer 110 generates an access code and adds an entry (ID of the target document and access code) to a permissions database (database 203). The process then flows to a step 410, where master server computer 110 sends the ID of the target document and the access code to an author client. The process then flows to a step 411, where an author client receives the ID of the target document and the access code. The process then flows to a step 412, where the author client determines whether to authorize access.

If the author client decides to authorize access, the process then flows to a step 413. In step 413, the author client sends the ID of the target document and the access code to the user and tells the user to initiate a request for the target document. The process then flows to a step 414, where the user sends the request with the access code and the ID of the target document to master server computer 110. The process then flows to a step 416, where master server computer 110 receives the request and the access code sent by the user. Optionally, step 414 can be eliminated, so that the author can directly authorize access to the selected target document from step 413 to step 416.

In either case, the process then flows to a step 418, where master server computer 110 determines if the access code sent by the user matches an access code of the target document stored in master server computer 110. If the access code sent by the user matches the access code of the target document stored in master server computer 110, the process then flows to a step 420. In step 420, master server computer 110 accesses the target document, for example, LISA.jpg. The process then flows to a step 428, where master server computer 110 sends the target document to the user. The process then flows to a step 430, where the user receives the target document. In step 430 the user is able to view a copy of the target document for at least the duration of the session.

Referring back to step 412, if the author client denies access to the target document, the process then flows to a step 422. In step 422, master server computer 110 sends a message to the user denying access to the target document. The process then flows to a step 424, where the user receives the message denying access to the target document. This ends the process for the selected target document.

Referring back to step 418, if the access code sent by the user does not match the access code of the target document stored in master server computer 110, the process then flows to steps 422 and 424. The user is denied access to the selected target document and the process ends.

Referring to FIG. 6B(1), a network operation diagram illustrates the sequence of operational steps carried out by a user client computer 100, a master server computer 110, and a slave caching server computer 130 in viewing target documents referred to in hypertext links in referring documents. FIG. 6B(1) applies to the storage architecture of FIG. 2B(1). In a step 500, a user selects a hypertext link in a referring document and sends a "GET Request" to master server computer 110. The process then flows to a step 502, where master server computer 110 checks to see if the referring document is found or not found. The process then flows to a step 504, where master server computer 110 determines if the referring document is listed in master server computer 110. If the referring document is not listed in master server computer 110, the process then flows to a step 506. In step 506, a counter for the selected target document is updated. The process then flows to a step 507, where a database 207 is updated. Database 207 contains original copies of all of the referring documents having hypertext links to target documents. The process then flows to a step 508, where master server computer 110 generates a slave caching server address. The process then flows to a step 509, where master server computer 110 sends the target document request to a designated slave caching server computer. The slave caching server computer is designated by the address generated in step 508. The process then flows to a step 510, where the designated slave caching server computer receives the target document request and accesses the selected target document, for example, LISA.jpg.

In this example, the designated slave caching server computer is slave caching server computer 130. Thus, the target document, LISA.jpg is stored in slave caching server 130. The process then flows to a step 512, where slave caching server computer 130 sends the selected target document to the user. The process then flows to a step 514, where the user receives the selected target document and is able to view a copy of the target document for at least the duration of the session. Referring back to step 504, if the referring document is listed in master server computer 110, the process flows directly from step 504 to step 508 and the process continues through steps 509, 510, 512, and 514. Thus, the counter for the selected target document is not updated and the referring document database (database 207) is not updated.

Referring to FIG. 6B(2), a network operation diagram illustrates the sequence of operational steps carried out by an author client, a user, a master server computer 110, and a slave caching server computer 130 in viewing target files referred by hypertext links in referring documents, with the added feature of target document security. FIG. 6B(2) applies to the storage architecture of FIG. 2B(2). In a step 600, a user selects a hypertext link in a referring document and sends a "GET Request" to master server computer 110. The process then flows to a step 602, where master server computer 110 checks to see if the referring document is found or not found. The process then flows to a step 604, where master server computer 110 determines if the referring document is listed in master server computer 110. If the referring document is not listed in master server computer 110, the process then flows to a step 606, where master server computer 110 updates a counter for the selected target document. The process then flows to a step 607, where a database 207 is updated. Database 207 contains original copies of all referring documents having hypertext links to target documents. The process then flows to a step 608, where master server computer 110 generates an access code and adds an entry (ID of the target document and the access code) to a permissions database.

The permissions database is database 203. The process then flows to a step 609, where master server computer 110 generates a slave caching server computer address. The process then flows to a step 610, where master server computer 110 sends the ID of the target document and the access code to an author client. The process then flows to a step 612, where the author client receives the ID of the target document and the access code. The process then flows to a step 613, where the author client determines whether to authorize access to the target document. If the author client authorizes access to the selected target document, the process then flows to a step 614. In step 614, the author client sends the ID of the target document and the access code to the user and tells the user to initiate a request for the target document. The process then flows to a step 616, where the user sends a request with the access code and the ID of the target document to slave caching server computer 130. The process then flows to a step 618, where slave caching server 130 receives the request and the ID of the target document from the user. Optionally, step 616 can be eliminated and the author client can directly grant access to the selected target document. The process would flow directly from step 614 to step 618. In this example, the slave caching server computer is slave caching server computer 130.

However, slave caching server computer 135 is capable of performing the same operational steps. The process then flows to a step 620, where slave caching server 130 requests permission from master server computer 110 to access the target document. The process then flows to a step 622, where master server computer 110 receives the request and the access code sent by the user. The process then flows to a step 624, where master server computer 110 determines if the access code sent by the user matches an access code of the selected target document stored in master server computer 110. If the access code sent by the user matches the access code of the target document stored in master server computer 110, the process then flows to a step 630. In step 630, slave caching server 130 accesses the target document, for example, LISA.jpg. The process then flows to a step 632, where slave caching server 130 sends the target document to the user. The process then flows to a step 634, where the user receives the target document and is able to view a copy of the target document for at least the duration of the session. Referring back to step 624, if the access code sent by the user does not match the access code of the target document stored in master server computer 110, the process flows to a step 626. In step 626, master server computer 110 sends a message to the user denying access to the target document. The process then flows to a step 628, where the user receives the message denying access to the target document and the process ends.

Referring back to step 613, if the author client denies access to the target document, the process then flows to steps 626 and 628. The user is denied access to the target document and the process ends. Referring back to step 604, if the referring document is listed in master server computer 110, the process flows directly from step 604 to step 608 and bypasses steps 606 and 607. Thus, neither the counter for the target document nor database 207 is updated.

Referring to FIG. 6C(1), a network operation diagram illustrates the sequence of operational steps carried out by a user client computer 100, a master server computer 110, and a web server computer 120 in viewing target files referred to by hypertext links in referring documents. FIG. 6C(1) applies to the storage architecture shown in FIG. 2C(1). In a step 700, a user selects a hypertext link in a referring document and sends a "GET Request" to web server computer 120. The process then flows to a step 702, where web server computer 120 receives the request, looks up the target document file, and accesses a redirect address in master server computer 110. The process then flows to a step 704, where web server computer 120 sends the redirect address of master server computer 110 to the user. The process then flows to a step 706, where the user sends the "GET Request" to master server computer 110. The process then flows to a step 708, where master server computer 110 checks to see if the referring document is found or not found. The process then flows to a step 710, where master server computer 110 determines if the referring document is listed in master server computer 110. If the referring document is not listed in master server computer 110, the process then flows to a step 712, where a counter for the selected target document is updated.

The process then flows to a step 713, where a database 207 is updated. Database 207 contains original copies of all referring documents having a hypertext link to target documents. The process then flows to a step 714, where master server computer 110 accesses the selected target document. The process then flows to a step 716, where master server computer 110 sends the selected target document to the user. The process then flows to a step 718, where the user receives the selected target document. In step 718, the user is able to view a copy of the selected target document for at least the duration of the session. Referring back to step 710, if the referring document is listed in master server computer 110, the process flows directly from step 710 to step 714 and steps 712 and 713 are bypassed. Therefore, neither the counter for the target document nor database 207 is updated.

Referring to FIG. 6C(2), a network operation diagram illustrates the sequence of operational steps carried out by an author client, a user, a master server computer 110, and a web server computer 120 in viewing target files referred to by hypertext links in referring documents, with the added feature of target document security. FIG. 6C(2) applies to the storage architecture of FIG. 2C(2). In a step 800, a user selects a hypertext link in a referring document and sends a "GET Request" to web server computer 120. The process then flows to a step 802, where web server computer 120 receives the request, looks up the target document file, and accesses a redirect address for master server computer 110.

The process then flows to a step 804, where web server computer 120 sends the redirect address of master server computer 110 to the user. The process then flows to a step 806, where the user sends the "GET Request" to master server computer 110. The process then flows to a step 808, where master server computer 110 checks to see if the referring document is found or not found. The process then flows to a step 810, where master server computer 110 determines if the referring document is listed in master server computer 110. If the referring document is not listed in master server computer 110, the process then flows to a step 812. In step 812, a counter for the selected target document is updated. The process then flows to a step 813, where a database 207 is updated.

Database 207 contains original copies of all referring documents having a hypertext link to target documents. The process then flows to a step 814. In step 814, master server computer 110 generates an access code and adds an entry (ID of the target document and the access code) to a permissions database. The permissions database is database 203. The process then flows to a step 816, where master server computer 110 sends the ID of the target document and the access code to an author client. The process then flows to a step 818, where the author client receives the ID of the target document and the access code. The process then flows to a step 819, where the author client determines whether to authorize access to the target document. If the author client authorizes access to the target document, the process then flows to a step 820. In step 820, the author client sends the ID of the target document and the access code to the user and tells the user to initiate a request for the target document.

The process then flows to a step 822, where the user sends a request with the access code and the ID of the target document to master server computer 110. The process then flows to a step 824, where master server computer 110 receives the request and checks the access code sent by the user. Optionally, step 822 can be eliminated to allow the author client to directly authorize access to the selected target document. The process would flow directly from step 820 to step 824.

In either case, the process then flows to a step 826, where master server computer 110 determines whether the access code sent by the user matches an access code of the target document stored in master server computer 110. If the access code sent by the user matches the access code of the target document stored in master server computer 110, the process then flows to a step 832. In step 832, master server computer 110 accesses the selected target document. In this example, the target document is LISA.jpg. The process then flows to a step 834, where master server computer 110 sends the target document to the user. The process then flows to a step 836, where the user receives the target document and is able to view the selected target document for at least the duration of the session.

Referring back to step 826, if the access code sent by the user does not match the access code of the target document stored in master server computer 110, the process flows to a step 828. In step 828, master server computer 110 sends a message to the user denying access to the target document. The process then flows to a step 830, where the user receives the message denying access to the target document and the process ends. Referring back to step 819, if the author client denies access to the selected target document, the process flows to steps 828 and 830. Referring back to step 810, if the referring document is listed in master server computer 110, the process flows directly from step 810 to step 814 and steps 812 and 813 are bypassed. Accordingly, neither the counter for the target document nor database 207 is updated.

Referring to FIG. 6D(1), a network operation diagram illustrates the sequence of operational steps carried out by a user client computer 100, a master server computer 110, a web server computer 120, and a slave caching server computer 130 in viewing target files referred to by hypertext links in referring documents. FIG. 6D(1) applies to the storage architecture shown in FIG. 2D(1). In a step 800, a user selects a hypertext link in a referring document and sends a "GET Request" to web server computer 120. The process then flows to a step 802, where web server computer 120 receives the request, looks up the selected target document file, and accesses a redirect address for master server computer 110. The process then flows to a step 804, where web server computer 120 sends the redirect address of master server computer 110 to the user. The process then flows to a step 806, where the user sends the "GET Request" to master server computer 110. The process then flows to a step 808, where master server computer 110 checks to see if the referring document is found or not found.

The process then flows to a step 810, where master server computer 110 determines if the referring document is listed in master server computer 110. If the referring document is not listed in master server computer 110, the process then flows to a step 812. In step 812, master server computer 110 updates a counter for the selected target document. The process then flows to a step 813, where master server computer 110 updates a database 207. Database 207 contains original copies of all referring documents having a hypertext link to target documents. The process then flows to a step 814, where master server computer 110 generates a slave caching server computer address. The process then flows to a step 815, where master server computer 110 sends the target document request to a designated slave caching server computer.

The slave caching server computer address generated in step 814 determines the designated slave caching server computer. The process then flows to a step 816, where slave caching server computer 130 receives the target document request and accesses the selected target document. In this example the target document is LISA.jpg. Further, in this example the slave caching server is slave caching server computer 130. However, a slave caching server computer 135 can perform the same operational steps. The process then flows to a step 818, where slave caching server computer 130 sends the target document to the user. The process then flows to a step 820, where the user receives the selected target document and is able to view a copy of the selected target document for at least the duration of the session.

Referring back to step 810, if the referring document is listed in master server computer 110, the process flows directly from step 810 to step 814. Thus, steps 812 and 813 are bypassed and the counter for the target document and database 207 is not updated.

Referring to FIG. 6D(2), a network operation diagram illustrates the sequence of operational steps carried out by an author client, a user, a master server computer 110, a web server computer 120, and a slave caching server computer 130 in viewing target files referred to by hypertext links in referring documents, with the added feature of target document security. FIG. 6D(2) applies to the storage architecture of FIG. 2D(2). In a step 900, a user selects a hypertext link in a referring document and sends a "GET Request" to web server computer 120. The process then flows to a step 902, where web server computer 120 receives the request, looks up the selected target document file, and accesses a redirect address for master server computer 110.

The process then flows to a step 904, where web server computer 120 sends the redirect address of master server computer 110 to the user. The process then flows to a step 906, where the user sends the "GET Request" to master server computer 110. The process then flows to a step 908, where master server computer 110 checks to see if the referring document is found or not found. The process then flows to a step 910, where master server computer 110 determines if the referring document is listed in master server computer 110. If the referring document is not listed in master server computer 110, the process then flows to a step 912. In step 912, master server computer 110 updates a counter for the selected target document. The process then flows to a step 913, where master server computer 110 updates a database 207. Database 207 contains original copies of all referring documents having hypertext links to target documents.

The process then flows to a step 914. In step 914, master server computer 110 generates an access code and adds an entry (ID of the target document and the access code) to a permissions database. The permissions database is database 203. The process then flows to a step 915, where master server computer 110 generates a slave caching server computer address. The process then flows to a step 916, where master server computer 110 sends the ID of the target document and the access code to an author client. The process then flows to a step 918, where the author client receives the ID of the target document and the access code. The process then flows to a step 919, where the author client determines whether to authorize access to the target document.

If the author client authorizes access to the target document, the process then flows to a step 920. In step 920, the author client sends the ID of the target document and the access code to the user and tells the user to initiate a request for the target document. The process then flows to a step 922, where the user sends the request with the access code and the ID of the target document to slave caching server computer 130. The process then flows to a step 924, where slave caching server computer 130 receives the request and the ID of the target document from the user. In the example, the slave caching server computer is slave caching server computer 130. However, slave caching server computer 135 is capable of performing the same operational steps. Optionally, step 822 can be eliminated to allow the author client to directly authorize access to the selected target document. The process would flow directly from step 920 to step 924.

In either case, the process then flows to a step 926 where slave caching server 130 requests permission from master server computer 110 to access the selected target document. The process then flows to a step 928, where master server computer 110 receives the request and checks the access code sent by the user. The process then flows to a step 930. In step 930, master server computer 110 determines if the access code sent by the user matches an access code of the target document stored in master server computer 110. If the access code sent by the user matches the access code of the target document stored in master server computer 110, the process flows to a step 932. In step 932, web server computer 120 accesses the selected target document, for example, LISA.jpg. The process then flows to a step 934, where web server 120 sends the target document to the user. The process then flows to a step 940, where the user receives the target document and is able to view a copy of the target document for at least the duration of the session.

Referring back to step 930, if the access code sent by the user does not match the access code of the target document stored in master server computer 110, the process flows to a step 936. In step 936, master server computer 110 sends a message to the user denying access to the target document. The process then flows to a step 938 where the user receives the message denying access to the target document and the process ends. Thus, the user cannot view the target document.

Referring back to step 919, if the author client denies access to the target document, the process flows to steps 936 and 938. In this case, the user cannot view the target document. Referring back to step 910, if the referring document is listed in master server computer 110, the process flows directly from step 910 to step 914. Thus, steps 912 and 913 are bypassed. Accordingly, neither the counter for the target document nor database 207 is updated.

Referring to FIG. 7A(1), a network operation diagram illustrates the sequence of operational steps carried out by an author client, a user, and a master server computer 110 in deleting target files/referring documents for the storage architectures shown in FIG. 2A(1) and FIG. 2A(2). In a step 1000, a user sends a delete request for a referring document to master server computer 110. The process then flows to a step 1002, where master server computer 110 accesses the selected referring document and deletes it. The process then flows to a step 1004, where master server computer 110 updates a counter for a target document referred to in the deleted referring document. The process then flows to a step 1005, where master server computer 110 updates a database 207. Database 207 contains original copies of all referring documents having hypertext links to target documents. The process then flows to a step 1006, where master server computer 110 determines if the counter for the target document is equal to zero. If the counter for the target document is equal to zero, the process then flows to a step 1012, where master server computer 110 sends a message indicating that the referring document has been deleted. The process then flows to a step 1014, where the user receives the message indicating that the referring document has been deleted.

Referring back to step 1012, after sending the message indicating that the referring document is deleted, master server computer 110 proceeds to a step 1016. In step 1016, master server computer 110 sends a message asking if an author client wants to delete a target document. The process then flows to a step 1018, where the author client receives the message asking if the author client wants to delete the target document. The process then flows to a step 1020, where it is determined whether the author client wants to delete the target document. If the author client wants to delete the target document, the process then flows to a step 1022. In step 1022, the author client sends a "Delete Request" for the target document. The process then flows to a step 1024, where master server computer 110 receives the Delete Request, accesses the target document, and deletes it. The process then flows to a step 1025, where master server computer 110 updates the target document database. The process then flows to a step 1026, where master server computer 110 sends a message indicating that the target document is deleted. The process then flows to a step 1028, where the author client receives the message indicating that the target document is deleted.

The process then flows to a step 1030, where master server computer 110 sends a message to the user asking if the user wants to delete another referring document. The process then flows to a step 1032, where the user receives the message asking if the user wants to delete another referring document. The process then flows to a step 1034, where it is determined whether the user wants to delete another referring document. If the user wants to delete another referring document, the process then flows from step 1034 back to step 1000. Alternatively, if the user does not want to delete another referring document, the process flows to a step 1036 and the process ends.

Referring back to step 1020, if the author does not want to delete the target document, the process flows directly from step 1020 to step 1030. Referring back to step 1006, if the counter for the target document is not equal to zero, the process then flows to a step 1008, where master server computer 110 sends a message indicating that the referring document is deleted. The process then flows to a step 1010, where the user receives the message indicating that the referring document is deleted. The process then flows from step 1010 to steps 1030, 1032, 1034 and either 1000, or 1036, as described above. In step 1030, as described above, the user is given an opportunity to delete another referring document. Optionally, steps 1016, 1018, 1020, 1026, and 1028 can be eliminated so that the process automatically deletes the target document when the counter for the target document equals zero. Step 1022 would be incorporated into master server computer 110.

Referring to FIG. 7B(1), a network operation diagram illustrates the sequence of operational steps carried out by an author client, a user, a master server computer 110, and a slave caching server computer 110 in deleting target files/referring documents for the storage architectures shown in FIG. 2B(1) and FIG. 2B(2). In a step 1100, a user sends a delete request for a referring document to master server computer 110. The process then flows to a step 1102, where the master server computer 110 accesses the referring document and deletes it. The process then flows to a step 1104, where master server computer 110 updates a counter for a target document, which is referred to by a hypertext link in the deleted referring document. The process then flows to a step 1105, where master server computer 110 updates a database 207. As mentioned above, database 207 contains original copies of all referring documents having hypertext links to target documents. The process then flows to a step 1106, where master server computer 110 determines if the counter for the target document is equal to zero. If the counter for the target document is equal to zero the process then flows to a step 1112. In step 1112, master server computer 110 sends a message indicating that the referring document is deleted. The process then flows to a step 1114, where the user receives the message indicating that the referring document is deleted.

Referring back to step 1112, after master server computer 110 sends a message indicating that the referring document is deleted master server computer 110 advances to step 1113. In step 1113 master server computer 110 generates a slaves caching server address. The process then flows to a step 1116, where master server computer 110 sends a message asking whether an author client wants to delete the target document. The process then flows to a step 1118, where the author client receives the message asking whether the author client wants to delete the target document. The process then flows to a step 1120, where it is determined whether the author client wants to delete the target document. If the author client wants to delete the target document, the process flows to a step 1122. In step 1122 the author client sends a delete request for the target document. The process then flows to a step 1124, where master server computer 110 receives the delete request and sends the delete request to a designated slave caching server computer. The slave caching server computer is designated according to the slave caching server computer address generated in step 1113. The process then flows to a step 1126, where a slave caching server computer receives the delete request, accesses the target document, and deletes it. In this example the slave caching server computer is slave caching server 135. However, slave caching server 130 is capable of performing the same operational steps. The process then flows to a step 127, where slave caching server 135 updates a target document database. For slave caching server 135, the target document database is database 205. For slave caching server 130 the target document database is database 204.

The process then flows to a step 1128, where master server computer 110 sends a message indicating that the target document is deleted. The process then flows to a step 1130, where the author client receives the message indicating that the target document is deleted. The process then flows to a step 1132, where master server computer 110 sends a message asking whether the user wants to delete another referring document. The process then flows to a step 1132, where master server computer 110 sends a message asking whether the user wants to delete another referring document. The process then flows to a step 1134, where the user receives the message asking whether the user wants to delete another referring document. The process then flows to a step 1136, where it is determined whether the user wanted to delete another referring document. If the user wants to delete another referring document the process flows from step 1136 back to step 1100. Alternatively, if the user does not want to delete another referring document the process flows to a step 1140, where the process ends.

Referring back to step 1120, if the author client does not want to delete the target document the process flows directly from step 1120 to step 1132. Referring back to step 1106, if the counter for the target document is not equal to zero the process flows to a step 1108. In step 1108, master server computer 110 sends a message indicating that the referring document is deleted. The process then flows to a step 1110, where the user receives the message indicating that the referring document is deleted. The process then flows directly from step 1110 to step 1132. Optionally, one or more of steps 1116, 1118, 1120, 1128, and 1130 can be eliminated so that the process automatically deletes the target document when the counter for the target document equals zero. Step 1122 would then be incorporated in master server computer 110.

Referring to FIG. 7C(1), a network operation diagram illustrates the sequence of operational steps carried out by an author client, a user, a master server computer 110, and a web server computer 120 in deleting target files/referring documents for the storage architectures shown in FIG. 2C(1) and FIG. 2C(2). In a step 1200, a user sends a delete request for a referring document to web server computer 120. The process then flows to a step 1202, where web server computer 120 receives the request, looks up the selected referring document, and accesses a redirect address for master server computer 110. The process then flows to a step 1204, where web server computer 120 sends the redirect address of master server computer 110 to the user. The process then flows to a step 1206, where the user sends the delete request to master server computer 110. The process then flows to a step 1208, where master server computer 110 accesses the selected referring document and deletes it.

The process then flows to a step 1210, where master server computer 110 updates a counter for a target document referred to by a hypertext link in the selected referring document. The process then flows to a step 1211, where master server computer 110 updates a database 207. As described above, database 207 contains original copies of all referring documents having hypertext links to target documents. The process then flows to a step 1212, where master server computer 110 determines if the counter for the target document is equal to zero. If the counter for the target document is equal to zero the process flows to a step 1218. In step 1218, master server computer 110 sends a message indicating that the referring document is deleted. The process then flows to a step 1220, where the user receives the message indicating that the referring document is deleted.

Referring back to step 1218, after master server computer 110 sends a message indicating that the referring document is deleted master server computer 110 advances to a step 1222. In step 1222, master server computer sends a message asking if an author client wants to delete the target document. The process then flows to a step 1224, where the author client receives the message asking whether the author client wants to delete a target document referred to by a hypertext link in the deleted referring document. The process then flows to a step 1226, where it is determined whether the author client wants to delete the target document. If the author client wants to delete the target document the process flows to a step 1228, where the author client sends a delete request for the target document. The process then flows to a step 1230, where master server computer 110 receives the delete request, accesses the target document, and deletes it. The process then flows to a step 1231, where master server computer 110 updates a target document database. In this example, the target document database is database 202. The process then flows to a step 1232, where master server computer 110 sends a message indicating that the target document is deleted. The process then flows to a step 1236, where the author client receives the message indicating that the target document is deleted.

The process then flows to a step 1238, where master server computer 110 sends a message asking whether the user wants to delete another referring document. The process then flows to a step 1240, where the user receives the message asking whether the user wants to delete another referring document. The process then flows to a step 1242, where it is determined whether the user wants to delete another referring document. If the user wants to delete another referring document the process flows from step 1242 back to step 1200. Alternatively, if the user does not want to delete another referring document, the process flows to a step 1244 and the process ends.

Referring back to step 1212, if the master server determines that the counter for the target document is not equal to zero, the process flows to a step 1214. In step 1214, master server computer 110 sends a message indicating that the referring document is deleted. The process then flows to a step 1216, where the user receives the message indicating that the referring document is deleted. The process then flows to step 1238. The process then flows to steps 1240, 1242, and either back to step 1200 or to step 1244, as described above. Referring back to step 1226, if the author client does not want to delete the target document the process flows directly from step 1226 to step 1238. Optionally, one or more of steps 1222, 1224, 1226, 1232, and 1236 can be eliminated so that the process automatically deletes the target document when the counter for the target document equals zero. Step 1228 would then be incorporated in master server computer 110.

Referring to FIG. 7D(1), a network operation diagram illustrates the sequence of operational steps carried out by an author client, a user, a master server computer 110, a web server computer 120, and a slave caching server computer 135 in deleting target files/referring documents for the storage architectures shown in FIG. 2D(1) and FIG. 2D(2). In a step 1300, a user sends a delete request for a referring document to web server 120. The process then flows to a step 1302, where web server computer 120 receives the request, looks up the referring document, and accesses a redirect address for master server computer 110. The process then flows to a step 1304, where web server computer 120 sends the redirect address of master server computer 110 to the user. The process then flows to a step 1306, where the user sends the request to master server computer 110.

The process then flows to a step 1308, where master server computer 110 accesses the selected referring document and deletes it. The process then flows to a step 1310, where master server computer 110 updates a counter for a target document referred to by a hypertext link in the deleted referring document. The process then flows to a step 1311, where master server computer 110 updates a database 207. Database 207 contains original copies of all referring documents having a hypertext link to target documents. The process then flows to a step 1312, where it is determined whether the counter for the target document is equal to zero. If the counter for the target document is equal to zero, the process flows to a step 1318. In step 318, master server computer 110 sends a message to the user indicating that that the referring document is deleted. The process then flows to a step 1320, where the user receives the message indicating that the referring document is deleted.

Referring back to step 1318, after sending the message indicating that the referring document has been deleted, the process flows to a step 1322. In step 1322, master server computer 110 sends a message to an author client asking whether the author client wants to delete a target document referred to by a hypertext link in the deleted referring document. The process then flows to a step 1324, where the author client receives the message asking whether the author client wants to delete the target document. The process then flows to a step 1326, where the author client decides whether to delete the target document. If the author client decides to delete the target document, the process then flows to a step 1328. In step 1328, the author client sends a delete request for the target document to master server computer 110. The process then flows to a step 1330, where master server computer 110 receives the delete request and generates a slave caching server computer address. The process then flows to a step 1331, where master server computer 110 sends the delete request for the target document to a specified slave caching server computer. The slave caching server computer address generated in step 1330 designates the slave caching server computer. In this example, the slave caching server computer is slave caching server computer 135.

However, slave caching server computer 130 is capable of performing the same operation steps as slave caching server computer 135. The process then flows to a step 1332, where slave caching server computer 135 receives the request, accesses the target document, and deletes it. The process then flows to a step 1333, where slave caching server computer 135 updates a database for the target document. The target document database is database 205. The process then flows to a step 1334, where master server computer 110 sends a message to the author client indicating that the target document is deleted. The process then flows to a step 1336, where the author client receives the message indicating that the target document is deleted. The process then flows to a step 1338, where master server computer 110 sends a message asking whether the user wants to delete another referring document. The process then flows to a step 1340, where the user receives the message asking whether to delete another referring document. The process then flows to a step 1342, where the user determines whether to delete another referring document. If the user decides to delete another referring document, the process then flows from step 1342 back to step 1306. Alternatively, if the user decides not to delete another referring document, the process flows to a step 1344, where the process ends.

Referring back to step 1326, if the author client does not want to delete the target document, the process flows directly from step 1326 to step 1338. Referring back to step 1312, if the counter for the target document is not equal to zero, the process flows from step 1312 to a step 1314. In step 1314, master server computer 110 sends a message to the user indicating that the referring document is deleted. The process then flows to a step 1316, where the user receives the message indicating that the referring document is deleted. The process then flows from step 1316 to step 1338 and the process flows to steps 1340, 1342, and either 1344 or 1306, as described above. Optionally, one or more of steps 1322, 1324, 1326, 1334, and 1336 can be eliminated so that the process automatically deletes the target document when the counter for the target document equals zero. Step 1328 would be incorporated in master server computer 110.

Referring to FIG. 8A(1), a network operation diagram illustrates the sequence of operational steps carried out by a user client computer 100 and a master server computer 110 in creating a hypertext link between a target file and a referring document for the storage architectures shown in FIG. 2A(1) and FIG. 2A(2). In a step 1400 a user sends a target document to master server computer 110 via FTP, (file transfer protocol). The process then flows to a step 1402, where master server computer 110 receives the target document and stores it in a database 202. The process then flows to step 1404, where the user sends a "Get Request" for a referring document to master server computer 110. The process then flows to a step 1406, where master server computer 110 receives the request and accesses the referring document. The process then flows to a step 1408, where master server computer 110 sends a copy of the referring document to the user.

The copy of the referring document is accessible by the user for at least the duration of the session. The process then flows to a step 1410, where the user receives the copy of the referring document. The process then flows to a step 1412, where the user sends an "embed target document request" to master server computer 110. The process then flows to a step 1414, where master server computer 110 accesses the target document and embeds it in the referring document. The process then flows to a step 1416. In step 1416, master server computer 110 updates a database 201 ((adds a URL of the target document) (ID of the target document) in a first list and adds the referring document to another list). The process then flows to a step 1418, where master server computer 110 updates a counter for the target document. The process then flows to a step 1419, where master server computer 110 updates a database 207.

As mentioned above, database 207 contains original copies of referring documents having hypertext links to target documents. The process then flows to a step 1420, where master server computer 110 sends a message asking whether the user wants to embed more target documents. The process then flows to a step 1422, where the user receives the message asking whether the user wants to embed more target documents. The process then flows to a step 1424, where it is determined whether the user wants to embed another target document. If the user wants to embed another target document the process flows from step 1424 back to step 1412.

Alternatively, if the user does not want to embed another target document the process flows from step 1424 to a step 1426. In step 1426, master server computer 110 sends a message asking whether the user wants to transfer another target document. The process then flows to a step 1428, where the user receives the message asking whether the user wants to transfer another target document. The process then flows to a step 1430, where it is determined whether the user wants to transfer another target document. If the user wants to transfer another target document the process flows from step 1430 back to step 1400. Alternatively, if the user does not want to transfer another target document the process flows from step 1430 to step 1432, where the process ends.

Referring to FIG. 8B(1), a network operation diagram illustrates the sequence of operational steps carried out by a user client computer 100, a master server computer 110, and a slave caching server computer 130 in creating a hypertext link between a target file and a referring documents for the storage architectures shown in FIG. 2B(1) and FIG. 2B(2). In a step 1500 a user sends a target document to a master server computer 110 using FTP (file transfer protocol). The process then flows to a step 1501, where master server computer 110 receives the target document and generates a slave caching server address. The process then flows to a step 1502, where master server computer 110 transfers the target document to a designated slave caching server. The process then flows to a step 1504, where a slave caching server receives the target document and stores it in a database 204. In this example, the slave caching server computer is slave caching server computer 130. However, slave caching server computer 135 is capable of performing the same operational steps. The process then flows to a step 1506, where the user sends a "Get Request" for the referring document to master server computer 110.

The process then flows to a step 1508, where master server computer 110 receives the request and accesses the referring document. The process then flows to a step 1510, where master server computer 110 sends a copy of the referring document to the user. The copy of the referring document is available to the user for at least the duration of the session. The process then flows to a step 1512, where the user receives the copy of the referring document. The process then flows to a step 1514, where the user sends an "embed target document request" to master server computer 110. The process then flows to a step 1516, where master server computer 110 receives the embed request and generates a slave caching server address. The process then flows to a step 1517, where master server computer 110 sends the request for the target document to a designated slave caching server. The process then flows to a step 1518, where a slave caching server computer accesses the target document and sends it to master server computer 110. Note, in this example, the slave caching server computer is slave caching computer 130.

However, slave caching server computer 135 is capable of performing the same operational steps. The process then flows to a step 1519, where master server computer 110 receives the target document and embeds it in the referring document. The process then flows to a step 1520. In step 1520, master server computer 110 updates a database 201 ((adds a URL) (ID of the target document) in a first list and adds the referring document to another list). The process then flows to a step 1522, where master server computer 110 updates a counter for the target document. The process then flows to a step 1523, where master server computer 110 updates a database 207.

As mentioned above, database 207 contains original copies of referring documents having hypertext links to target documents. The process then flows to a step 1524, where master server computer 110 sends a message asking whether the user wants to embed more target documents. The process then flows to a step 1526, where the user receives the message asking whether the user wants to embed more target documents. The process then flows to a step 1528, where it is determined whether the user wants to embed more target documents. If the user wants to embed more target documents the process flows from step 1528 back to step 1514. Alternatively, if the user does not want to embed another target document the process flows from step 1528 to a step 1530. In step 1530, master server computer 110 sends a message asking whether the user wants to transfer another target document. The process then flows to a step 1532, where the user receives the message asking whether the user wants to transfer another target document. The process then flows to a step 1534, where it is determined whether the user wants to transfer another target document. If the user wants to transfer another target document the process flows from step 1534 back to step 1500. Alternatively, if the user does not want to transfer another target document the process flows from step 1534 to a step 1536, where the process ends.

Referring to FIG. 8C(1), a network operation diagram illustrates the sequence of operational steps carried out by a user client computer 100, a master server computer 110, and a web server computer 120 in creating a hypertext link between a target file and a referring document for the storage architectures shown in FIG. 2C(1) and FIG. 2C(2). In a step 1600, a user sends a target document to web server computer 120 using FTP (file transfer protocol). The process then flows to a step 1602, where web server computer 120 receives the request, looks up the file, and accesses a redirect address. The process then flows to a step 1604, where web server computer 120 sends the redirect address of master server computer 110 to an author client. The process then flows to a step 1606, where the user sends the target document to master server computer 110 using FTP.

The process then flows to a step 1608, where master server computer 110 receives the target document and stores it in a database 202. The process then flows to a step 1610, where the user sends a "Get Request" for the referring document to master server computer 110. The process then flows to a step 1612, where master server computer 110 receives the request and accesses the referring document. The process then flows to a step 1614, where master server computer 110 sends a copy of the referring document to the user. The copy of the referring document is accessible by the user for at least the duration of the session. The process then flows to a step 1616, where the user receives the copy of the referring document. The process then flows to a step 1618, where the user sends an "embed target document request" to master server computer 110. The process then flows to a step 1620, where master server computer 110 accesses the target document and embeds it in the referring document. The process then flows to a step 1622. In step 1622, master server computer 110 updates a database 201 ((adds a URL address of the target document) (ID of the target document) in a first list and adds the referring document to another list).

The process then flows to a step 1624, where master server computer 110 updates a counter for the target document. The process then flows to a step 1625, where master server computer 110 updates a database 207. As mentioned above, database 207 contains original copies of referring documents having hypertext links to target documents. The process then flows to a step 1626, where master server computer 110 sends a message asking whether the user wants to embed more target documents. The process then flows to a step 1628, where the user receives the message asking whether the user wants to embed more target documents. The process then flows to a step 1630, where it is determined whether the user wants to embed another target document. If the user wants to embed another target document the process flows from step 1630 back to 1618. Alternatively, if the user does not want to embed another target document the process flows from step 1630 to a step 1632.

In step 1632, master server computer 110 sends a message asking whether the user wants to transfer another target document. The process then flows to a step 1634, where the user receives the message asking whether the user wants to transfer another target document. The process then flows to a step 1636, where it is determined whether the user wants to send another target document. If the user wants to send another target document the process flows from step 1636 back to step 1606. Alternatively, if the user does not want to send another target document the process flows from step 1636 to a step 1638, where the process ends.

Referring to FIG. 8D(1), a network operation diagram illustrates the sequence of operational steps carried out by a user client computer 100, a master server computer 110, a web server computer 120, and a slave caching server computer 130 in creating a hypertext link between a target file and a referring document for the storage architectures shown in FIG. 2D(1) and FIG. 2D(2). In a step 1700, a user sends a target document to web server computer 120 using FTP (file transfer protocol). The process then flows to a step 1702, where a web server computer 120 receives the request, looks up the file, and accesses a re-direct address for master server computer 110. The process then flows to a step 1704, where web server computer 120 sends redirect address of master server computer 110 to the user. The process then flows to a step 1706, where the user sends the target document to master server computer 110 using FTP.

The process then flows to a step 1707, where master server computer 110 receives the target and generates a slave caching server computer address. The process then flows to a step 1708, where master server computer 110 receives the target document and transfers it to a designated slave caching server. The designated slave caching server is determined from the slave caching server computer address generated in step 1707. The process then flows to a step 1710 where a slave caching server computer receives the target document and stores it in a database 204. In this example the slave caching server computer is slave caching server computer 130.

However, slave caching server computer 135 is capable of performing the same operational steps. The process then flows to a step 1712, where the user sends a "Get Request" for the referring document to master server computer 110. The process then flows to a step 1714, where master server computer 110 receives the request and accesses the referring document. The process then flows to a step 1716, where master server computer 110 sends a copy of the referring document to the user. The process then flows to a step 1718, where the user receives the copy of the referring document. The copy of the referring document is accessible for at least the duration of the session. The process then flows to a step 1720, where the user sends an "embed target document request" to master server computer 110. The process then flows to a step 1721, where master server computer 110 receives the embed request and generates a slave caching server computer address. The process then flows to a step 1722, where master server computer 110 sends the request for the referring document to a designated slave caching server.

The slave caching server computer address generated in step 1721 designates the slave caching server. The process then flows to a step 1724, where slave caching server computer 130 accesses the target document and sends it to master server computer 110. The process then flows to a step 1725, where master server computer 110 receives the target document and embeds it in the referring document. The process then flows to a step 1726. In step 1726 master server computer 110 updates a database 201 ((adds a URL address of the target document (ID of the target document) in a first list and adds the referring document to another list. The process then flows to a step 1728, where master server computer 110 updates a counter for the target document. The process then flows to a step 1729, where slave caching server computer 130 updates a target document database. The process then flows to a step 1730, where master server computer 110 updates a database 207. As mentioned above, database 207 contains original copies of referring documents having hypertext links to target documents. The process then flows to a step 1731, where master server computer 110 sends a message asking whether the user wants to embed more target documents. The process then flows to a step 1732, where the user receives the message asking whether the user wants to embed more target documents.

The process then flows to a step 1734, where it is determined whether the user wants to embed another target document. If the user wants to embed another target document, the process flows from step 1734 back to step 1720. Alternatively, if the user does not to embed another target document, the process flows from step 1734 to a step 1736. In step 1736, master server computer 110 sends a message asking whether the user wants to transfer another target document. The process then flows to a step 1738, where the user receives the message asking whether the user wants to transfer another target document. The process then flows to a step 1740, where it is determined whether the user wants to transfer another target document. If the user wants to transfer another target document the process flows from step 1740 back to step 1700. Alternatively, the process then flows from step 1740 to a step 1742, where the process ends.

Referring to FIG. 9, a diagram illustrates a sequence of method steps for a method for creating a hypertext link between a target file and a referring document by copying and pasting a hypertext link onto a referring document and saving the referring document. In a step 1800, a user copies a hypertext link pointing to a target document from a referring document. The process then flows to a step 1802, where the user opens a second referring document. The process then flows to a step 1804, where the user pastes a hypertext link onto the second referring document. The process then flows to a step 1806, where the user saves the second referring document. The process then flows to a step 1808, where the process ends.

Referring to FIG. 10, a diagram illustrates an exemplary get request sent from a user client computer 100 to a web server computer 120. FIG. 10 shows the structure for a "Get Request" for a target document sent from user client computer 100 to web server computer 120. The "Get Request" format is a destination IP address, followed by a source IP address, followed by the get command "GET www.cnn.com/slave130/pics/LISA.jpg". This get command indicates that the target document LISA.jpg is located in a subdirectory "pics" in a slave caching server 130.

Referring to FIG. 11, a diagram illustrates an exemplary redirected address sent from web server computer 120 to user client computer 100. FIG. 11 shows the structure for the redirect address for a master server 110 from web server computer 120 back to user computer 100. The redirected address contains a master server IP address. The format is a destination address of user computer 100, followed by a source address of web server computer 120, followed by a redirect address of master server computer 110, followed by the original Get Request, shown in FIG. 10. The source IP address is followed by the get request of FIG. 10. The get request is followed by a count for updating the counter for a target document. Thus, web server computer 120 sends the redirect address to the user so that the user can access a target file stored in either master server computer 110 or one of slave caching server computers (130,135).

Figure 12:
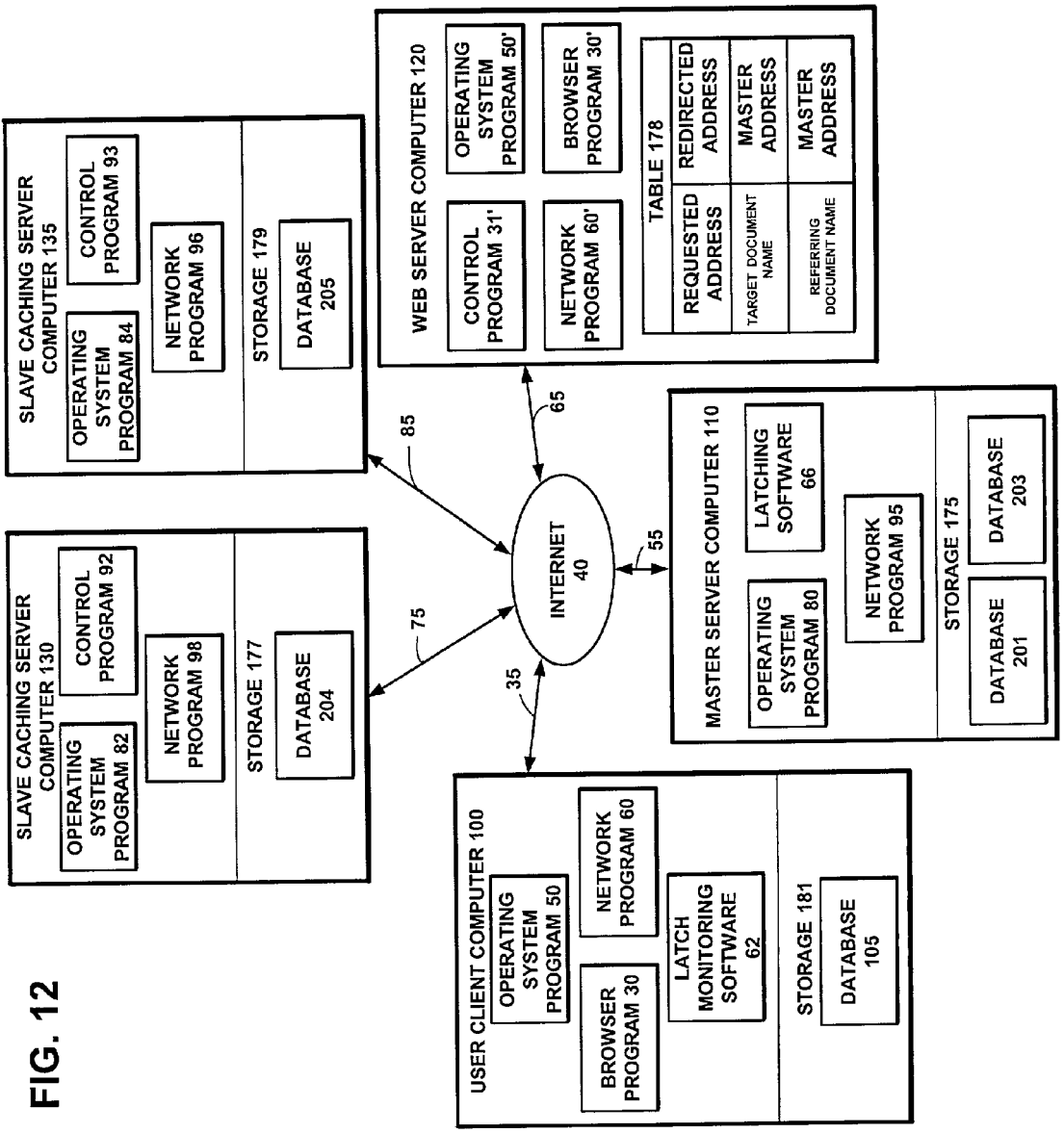
FIG. 12 is a schematic diagram illustrating the storage architecture for a user client computer, a master server computer, a web server computer, and a plurality of slave caching server computers for a fifth embodiment of the present invention, which provides security for a target document, referred to in a referring document and stored on a user client computer.

Referring to FIG. 12, a schematic diagram illustrates the storage architecture for a user client computer 100, a master server computer 110, a web server computer 120, and a plurality of slave caching server computers (130, 135) for a fifth embodiment of the present invention, which provides security for a target document referred to in a referring document and stored on a user client computer. FIG. 12 shows user client computer 100, master server computer 110, web server computer 120, and a plurality of slave caching server computers (130, 135) as they are interconnected over a network 40. User client computer 100 includes an operating system program 50, a browser program 30, a network program 60, a latch monitoring software 62, and a storage 181. Operating system program 50, browser program 30, and network program 60 were described in the detailed description for FIG. 2A(1) above. Therefore, only latch monitoring software 62 and storage 181 will be detailed. Latch monitoring software 62 is described in greater detail in FIG. 15. More particularly, latch monitoring software 62 is detailed in steps 1914, 1921, 1934, 1948, and 1952. Further, in an alternative embodiment of the invention, latch monitoring software 62 is described in greater detail in FIG. 16. More particularly, latch monitoring software 62 is detailed in steps 2000, 2002, 2004, and 2010. In yet another embodiment of the invention, latch monitoring software 62 is described in greater detail in FIG. 17. More particularly, latch monitoring software 62 is detailed in steps 2114, 2134, 2136, 2140, 2142, and 2144. Latch monitoring software 62 allows a user to read a target document referred to in a referring document. This occurs in step 1952, shown in FIG. 15.

After the user receives the target document as described in step 1952 latch monitoring software 62 allows the user to open and read the target document which is hypertext linked to the referring document. As described later in greater detail in FIG. 16 and FIG. 17, latch monitoring software 62 allows user client computer 100 to communicate with master server computer 110. Storage 181 includes a database 105, which is described in greater detail in FIG. 13.

Master server computer 110 includes an operating system program 80, a latching software 66, a network program 95, and a storage 175. Operating system program 80 and network program 95 were described in the detailed description for FIG. 2A(1) above. Therefore, only latching software 66 and storage 175 will be detailed. Latching software 66 is described in greater detail in FIG. 15. More particularly, latching software 66 is detailed in steps 1908, 1910, 1912, 1916, 1918, 1920, 1922, 1924, 1926, 1940, 1942, and 1946. Further, in an alternative embodiment of the invention, software 66 is described in greater detail in FIG. 16. More particularly, latching software 66 is detailed in steps 2012, 2014, 2016, 2018, 2020, 2028, 2030, and 2036. In yet another embodiment of the invention, latching software 66 is described in greater detail in FIG. 17. More particularly, latching software 66 is detailed in steps 2108, 2110, 2116, 2118, 2124, 2122, 2126, 2130, 2132, and 2138. Storage 175 includes a database 201 and a database 203. Databases 201 and 203 are described in greater detail in FIG. 14. Web server computer 120 includes a control program 31', an operating system program 50', a network program 60', a browser program 30', and a table 178. Operating system program 50', network program 60', browser program 30', and Table 178 were described in the detailed description for FIG. 2C(1) above. Therefore, only control program 31' will be described in greater detail below. Control program 31' is described in greater detail in FIG. 15. More particularly, control program 31' is detailed in steps 1902 and 1904. Further, in an alternative embodiment of the invention, control program 31' is described in greater detail in FIG. 16. More particularly, control program 31' is detailed in steps 2006 and 2008. In yet another embodiment of the invention, control program 31' is described in greater detail in FIG. 17. More particularly, control program 31' is detailed in steps 2102 and 2104.

Figure 15:
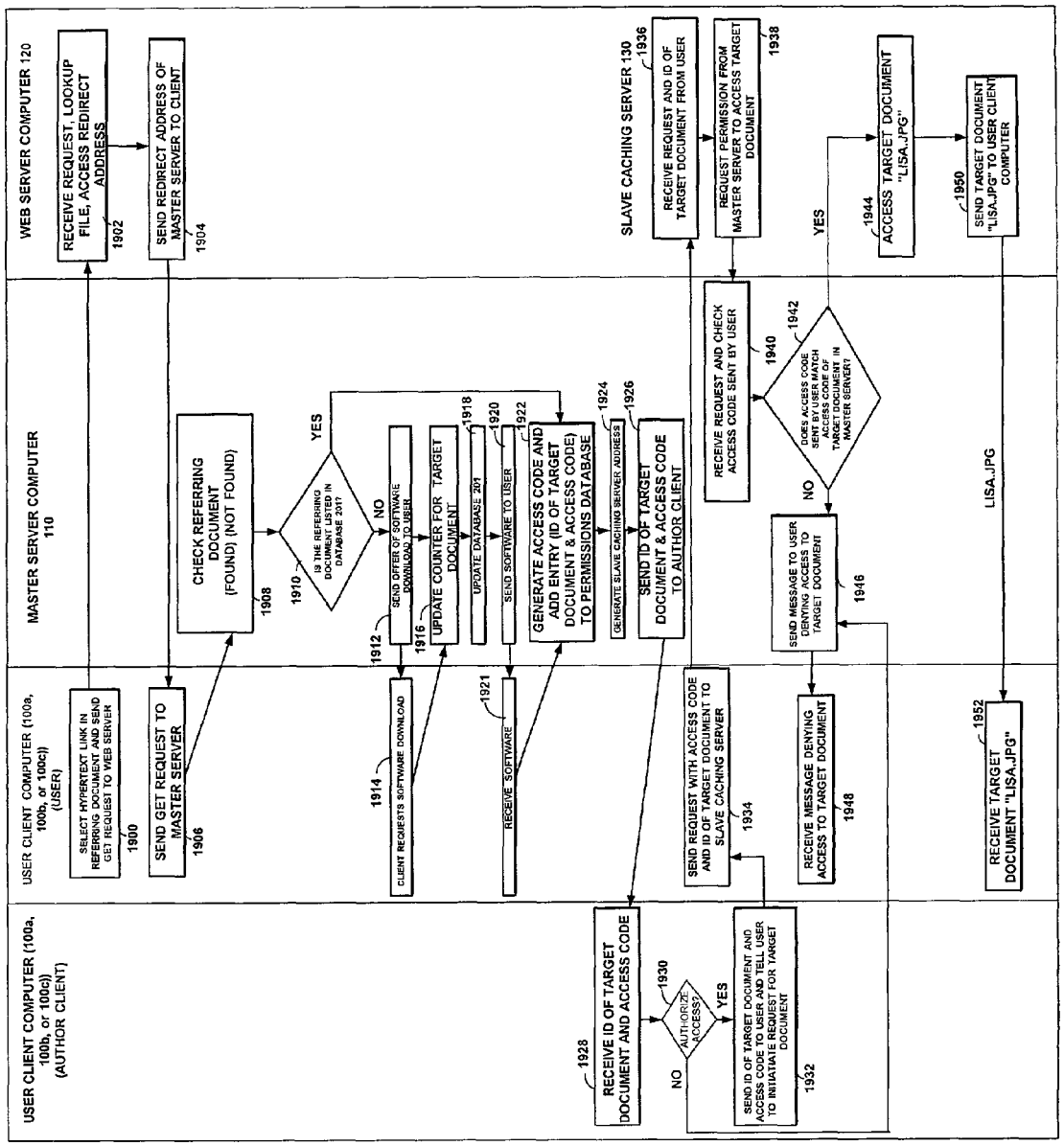
FIG. 15 is a network operation diagram illustrating a sequence of operational steps carried out by an author client, a user, a master server computer, a web server computer, and a slave caching server computer in viewing target files referred to in secure referring documents, for the embodiment shown in FIG. 12.
Figure 16:
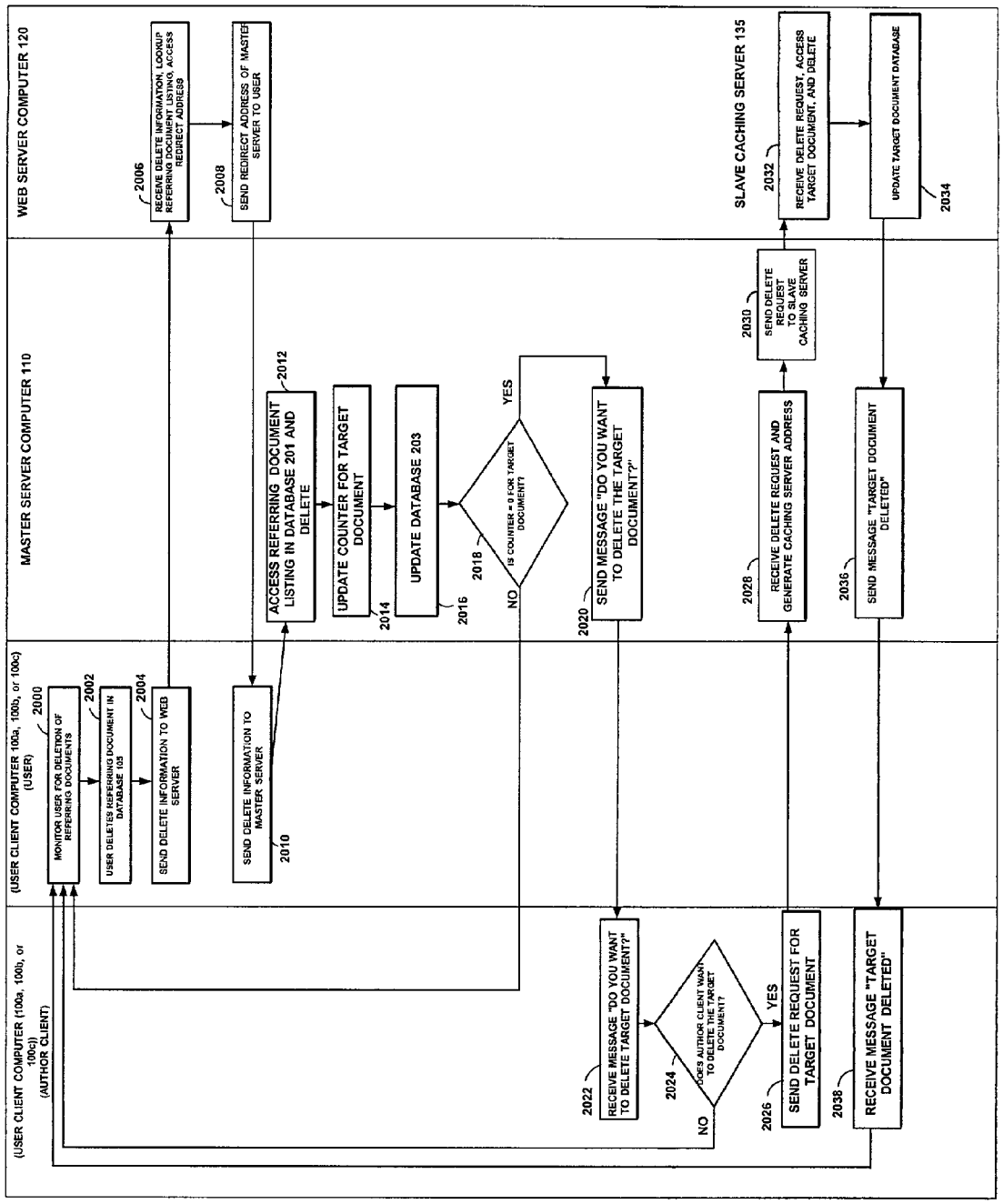
FIG. 16 is a network operation diagram illustrating a sequence of operational steps carried out by an author client, a user, a master server computer, a web server computer, and a slave caching server computer in deleting target files/referring documents for the embodiment shown in FIG. 12.
Figure 17:
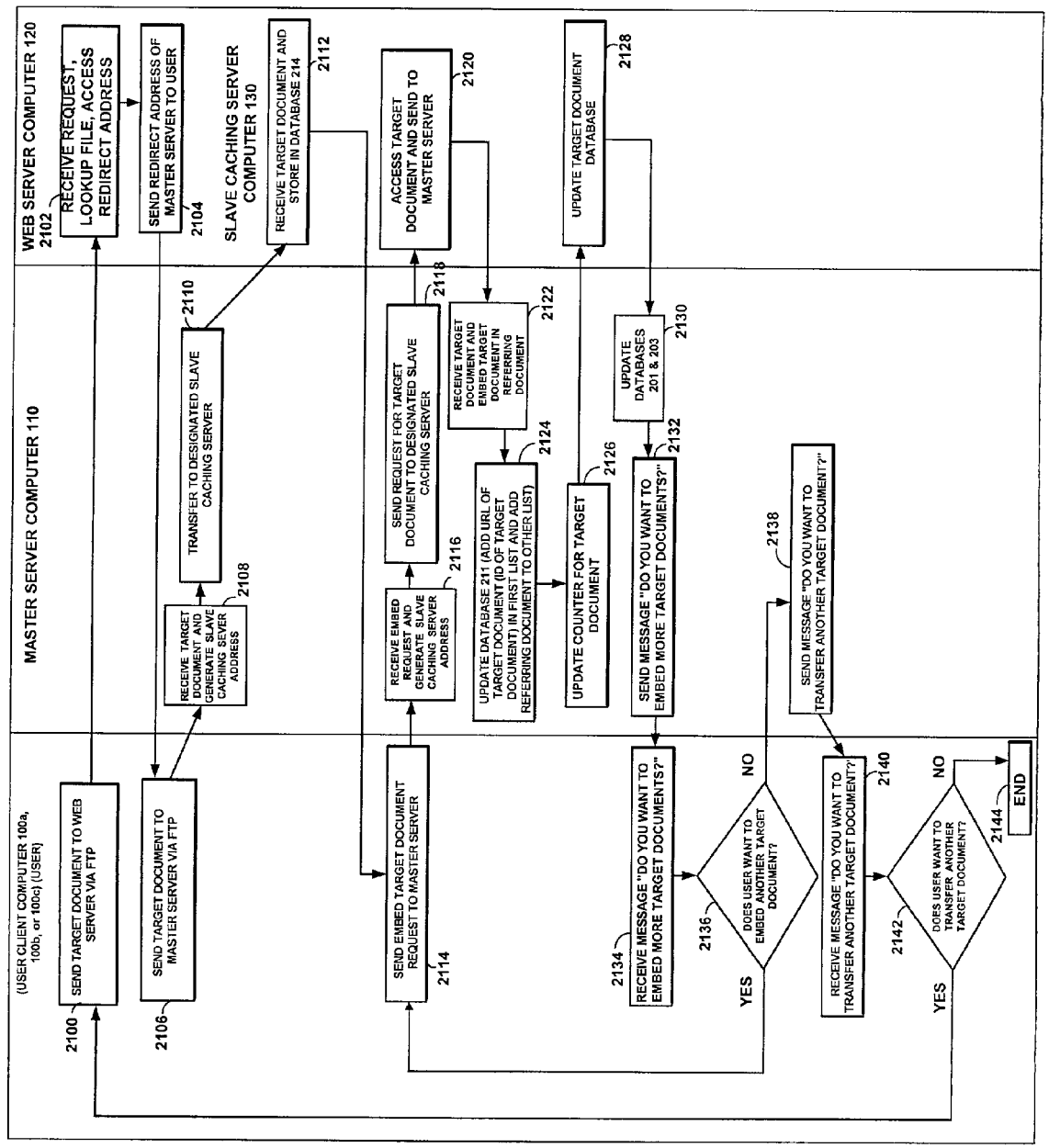
FIG. 17 is a network operation diagram illustrating a sequence of operational steps carried out by a user client computer, a master server computer, a web server computer, and a slave caching server computer in creating a hypertext link between a target file and a referring document for the embodiment shown in FIG. 12.

Slave caching server computer 135 includes an operating system program 84, a control program 93, a network program 96, and a storage 179. Operating system program 84 and network program network 96 were described in the detailed description for FIG. 2D(1) above. Therefore, only control program 93 and storage 179 will be detailed below. Control program 93 is described in greater detail in FIG. 16. More particularly, control program 93 is detailed in steps 2032 and 2034. Note, that control program 93 is capable of performing the same operational steps as shown in FIG. 15 and FIG. 17 for slave caching server computer 130. Storage 179 includes a database 205, which was described in the detailed description for FIG. 5 above.

Slave caching server computer 130 includes an operating system program 82, a control program 92, a network program 98, and a storage 177. Operating system program 82 and network program 98 were described in the detailed description for FIG. 2D(1) above. Therefore, only control program 92 and storage 177 will be detailed below. Control program 92 is described in greater detail in FIG. 15. More particularly, control program 92 is detailed in steps 1936, 1938, 1944, and 1950. Further, in an alternative embodiment of the invention control program 92 is described in greater detail in FIG. 17. More particularly, control program 92 is detailed in steps 2112, 2120, and 2128. Note, FIG. 16 shows steps 2032 and 2034 as performed by slave caching server 135. However, slave caching server 130 is capable of performing the same operational steps. Storage 177 includes a database 204, which was described in the detailed description for FIG. 4 above.

Figure 13:
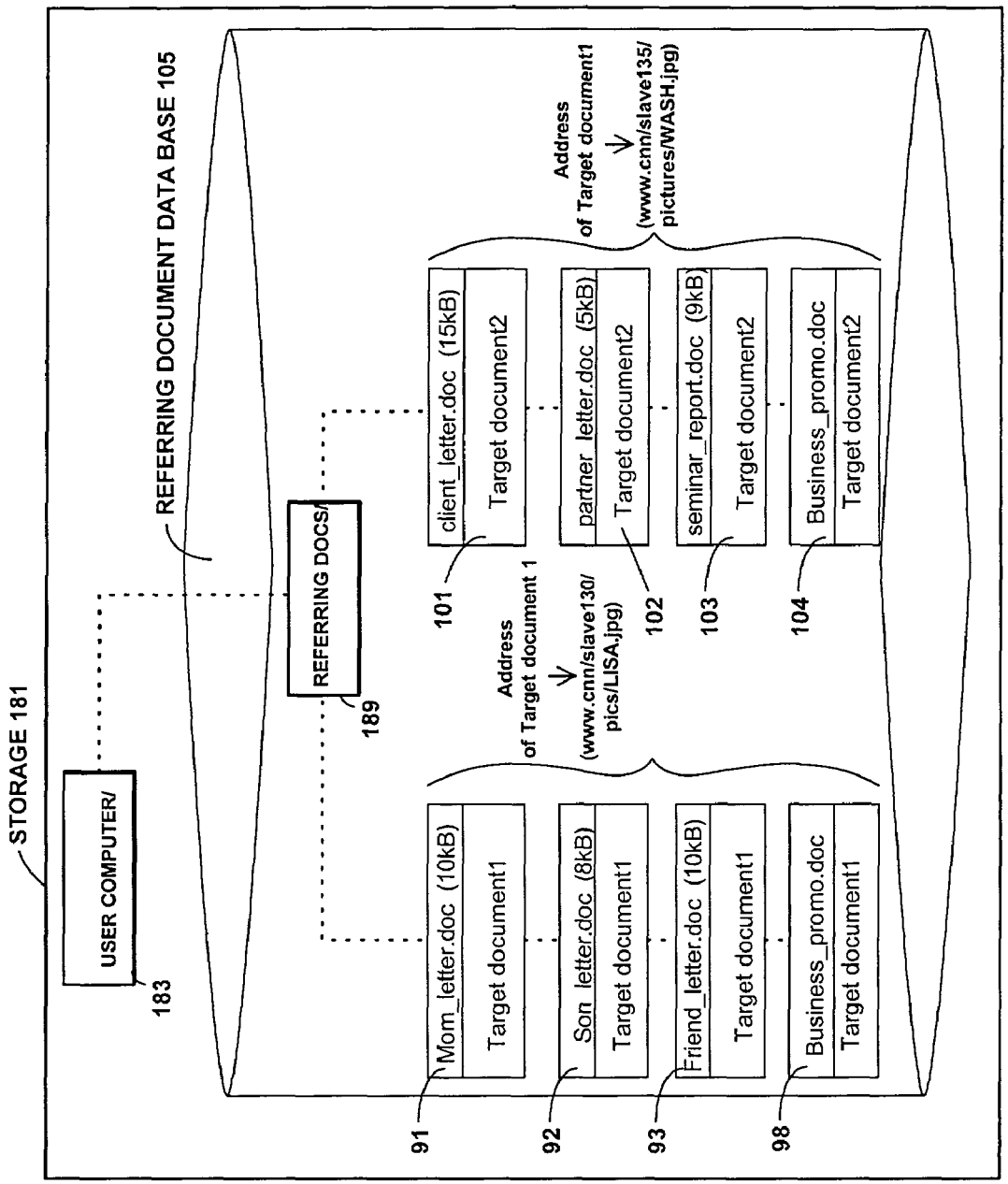
FIG. 13 is a schematic diagram illustrating a database for storing referring documents in a user client computer for the embodiment of the present invention, shown in FIG. 12.

Referring to FIG. 13, a schematic diagram illustrates a database 105 for storing referring documents in a user client computer 100 for the embodiment of the invention shown in FIG. 12. In FIG. 13, a storage 181 includes database 105. Database 105 is under a root directory entitled "user computer". A plurality of referring documents 91, 92, 93, and 98, each contain a hypertext link to a target document. Referring documents 91, 92, 93, and 98 have hypertext links to the target document with a URL address www.cnn/slave130/pics/LISA.jpg. Similarly, there are a plurality of referring documents 101, 102, 103, and 104, which have hypertext links to a second target document. Referring documents 101, 102, 103, and 104 include hypertext links to a target document, which has a URL address www.cnn/slave135/pictures/WASH.jpg. Note, all of the referring documents are included under a subdirectory 189 entitled "referring docs". Storage 181 contains referring documents, which are stored on user client computer 100, rather than on master server computer 110, shown in FIG. 12.

Storage of referring documents on user client computer 100 allows memory space to be freed up on master server computer 110 and slave caching server computers (130, 135), shown in FIG. 12. This reduces the chance of overloading slave caching server computers (130, 135), when a large number of user client requests are received. Referring documents 91, 92, 93, 98, 101, 102, 103, and 104 can be any form of electronic document, which contains a hypertext link. For example, a mail document, a text file, or a web page.

Figure 14:
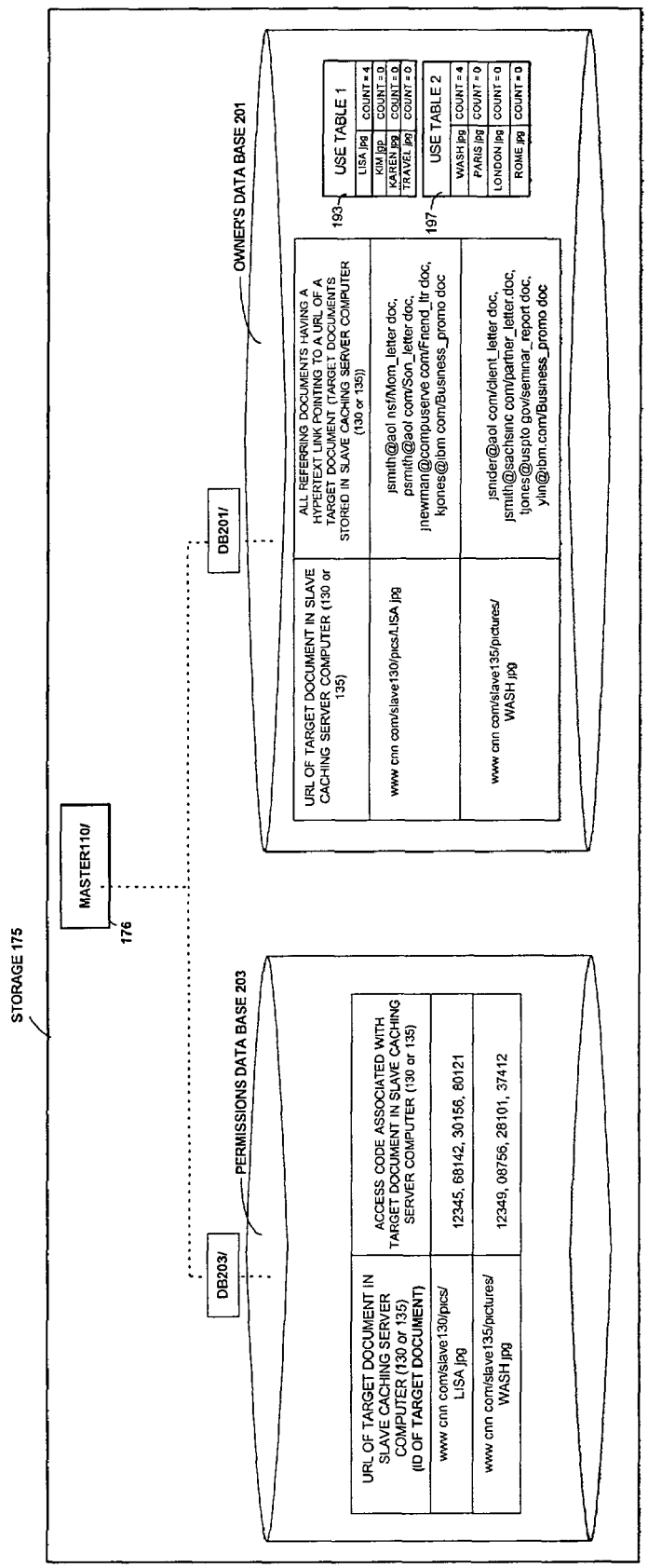
FIG. 14 is a schematic diagram illustrating databases in a master server computer for the embodiment of the present invention shown in FIG. 12.

Referring to FIG. 14, a schematic diagram illustrates databases in a master server computer 110 for the embodiment of the invention shown in FIG. 12. FIG. 14 shows a storage 175, which includes a database 203 and a database 201. Database 203 and 201 are included under a root directory 176 entitled "Master 110". Database 203 is included under a subdirectory entitled "DB203". Database 203 includes a table having a left-hand column and a right-hand column. The left-hand column contains URL addresses of target documents in either a slave caching server computer 130 or a slave caching server computer 135, shown in FIG. 12. The URL addresses are also called "IDs of target documents." In a first entry in the left-hand column a URL address of a target document is listed. The URL address is www.cnn.com/slave130/pics/lisa.jpg. This URL address indicates that the target document LISA.jpg is located in slave caching server computer 130 under a subdirectory called "pics".

The right-hand column contains access codes associated with the target documents in the left-hand column, which are located in one of slave caching server computers (130 or 135). In a first entry in the right-hand column are four access codes associated with the first entry in the left-hand column. Therefore, the target document LISA.jpg is referred to by four different referring documents, each of the referring documents having an access code, which is listed in the first entry in the right-hand column. Alternatively, the target document LISA.jpg may be referred to by four different hyperlinks within one or more referring documents.

Similarly, in a second entry in the left-hand column a URL address for the target document WASH.jpg is listed. In a second entry in the right-hand column four accesses codes are listed for referring documents containing the target document WASH.jpg. Use of the access codes is described in greater detail in FIG. 15. A user must enter an access code associated with each target document in order to received the target document and read it. Database 201 contains a first table having a left-hand column and a right-hand column. The left-hand column contains URL addresses of target documents in slave caching server computers (130, 135). The right-hand column contains referring documents, each having a hypertext link pointing to the URL address of the target document. In a first entry in the left-hand column a URL address for a target document LISA.jpg is listed. The URL address is www.cnn.com/slave130/pics/lisa.jpg. This indicates that the target document LISA.jpg is stored on slave caching server computer 130 in a subdirectory called "pics". In a first entry in the right-hand column exemplary URL addresses of referring documents are listed. For example, a first URL address listed is jsmith@aol.nsf/mom_letter.doc. The "NSF" extension indicates that this is a document, which was sent by a user client computer 100. The referring document is entitled "Mom_letter.doc". A second exemplary referring document has the URL address psmith@aol.com/Son_letter.doc. The "com" extension indicates that this is a URL address of a document sent to a recipient from user client computer 100.

Database 201 can be designed to store referring documents sent from user client computer 100 and referring documents sent to a recipient from user client computer 100. In this embodiment of the invention the only way that a URL address of a recipient is known is at a time when the recipient selects a hypertext link in a received referring document. At this time, a software request is made as described in greater detail in FIG. 15, and the recipient is able to receive and read the target document. In a second entry in the left-hand column a URL address for the target document WASH.jpg is listed. In a second entry in the right-hand column corresponding referring documents having hypertext links to the target document WASH.jpg are listed. Database 201 further includes a use table 193 called "use table 1" and a use table 197 called "use table 2". Use tables 1 and 2 (193, 197) each contains counters for each target document. For example, in use table 1 the target document LISA.jpg has a count equal to 4. This indicates that there are four hypertext links to the target document LISA.jpg. More particularly, a single referring document may have four hypertext links to the target document LISA.jpg. Alternatively, separate referring documents may each contain one or more hypertext links to the target document LISA.jpg. Thus, the counter indicates the total number of hypertext links contained in referring documents to the target document LISA.jpg. The use of the counters in use tables 1 and 2 (130, 135) is described in greater detail in FIG. 15 and FIG. 16. Note, database 203 is used when security is needed for target documents. If no security is required for target documents, database 203 can eliminated. Therefore, in another embodiment of the invention, storage 175 may contain only database 201.

Referring to FIG. 15, a network operation diagram illustrates a sequence of operational steps carried out by an author client, a user, a master server computer 110, a web server computer 120, and a slave caching server computer 130 in viewing target files referred to in secure referring documents, for the embodiment shown in FIG. 12. In a step 1900 a user selects a hypertext link in a referring document and sends a "GET Request" to web server computer 120. The process then flows to a step 1902. In step 1902, web server computer 120 receives the request, looks up a target document file, and accesses a re-direct address for master server computer 110. The process then flows to a step 1904, where web server computer 120 sends the redirect address of master server computer 110 to the user.

The process then flows to a step 1906, where the user sends the get request to master server computer 110. The process then flows to a step 1908, where master server computer 110 checks to see if a referring document from the user is found or not found. The process then flows to a step 1910. In step 1910, master server computer 110 determines if the referring document is listed in a database 201. If the referring document is not listed in database 201 the process then flows to a step 1912. In step 1912, master server computer 110 sends an offer of a software download to the user. The process then flows to a step 1914, where the client requests the software download. The process then flows to a step 1916, where master server computer 110 updates a counter for the requested target document. The process then flows to a step 1918, where master server computer 110 updates a database 201. Database 201 was described in the detailed description for FIG. 14 above. The process then flows to a step 1920, where master server computer 110 sends software to the user. The software is the "latch monitoring software", shown in FIG. 12. The process then flows to a step 1921, where the user receives the software. The process then flows to a step 1922, where master server computer 110 generates an access code and adds an entry (ID of the target document and the access code) to a permissions database. The permissions database was described in the detailed description of FIG. 14 as database 203. The process then flows to a step 1924 where master server computer 110 generates a slave caching server computer address.

The process then flows to a step 1926, where master server computer 110 sends the ID of the target document and the access code to an author client. The process then flows to a step 1928, where the author client receives the ID of the target document and the access code. The process then flows to a step 1930, where it is determined whether the author client authorizes accesses to the target document. If the author client authorizes accesses to the target document the process then flows to a step 1932. In step 1932, the author client sends the ID of the target document and the access code to the user and tells the user to initiate a request for the target document. The process then flows to a step 1934, where the user sends a request containing the access code and the ID of the target document to a designated slave caching server. In this example the designated slave caching server is slave caching server 130. The appropriate slave caching server is determined by the address generated in step 1924, which is determined by the location of the target document.

The process then flows to a step 1936, where slave caching server 130 receives the request and the ID of the target document from the user. The process then flows to a step 1938, where slave caching server 130 requests permission from master server computer 110 to access the target document. The process then flows to a step 1940, where master server computer 110 receives the request and checks the access codes sent by the user. The process then flows to a step 1942, where it is determined whether the access code sent by the user matches an access code of the target document stored in master server computer 110. If the access code sent by the user matches the access code of the target document stored in master server computer 110 the process then flows to a step 1944. In step 1944 slave caching server 130 accesses the target document. The process then flows to a step 1950, where slave caching server 130 sends the target document to the user. Finally, in a step 1952 the user receives the target document and is able to view the target document.

Referring back to step 1942, if the access code sent by the user does not match the access code of the target document stored in master server computer 110, the process then flows to a step 1946. In step 1946, master server computer 110 sends a message to the user denying access to the target document. The process then flows to a step 1948, where the user receives the message denying access to the target document and the process ends. Referring back to step 1930, if the author client does not authorize access to the target document the process then flows to steps 1946 and 1948 and the user is denied access to the target document. Referring back to step 1910, if the referring document is listed in database 201, the process flows directly to from step 1910 to step 1922 and the process continues. When this happens, no software download is sent to the user and no update is performed on either the counter for the target document or database 201. Optionally, the security steps (steps 1922, 1926, 1928, 1930, 1932, 1934, 1936, 1938, 1940, 1942, 1946, and 1948) can be eliminated if no security is needed for the target document. Optionally, different network configurations can be formed, as shown in FIG. 1A, FIG. 1B, FIG. 1C, and FIG. 1D. For example, if web server computer 120 is eliminated, steps 1902 and 1904 can be eliminated from the viewing process of FIG. 15.

Referring to FIG. 16, a network operation diagram illustrates a sequence of operational steps carried out by an author client, a user, a master server computer 110, a web server computer 120, and a slave caching server computer 135 in deleting target files/referring documents for the embodiment shown in FIG. 12. In a step 2000, a user is monitored for deletion of referring documents. The monitoring is performed by "latch monitoring software 62", shown in FIG. 12. The process then flows to a step 2002, where the user deletes a referring document, which is stored in database 105, shown in FIG. 12. The process then flows to a step 2004, where user client computer 100 sends the delete information to web server computer 120. The process then flows to a step 2006, where web server computer 120 receives the delete information, looks up the referring document listing, and accesses a redirect address for master server computer 110. The process then flows to a step 2008, where web server computer 120 sends the redirect address of master server computer 110 to the user. The process then flows to a step 2010, where the user sends the delete information to master server computer 110.

The process then flows to a step 2012, where master server computer 110 accesses the referring document listing in a database 201 and deletes the listing. The process then flows to a step 2014, where a counter for the target document referred to in the selected referring document is updated. The process then flows to a step 2016, where a database 203 is updated. Database 203 was described in the detailed description for FIG. 14 above. The process then flows to a step 2018, where it is determined whether the counter for the target document is equal to zero. If the counter for the target document is equal to zero the process then flows to a step 2020. In step 2020, master server computer 110 sends a message asking whether an author client wants to delete the target document. The process then flows to a step 2022, where the author client receives the message asking whether to delete the target document. The process then flows to a step 2024, where it is determined whether the author client wants to delete the target document. If the author client wants to delete the target document the process then flows to a step 2026. In step 2026, the author client sends a delete request for the target document.

The process then flows to a step 2028, where master server computer 110 receives the delete request and generates a slave caching server computer address. The process then flows to a step 2030, where master server computer 110 sends the delete request to the appropriate slave caching server computer. The slave caching server computer address generated in step 2028 designates the slave caching server to which the delete request is sent. The process then flows to a step 2032, where slave caching server 135 receives the delete request, accesses the target document, and deletes it. The process then flows to a step 2034, where slave caching server 135 updates a target document database. In this example the target document database is database 205, which was described in the detailed description for FIG. 5 above. The process then flows to a step 2036, where master server computer 110 sends a message indicating that the target document is deleted. The process then flows to a step 2038, where the author client receives the message that the target document has been deleted. The process then repeats by flowing directly from step 2038 back to step 2000, where the user is monitored again for deletion of referring documents.

Referring back to step 2024, if is determined that the author client does not want to delete the target document the process flows directly from step 2024 back to step 2000. Referring to step 2018, if the counter for the target document is not equal to zero the process flows directly from step 2018 back to step 2000. Note, any recipient or sender who downloads latch monitoring software 62 can perform the operational steps shown in FIG. 16. Note, slave caching server computer 130 is capable of performing the same operational steps 2032 and 2034 as shown for slave caching server computer 135. Optionally, one or more of steps 2020, 2022, 2024, 2036, and 2038 can be eliminated to allow target documents to automatically be deleted when the counter for the target document is equal to zero. Optionally, different network configurations can be formed, as shown in FIG. 1A, FIG. 1B, FIG. 1C, and FIG. 1D. For example, if web server computer 120 is eliminated, steps 2006 and 2008 can be eliminated from the delete process of FIG. 16.

Referring to FIG. 17, a network operation diagram illustrates a sequence of operational steps carried out by a user client computer 100, a master server computer 110, a web server computer 120, and a slave caching server computer 130 in creating a hypertext link between a target file and a referring document for the embodiment shown in FIG. 12. In a step 2100, a user sends a target document to web server computer 120 using FTP (file transfer protocol). The process then flows to a step 2102, where web server computer 120 receives the request, looks up a redirect address for master server computer 110, and accesses the redirect address. The process then flows to a step 2104, where web server computer 120 sends the redirect address of master server computer 110 to the user. The process then flows to a step 2106, where the user sends the target document to master server computer 110 using FTP.

The process then flows to a step 2108, where master server computer 110 receives the target document and generates a slave caching server computer address. The process then flows to a step 2110, where master server computer 110 transfers the target document to a designated slave caching server computer. The slave caching server computer is designated by the address generated in step 2108. The process then flows to a step 2112, where web server computer 120 receives the target document and stores it in a database 204. Database 204 was described in the detailed description for FIG. 4 above. The process then flows to a step 2114, where the user sends an "embed target document request" to master server computer 110. The process then flows to a step 2116, where master server computer 110 receives the embed request and generates a slave caching server computer address.

The process then flows to a step 2118, where master server computer 110 sends a request for the target document to a designated slave caching server. The slave caching server is designated by the address generated in step 2116. The process then flows to a step 2120, where slave caching server computer 130 accesses the target document and sends it to master server computer 110. The process then flows to a step 2122, where master server computer 110 receives the target document and embeds it in the referring document. The process then flows to a step 2124, where master server computer 110 updates a database 201, by adding a URL of the target document (ID of the target document) in a first list and adding the referring document to another list. The process then flows to a step 2126, where master server computer 110 updates a counter for the transferred target document. The process then flows to a step 2128, where slave caching server computer 130 updates a target document database.

In this example, the target document database is database 204, which was described in detail with reference to FIG. 4 above. The process then flows to a step 2130, where master server computer 110 updates a database 201 and a database 203. Databases 201 and 203 were described in detail with reference to FIG. 14 above. The process then flows to a step 2132, where master server computer 110 sends a message asking whether the user wants to embed more target documents. The process then flows to a step 2134, where the user receives the message asking whether the user wants to embed more target documents. The process then flows to a step 2136, where it is determined whether the user wants to embed another target document. If the user does not want to embed another target document into a referring document the process then flows to a step 2138. In step 2138, master server computer 110 sends a message asking whether the user wants to transfer another target document.

The process then flows to a step 2140, where the user receives the message asking whether the user wants to transfer another target document. The process then flows to a step 2142, where it is determined whether the user wants to transfer another target document. If the user wants to transfer another target document the process then flows directly from step 2142 back to step 2100. Alternatively, if the user does not want to transfer another target document the process flows directly from step 2142 to a step 2144, where the process ends. Referring back to step 2136, if is determined that the user does want to embed another target document the process flows directly from step 2136 back to step 2114. Optionally, one or more of steps 2132, 2134, and 2136 can be eliminated to allow target documents to be automatically deleted if the counter for the target document is equal to zero. Optionally, different network configurations can be formed, as shown in FIG. 1A, FIG. 1B, FIG. 1C, and FIG. 1D. For example, if web server computer 120 is eliminated, steps 2102 and 2104 can be eliminated from the embed/delete process of FIG. 17.

Those skilled in the art will recognize that the method and system of the present invention has many applications, and that the present invention is not limited to the representative examples disclosed herein. Moreover, the scope of the present invention covers conventionally known variations and modifications to the system components and the method steps described herein, as would be known by those skilled in the art.

What is claimed is:

1. A method of managing target documents referred to by referring documents, comprising the steps of:
    identifying one or more referring documents in a network, each of the one or more referring documents associated with a user on the network and having one or more hypertext links, each hypertext link pointing to a target document stored in a storage;
    determining when a user deletes one or more referring documents associated with the user; and
    enabling removal of a target document from the storage when the one or more hypertext links pointing to the target document cease to exist.

2. The method of claim 1, wherein the one or more referring documents and the target document are stored in different storage devices coupled over a network.

3. The method of claim 1, wherein the one or more referring documents and the target document are stored in the same storage device.

4. The method of claim 1, further comprising the step of decrementing a counter for the target document when a hypertext link ceases to exist.

5. The method of claim 4, further comprising the step of:
    determining whether the count for the counter of the target document equals zero.

6. The method of claim 5, wherein if the counter equals zero, further comprising the step of:
    sending a message to an author of the target document asking whether the author wants to delete the target document from the storage.

7. The method of claim 1, wherein a hypertext link pointing to a target document ceases to exist when the hypertext link is deleted.

8. The method of claim 1, wherein a hypertext link pointing to a target document ceases to exist when a referring document having the hypertext link is deleted.

9. A system for managing target documents referred to by referring documents, comprising:
    a storage for storing one or more target documents;
    a processor coupled to the storage, for identifying one or more referring documents in a network, each of the one or more referring documents associated with a user of the network and having one or more hypertext links, each hypertext link pointing to a target document of the one or more target documents;
    wherein the processor determines when user deletes one or more referring documents associated with the user, and
    wherein the storage enables removal of a target document of the one or more target documents when one or more hypertext links pointing to the target document cease to exist.

10. The system of claim 9, wherein the one or more referring documents and the target document are stored in different storage devices coupled over a network.

11. The system of claim 9, wherein the one or more referring documents and the target document are stored in the same storage device.

12. The system of claim 9, further comprising means for decrementing a counter for the target document when a hypertext link is ceases to exist.

13. The system of claim 12, further comprising:
means for determining whether the count for the counter of the target document equals zero.

14. The system of claim 13, wherein if the counter equals zero, further comprising:
means for sending a message to an author of the target document asking whether the author wants to delete the target document from the storage.

* * * * *